United States Patent [19]
Fukuda et al.

[11] Patent Number: 5,937,138
[45] Date of Patent: Aug. 10, 1999

[54] METHOD AND AN APPARATUS FOR SYSTEM ENCODING BITSTREAMS FOR SEAMLESS CONNECTION

[75] Inventors: Hideki Fukuda, Katano; Kazuhiro Tsuga, Takarazuka; Takumi Hasebe, Yawata; Yoshihiro Mori, Hirakata; Tomoyuki Okada, Katano; Kazuyoshi Horiike, Kyoto, all of Japan

[73] Assignee: Matsushita Electric Industrial Co., Ltd., Osaka, Japan

[21] Appl. No.: 08/722,462

[22] Filed: Sep. 27, 1996

[30] Foreign Application Priority Data

Sep. 29, 1995 [JP] Japan .................................. 7-252736
Feb. 28, 1996 [JP] Japan .................................. 8-041582

[51] Int. Cl.⁶ .............................. H04N 5/917; H04N 7/26
[52] U.S. Cl. .......................... 386/112; 386/111; 348/419
[58] Field of Search .................................. 386/33, 68, 81, 386/109, 111, 112; 348/384, 390, 419; 375/262, 265

[56] References Cited

U.S. PATENT DOCUMENTS 5,481,543 1/1996 Veltman .................................. 370/94.1
5,715,356 2/1998 Hirayama et al. ........................ 386/96
5,745,643 4/1998 Mishina .................................. 386/106

FOREIGN PATENT DOCUMENTS 711 083   5/1996  European Pat. Off. .
7-336640  12/1995 Japan .
8-138316  5/1996  Japan .
8-505024  5/1996  Japan .
8-251538  9/1996  Japan .

*Primary Examiner*—Wendy Garber
*Assistant Examiner*—Christopher Onuaku
*Attorney, Agent, or Firm*—Wenderoth, Lind & Ponack, L.L.P.

[57] ABSTRACT

An encoding method for producing specific encoded data by calculating the data occupancy of a decoding buffer memory of a particular size that is used when decoding the encoded data during reproduction, defining the allocated code size of a particular period based on the calculation result, and compression coding the signal of a particular period to the allocated code size. The data occupancy is calculated on the assumption that virtual encoded data is transferred to the decoding buffer memory following the transfer of the first-encoded data to the decoding buffer memory. The data occupancy when the last data in the first encoded data is decoded is calculated as the final buffer occupancy Be. The data occupancy when the encoding process producing the second encoded data is begun is an initial buffer occupancy Bi where the initial buffer occupancy Bi is less than the final buffer occupancy Be, and thus allocated code size is defined based on the change in the data occupancy.

29 Claims, 62 Drawing Sheets

Fig.29

| VOB number (VOB_NO) |
| --- |
| Video encode start time (V_STTM) |
| Video encode end time (V_ENDTM) |
| Video encode mode (V_ENCMD) |
| Video encode bit rate (V_RATE) |
| Video encode maximum bit rate (V_MRATE) |
| GOP structure fixing flag (GOP_FXflag) |
| Video encode GOP structure (GOPST) |
| Video encode initial data (V_INST) |
| Video encode end data (V_ENDST) |
| Audio encode start time (A_STTM) |
| Audio encode end time (A_ENDTM) |
| Audio encode bit rate (A_RATE) |
| AUdio encode method (A_ENCMD) |
| Audio start gap (A_STGAP) |
| Audio end gap (A_ENDGAP) |
| Preceding VOB number (B_VOB_NO) |
| Following VOB number (F_VOB_NO) |

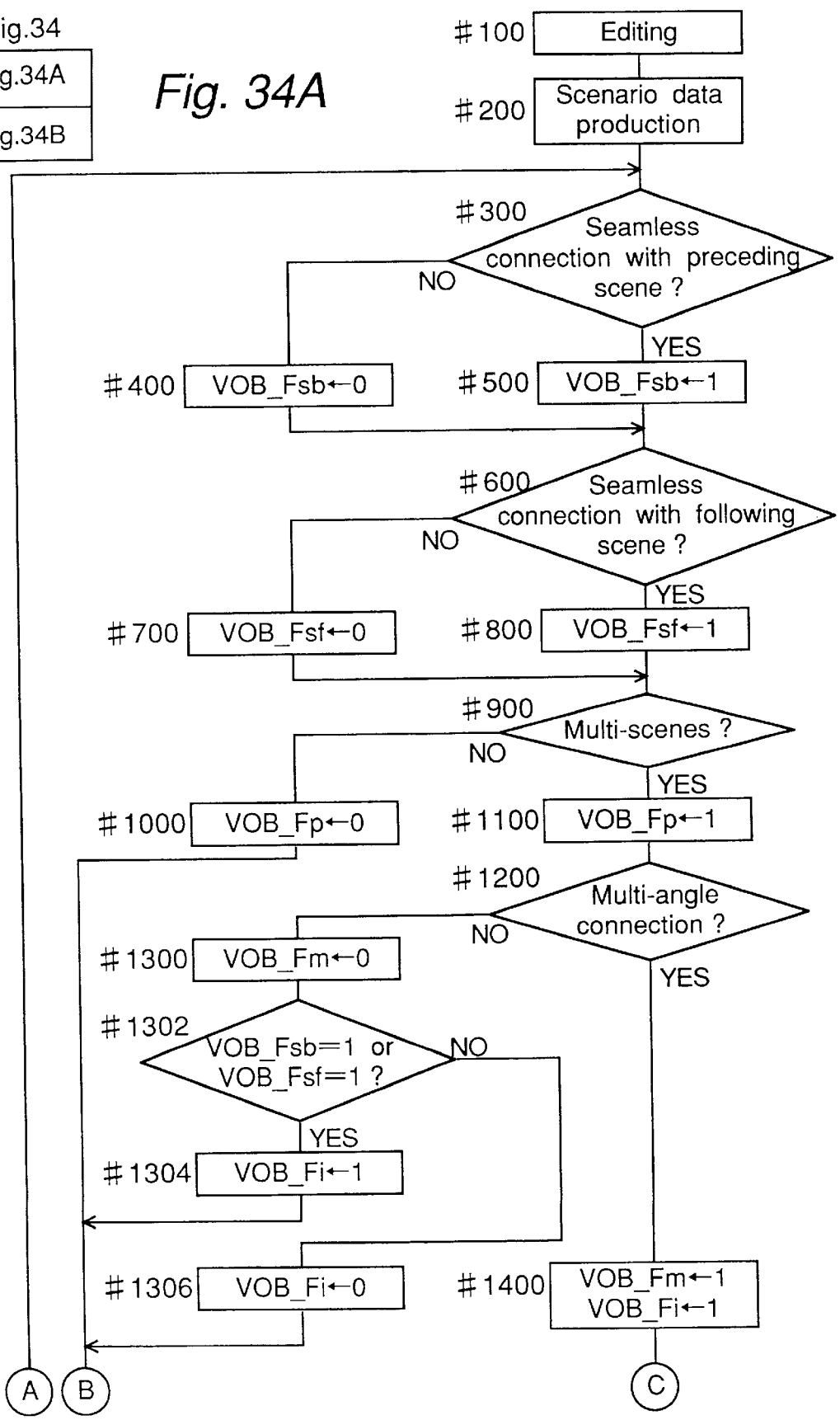

Fig.47

| Scenario info. register | Register Name |
|---|---|
| | Angle No. (ANGLE_NO_reg) |
| | VTS No. (VTS_NO_reg) |
| | PGC No. (VTS_PGCI_NO_reg) |
| | Audio ID (AUDIO_ID_reg) |
| | Sub-picture ID (SP_ID_reg) |
| | SCR buffer (SCR_buffer) |

| Cell information register | Register Name | Value |
|---|---|---|
| | Cell block mode (CBM_reg) | N_BLOCK: Not a Cell in the block |
| | | F_CELL: First Cell in the block |
| | | BLOCK: Cell in the block |
| | | L_CELL: Last Cell in the block |
| | Cellblock type (CBT_reg) | N_BLOCK: Not a part of in the block |
| | | A_BLOCK: Angle block |
| | Seamless reproduction flag (SPF_reg) | SML: A Cell shall be presented seamlessly |
| | | NSML: A Cell shall not be presented seamlessly |
| | Interleave allocation flag (IAF_reg) | N_ILVB: Exist in the Contiguous block |
| | | ILVB: Exist in the Interleaved block |
| | STC re-setting flag (STCDF_reg) | STC_NRESET: STC reset is not necessary |
| | | STC_RESET: STC reset is necessary |
| | Seamless angle switching flag (SACF_reg) | SML: A Cell shall be presented seamlessly |
| | | NSML: A Cell shall not be presented seamlessly |
| | Starting address of first VOBU in cell (C_FOVOBU_SA_reg) | |
| | Starting address of last VOBU in cell (C_LOVOBU_SA_reg) | |

Fig.48

| | Register Name | |
|---|---|---|
| Information registers for Non-seamless multi-angle control | N.A.N.A. 1 (NSML_AGL_C1_DSTA_reg) | |
| | N.A.N.A. 2 (NSML_AGL_C2_DSTA_reg) | |
| | N.A.N.A. 3 (NSML_AGL_C3_DSTA_reg) | |
| | N.A.N.A. 4 (NSML_AGL_C4_DSTA_reg) | |
| | N.A.N.A. 5 (NSML_AGL_C5_DSTA_reg) | |
| | N.A.N.A. 6 (NSML_AGL_C6_DSTA_reg) | |
| | N.A.N.A. 7 (NSML_AGL_C7_DSTA_reg) | |
| | N.A.N.A. 8 (NSML_AGL_C8_DSTA_reg) | |
| | N.A.N.A. 9 (NSML_AGL_C9_DSTA_reg) | |
| Information registers for seamless multi-angle control | Register Name | |
| | S.A.S.A. 1 (SML_AGL_C1_DSTA_reg) | |
| | S.A.S.A. 2 (SML_AGL_C2_DSTA_reg) | |
| | S.A.S.A. 3 (SML_AGL_C3_DSTA_reg) | |
| | S.A.S.A. 4 (SML_AGL_C4_DSTA_reg) | |
| | S.A.S.A. 5 (SML_AGL_C5_DSTA_reg) | |
| | S.A.S.A. 6 (SML_AGL_C6_DSTA_reg) | |
| | S.A.S.A. 7 (SML_AGL_C7_DSTA_reg) | |
| | S.A.S.A. 8 (SML_AGL_C8_DSTA_reg) | |
| | S.A.S.A. 9 (SML_AGL_C9_DSTA_reg) | |
| VOBU info. Register | Register Name | |
| | VOBU final address (VOBU_EA_reg) | |
| Registers for seamless reproduction | Register Name | Value |
| | Interleave unit flag (ILVU_flag_reg) | ILVU: VOBU is in ILVU |
| | | N_ILVU: VOBU is not in ILVU |
| | Unit end flag (UNIT_END_flag_reg) | END: At the end of ILVU |
| | | N_END: Not at the end of ILVU |
| | Final pack address of ILVU (ILVU_EA_reg) | |
| | Starting address of next ILVU (NT_ILVU_SA_reg) | |
| | I. V. F. P. S. T. (VOB_V_SPTM_reg) | |
| | F. V. F. P. T. T. (VOB_V_EPTM_reg) | |
| | Audio reproduction stopping time 1 (VOB_A_STP_PTM1_reg) | |
| | Audio reproduction stopping time 2 (VOB_A_STP_PTM2_reg) | |
| | Audio reproduction stopping period 1 (VOB_A_GAP_LEN1_reg) | |
| | Audio reproduction stopping period 2 (VOB_A_GAP_LEN2_reg) | |

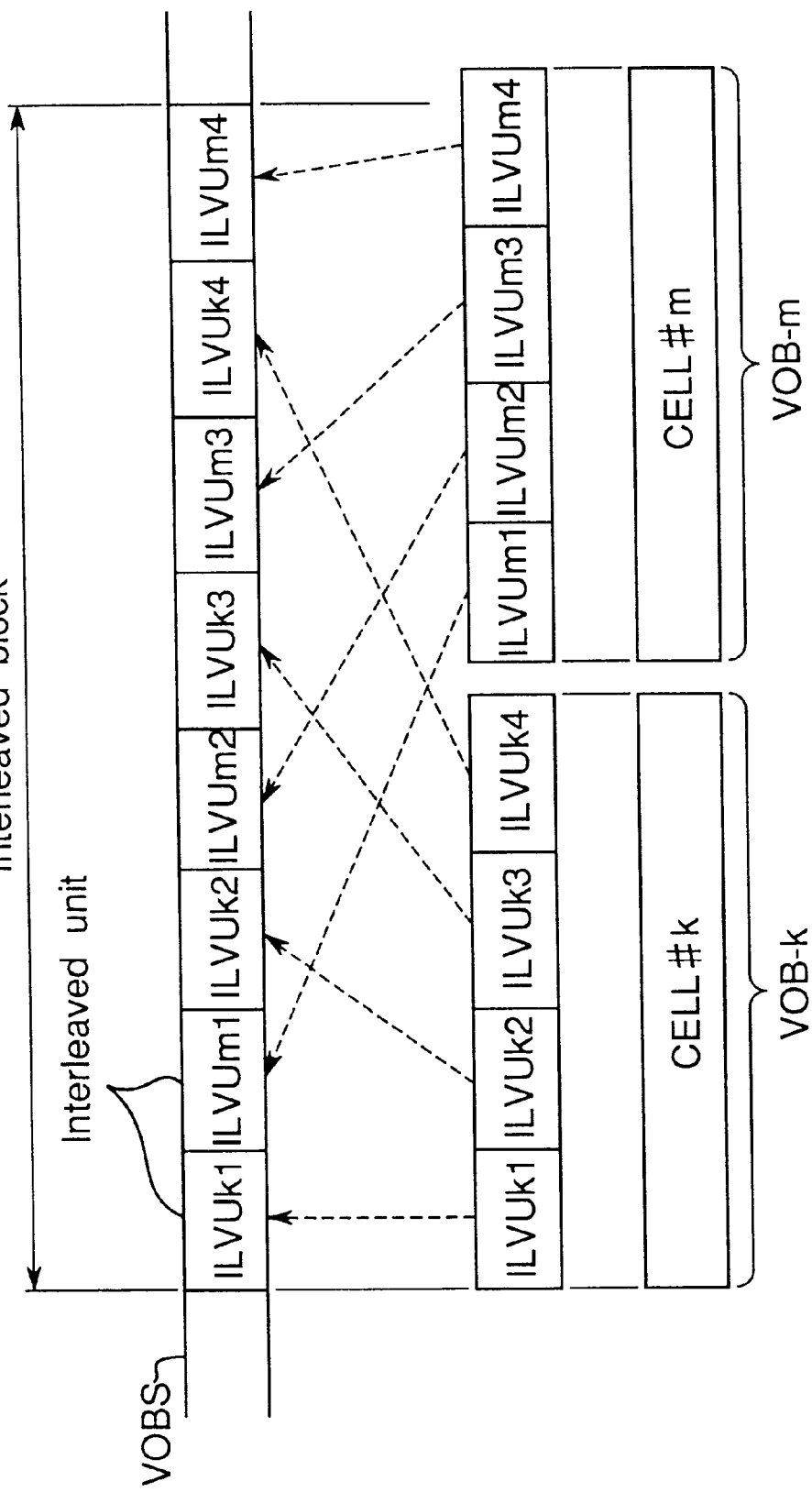

METHOD AND AN APPARATUS FOR SYSTEM ENCODING BITSTREAMS FOR SEAMLESS CONNECTION

BACKGROUND OF THE INVENTION

1. Field of the Invention

The present invention relates to a method and apparatus for system encoding bitstreams for seamless connection and, more specifically, to bitstreams for use in an authoring system for variously processing a data bitstream comprising the video data, audio data, and sub-picture data constituting each of plural program titles containing related video data, audio data, and sub-picture data content to generate a bitstream from which a new title containing the content desired by the user can be reproduced, and efficiently recording and reproducing the generated bitstream using a particular recording medium.

2. Description of the Prior Art

Authoring systems used to produce program titles comprising related video data, audio data, and sub-picture data by digitally processing, for example, multimedia data comprising video, audio, and sub-picture data recorded to laser disk or video CD formats are currently available.

Systems using Video-CDs in particular are able to record video data to a CD format disk, which was originally designed with an approximately 600 MB recording capacity for storing digital audio data only, by using such high efficiency video compression techniques as MPEG. As a result of the increased effective recording capacity achieved using data compression techniques, karaoke titles and other conventional laser disk applications are gradually being transferred to the video CD format.

Users today expect both sophisticated title content and high reproduction quality. To meet these expectations, each title must be composed from bitstreams with an increasingly deep hierarchical structure. The data size of multimedia titles written with bitstreams having such deep hierarchical structures, however, is ten or more times greater than the data size of less complex titles. The need to edit small image (title) details also makes it necessary to process and control the bitstream using low order hierarchical data units.

It is therefore necessary to develop and prove a bitstream structure and an advanced digital processing method including both recording and reproduction capabilities whereby a large volume, multiple level hierarchical digital bitstream can be efficiently controlled at each level of the hierarchy. Also needed are an apparatus for executing this digital processing method, and a recording media to which the bitstream digitally processed by the apparatus can be efficiently recorded for storage and from which the recorded information can be quickly reproduced.

Increasing the storage capacity of conventional optical disks has been widely researched to address the recording medium aspect of this problem. One way to increase the storage capacity of the optical disk is to reduce the spot diameter D of the optical (laser) beam. If the wavelength of the laser beam is 1 and the aperture of the objective lens is NA, then the spot diameter D is proportional to 1/NA, and the storage capacity can be efficiently improved by decreasing 1 and increasing NA.

As described, for example, in U.S. Pat. No. 5,235,581, however, coma caused by a relative tilt between the disk surface and the optical axis of the laser beam (hereafter "tilt") increases when a large aperture (high NA) lens is used. To prevent tilt-induced coma, the transparent substrate must be made very thin. The problem is that the mechanical strength of the disk is low when the transparent substrate is very thin.

MPEG1, the conventional method of recording and reproducing video, audio, and graphic signal data, has also been replaced by the more robust MPEG2 method, which can transfer large data volumes at a higher rate. It should be noted that the compression method and data format of the MPEG2 standard differ somewhat from those of MPEG1. The specific content of and differences between MPEG1 and MPEG2 are described in detail in the ISO-11172 and ISO-13818 MPEG standards, and further description thereof is omitted below.

Note, however, that while the structure of the encoded video stream is defined in the MPEG2 specification, the hierarchical structure of the system stream and the method of processing lower hierarchical levels are not defined.

As described above, it is therefore not possible in a conventional authoring system to process a large data stream containing sufficient information to satisfy many different user requirements. Moreover, even if such a processing method were available, the processed data recorded thereto cannot be repeatedly used to reduce data redundancy because there is no large capacity recording medium currently available that can efficiently record and reproduce high volume bitstreams such as described above.

More specifically, particular significant hardware and software requirements must be satisfied in order to process a bitstream using a data unit smaller than the title. These specific hardware requirements include significantly increasing the storage capacity of the recording medium and increasing the speed of digital processing; software requirements include inventing an advanced digital processing method including a sophisticated data structure.

Therefore, the object of the present invention is to provide an effective authoring system for controlling a multimedia data bitstream with advanced hardware and software requirements using a data unit smaller than the title to better address advanced user requirements.

To share data between plural titles and thereby efficiently utilize optical disk capacity, multi-scene control whereby scene data common to plural titles and the desired scenes on the same time-base from within multi-scene periods containing plural scenes unique to particular reproduction paths can be freely selected and reproduced is desirable.

However, when plural scenes unique to a reproduction path within the multi-scene period are arranged on the same time-base, the scene data must be contiguous. Unselected multi-scene data is therefore unavoidably inserted between the selected common scene data and the selected multi-scene data. The problem this creates when reproducing multi-scene data is that reproduction is interrupted by this unselected scene data.

A further problem can be expected when the multi-scene data is multi-angle scene data, i.e., scene data showing substantially the same subject from different angles. In the case of a live sports broadcast, this multi-angle scene data may be obtained by recording a baseball batter, for example, with cameras in different locations. The video signals from these plural angles are then combined in predefined data units to obtain a single title. Specifically how these plural video streams will be connected and reproduced, however, cannot be determined during the encoding process. As a result, the behavior of the decoder video buffer, specifically the data accumulation state of the video buffer during the decoding process, cannot be determined during the encoding process. As a result, a video buffer overflow or underflow state may occur during decoding. Even at one-to-one connections between common scenes (system streams), the behavior of the decoder video buffer cannot be determined during encoding.

When variable length coding is used for the coding process, the process must always proceed in a time-base linear fashion. This makes it necessary to control the sequence of the coding process, and limits the flexibility of the title production process. In addition, there are cases in which the final buffer occupancy during first video stream encoding exceeds the initial buffer occupancy of the second video stream. In such cases, a decoding buffer overflow may occur at some indeterminate time during the coding process.

When MPEG coding or a similar variable length coding process is used during the coding process generating the video stream, the coded data quantity is only known once the coding process is completed. This is because the coding length used is determined according to the amount of information in the video data, i.e., the spatial complexity or time-base complexity of the video data, and the preceding code state, and the code length is then determined. Because it is therefore difficult to accurately limit the encoded data size to a specific, predetermined size, it is difficult to accurately specify the final buffer occupancy. Particularly when the encoded data volume is allocated and the coding process is accomplished according to the amount of information in the video stream, the allocated data volume will obviously vary if the amount of information in the video stream changes, and the change in video buffer occupancy will vary. It is therefore difficult to assure that the final decode video buffer occupancy is the same with each of plural video streams.

Therefore, the object of the present invention is to provide a coding method and coding apparatus, a recording method and recording apparatus, and a reproduction method and reproduction apparatus whereby plural independently coded video streams can be freely connected and reproduced without causing a video buffer overflow or underflow state.

A further object of the present invention is to provide a coding method and coding apparatus, a recording method and recording apparatus, and a reproduction method and reproduction apparatus whereby the need for the coding process to proceed in a linear time-base fashion to obtain each video stream is eliminated, the processing time can be shortened by means of parallel coding processes, and process control can be simplified when plural video streams are connected to obtain a single video stream.

A further object of the present invention is to provide a coding method and coding apparatus, a recording method and recording apparatus, and a reproduction method and reproduction apparatus whereby video streams from plural reproduction paths are coded to a multi-scene period from which the user can select a particular reproduction path during reproduction, and the desired video streams from the multi-scene period containing plural selectable video streams (reproduction paths) can then be individually reproduced and contiguously presented as a single video stream without causing a video buffer overflow or underflow state during the decoding (reproduction) process.

The present application is based upon Japanese Patent Application No. 7-252736 and 8-041582, which were filed on Sep. 29, 1995 and Feb. 28, 1996, respectively, the entire contents of which are expressly incorporated by reference herein.

SUMMARY OF THE INVENTION

The present invention has been developed with a view to substantially solving the above described disadvantages and has for its essential object to provide an interleaving method for generating a bitstream.

In order to achieve the aforementioned objective, an encoding method for producing specific encoded data comprises steps of: calculating the data occupancy of a decoding buffer memory of a particular size that is used when decoding the encoded data during reproduction, defining the allocated code size of a particular period based on the calculation result, and compression coding the signal of a particular period to the allocated code size, wherein the data occupancy is calculated on the assumption that virtual encoded data is transferred to the decoding buffer memory following the transfer of first-encoded data to the decoding buffer memory, the data occupancy when last data in the first encoded data is decoded is calculated as a final buffer occupancy Be, the data occupancy when the encoding process producing second encoded data is begun is an initial buffer occupancy Bi where the initial buffer occupancy Bi is less than the final buffer occupancy Be, and the allocated code size is defined based on the change in the data occupancy.

BRIEF DESCRIPTION OF THE DRAWINGS

These and other objects and features of the present invention will become clear from the following detailed description taken in conjunction with the preferred embodiments thereof with reference to the accompanying drawings throughout which like parts are designated by like reference numerals, and in which:

FIG. 29 is a graph schematically showing encoding parameters used by the video encoder of FIG. 25, FIGS. 47 and 48 are graphs showing a decoding information table produced by the decoding system controller of FIG. 26, FIG. 68 is a graph schematically showing an internal data structure of the interleaved block regions according to the present invention.

DESCRIPTION OF PREFERRED EMBODIMENTS

Data Structure of the Authoring System

The logic structure of the multimedia data bitstream processed using the recording apparatus, recording medium, reproduction apparatus, and authoring system according to the present invention is described first below with reference to FIG. 1.

In this structure, one title refers to the combination of video and audio data expressing program content recognized by a user for education, entertainment, or other purpose. Referenced to a motion picture (movie), one title may correspond to the content of an entire movie, or to just one scene within the movie.

A video title set (VTS) comprises the bitstream data containing the information for a specific number of titles. More specifically, each VTS comprises the video, audio, and other reproduction data representing the content of each title in the set, and control data for controlling the content data.

The video zone VZ is the video data unit processed by the authoring system, and comprises a specific number of video title sets. More specifically, each video zone is a linear sequence of K+1 video title sets numbered VTS #0–VTS #K where K is an integer value of zero or greater. One video title set, preferably the first video title set VTS #0, is used as the video manager describing the content information of the titles contained in each video title set.

The multimedia bitstream MBS is the largest control unit of the multimedia data bitstream handled by the authoring system of the present invention, and comprises plural video zones VZ.

Authoring Encoder EC

Figure 2:
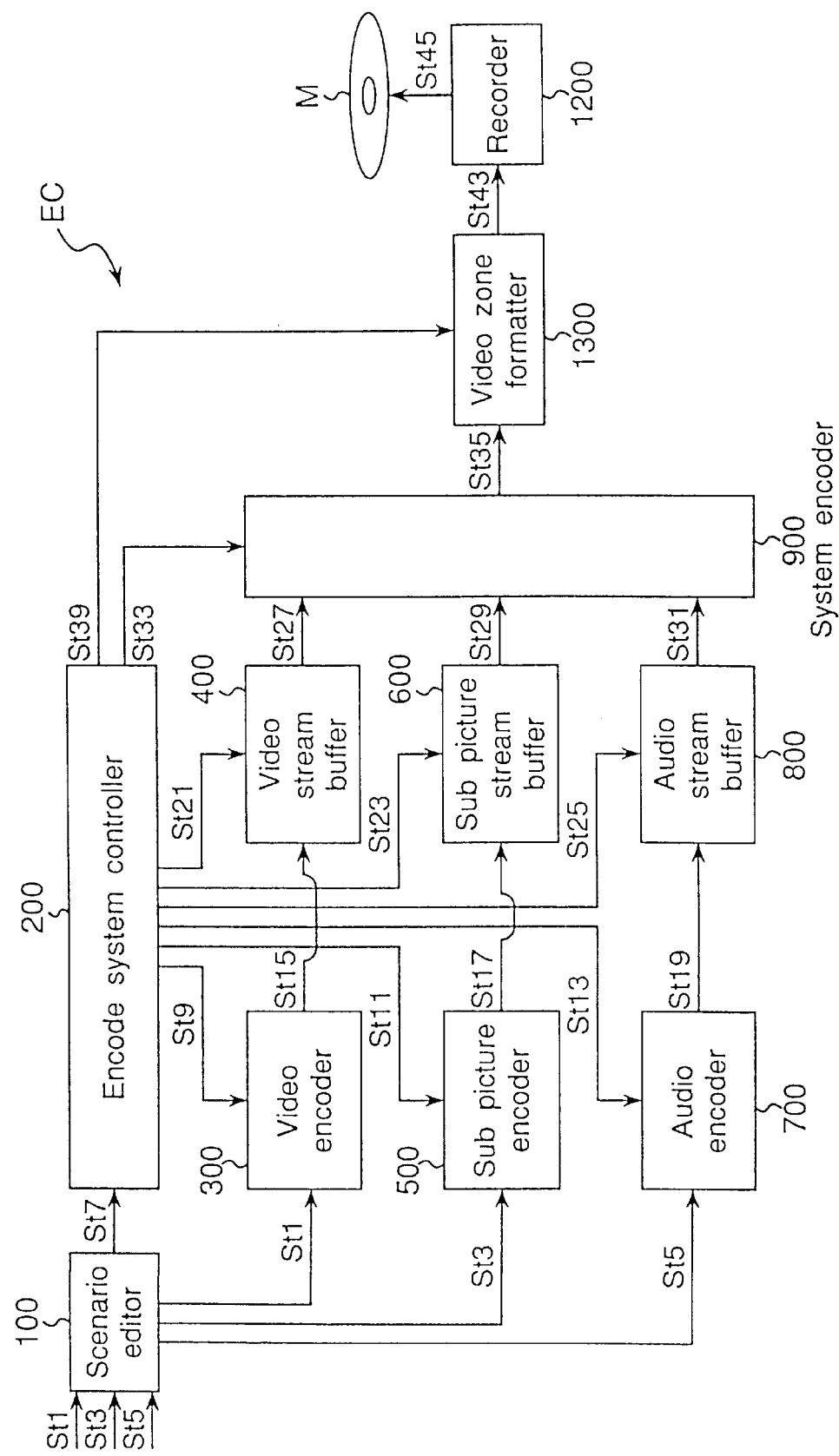
FIG. 2 is a block diagram showing an authoring encoder according to the present invention.

A preferred embodiment of the authoring encoder EC according to the present invention for generating a new multimedia bitstream MBS by re-encoding the original multimedia bitstream MBS according to the scenario desired by the user is shown in FIG. 2. Note that the original multimedia bitstream MBS comprises a video stream St1 containing the video information, a sub-picture stream St3 containing caption text and other auxiliary video information, and the audio stream St5 containing the audio information.

The video and audio streams are the bitstreams containing the video and audio information obtained from the source within a particular period of time. The sub-picture stream is a bitstream containing momentary video information relevant to a particular scene. The sub-picture data encoded to a single scene may be captured to video memory and displayed continuously from the video memory for plural scenes as may be necessary.

When this multimedia source data St1, St3, and St5 is obtained from a live broadcast, the video and audio signals are supplied in real-time from a video camera or other imaging source; when the multimedia source data is reproduced from a video tape or other recording medium, the audio and video signals are not real-time signals.

While the multimedia source stream is shown in FIG. 2 as comprising these three source signals, this is for convenience only, and it should be noted that the multimedia source stream may contain more than three types of source signals, and may contain source data for different titles. Multimedia source data with audio, video, and sub-picture data for plural titles are referred to below as multi-title streams.

As shown in FIG. 2, the authoring encoder EC comprises a scenario editor 100, encoding system controller 200, video encoder 300, video stream buffer 400, sub-picture encoder 500, sub-picture stream buffer 600, audio encoder 700, audio stream buffer 800, system encoder 900, video zone formatter 1300, recorder 1200, and recording medium M.

The video zone formatter 1300 comprises a video object (VOB) buffer, formatter, and volume and file structure formatter (not shown).

The bitstream encoded by the authoring encoder EC of the present embodiment is recorded by way of example only to an optical disk.

The scenario editor 100 of the authoring encoder EC outputs the scenario data, i.e., the user-defined editing instructions. The scenario data controls editing the corresponding parts of the multimedia bitstream MBS according to the user's manipulation of the video, sub-picture, and audio components of the original multimedia title. This scenario editor 100 preferably comprises a display, speaker (s), keyboard, CPU, and source stream buffer. The scenario editor 100 is connected to an external multimedia bitstream source from which the multimedia source data St1, St3, and St5 are supplied.

The user is thus able to reproduce the video and audio components of the multimedia source data using the display and speaker to confirm the content of the generated title. The user is then able to edit the title content according to the desired scenario using the keyboard, mouse, and other command input devices while confirming the content of the title on the display and speakers. The result of this multimedia data manipulation is the scenario data St7.

The scenario data St7 is basically a set of instructions describing what source data is selected from all or a subset of the source data containing plural titles within a defined time period, and how the selected source data is reassembled to reproduce the scenario (sequence) intended by the user. Based on the instructions received through the keyboard or other control device, the CPU codes the position, length, and the relative time-based positions of the edited parts of the respective multimedia source data streams St1, St3, and St5 to generate the scenario data St7.

The source stream buffer has a specific capacity, and is used to delay the multimedia source data streams St1, St3, and St5 a known time Td and then output streams St1, St3, and St5.

This delay is required for synchronization with the editor encoding process. More specifically, when data encoding and user generation of scenario data St7 are executed simultaneously, i.e., when encoding immediately follows editing, time Td is required to determine the content of the multimedia source data editing process based on the scenario data St7 as will be described further below. As a result, the multimedia source data must be delayed by time Td to synchronize the editing process during the actual encoding operation. Because this delay time Td is limited to the time required to synchronize the operation of the various system components in the case of sequential editing as described above, the source stream buffer is normally achieved by means of a high speed storage medium such as semiconductor memory.

During batch editing in which all multimedia source data is encoded at once ("batch encoded") after scenario data St7 is generated for the complete title, delay time Td must be long enough to process the complete title or longer. In this case, the source stream buffer may be a low speed, high capacity storage medium such as video tape, magnetic disk, or optical disk.

The structure (type) of media used for the source stream buffer may therefore be determined according to the delay time Td required and the allowable manufacturing cost.

The encoding system controller 200 is connected to the scenario editor 100 and receives the scenario data St7 therefrom. Based on the time-base position and length information of the edit segment contained in the scenario data St7, the encoding system controller 200 generates the encoding parameter signals St9, St11, and St13 for encoding the edit segment of the multimedia source data. The encoding signals St9, St11, and St13 supply the parameters used for video, sub-picture, and audio encoding, including the encoding start and end timing. Note that multimedia source data St1, St3, and St5 are output after delay time Td by the source stream buffer, and are therefore synchronized to encoding parameter signals St9, St11, and St13.

More specifically, encoding parameter signal St9 is the video encoding signal specifying the encoding timing of video stream St1 to extract the encoding segment from the video stream St1 and generate the video encoding unit. Encoding parameter signal St11 is likewise the sub-picture stream encoding signal used to generate the sub-picture encoding unit by specifying the encoding timing for sub-picture stream St3. Encoding parameter signal St13 is the audio encoding signal used to generate the audio encoding unit by specifying the encoding timing for audio stream St5.

Based on the time-base relationship between the encoding segments of streams St1, St3, and St5 in the multimedia source data contained in scenario data St7, the encoding system controller 200 generates the timing signals St21, St23, and St25 arranging the encoded multimedia-encoded stream in the specified time-base relationship.

The encoding system controller 200 also generates the reproduction time information IT defining the reproduction time of the title editing unit (video object, VOB), and the stream encoding data St33 defining the system encode parameters for multiplexing the encoded multimedia stream containing video, audio, and sub-picture data. Note that the reproduction time information IT and stream encoding data St33 are generated for the video object VOB of each title in one video zone VZ.

The encoding system controller 200 also generates the title sequence control signal St39, which declares the formatting parameters for formatting the title editing units VOB of each of the streams in a particular time-base relationship as a multimedia bitstream. More specifically, the title sequence control signal St39 is used to control the connections between the title editing units (VOB) of each title in the multimedia bitstream MBS, or to control the sequence of the interleaved title editing unit (VOBs) interleaving the title editing units VOB of plural reproduction paths.

The video encoder 300 is connected to the source stream buffer of the scenario editor 100 and to the encoding system controller 200, and receives therefrom the video stream St1 and video encoding parameter signal St9, respectively. Encoding parameters supplied by the video encoding signal St9 include the encoding start and end timing, bit rate, the encoding conditions for the encoding start and end, and the material type. Possible material types include NTSC or PAL video signal, and telecine converted material. Based on the video encoding parameter signal St9, the video encoder 300 encodes a specific part of the video stream St1 to generate the encoded video stream St15.

The sub-picture encoder 500 is similarly connected to the source stream buffer of the scenario editor 100 and to the encoding system controller 200, and receives therefrom the sub-picture stream St3 and sub-picture encoding parameter signal St11, respectively. Based on the sub-picture encoding parameter signal St11, the sub-picture encoder 500 encodes a specific part of the sub-picture stream St3 to generate the encoded sub-picture stream St17.

The audio encoder 700 is also connected to the source stream buffer of the scenario editor 100 and to the encoding system controller 200, and receives therefrom the audio stream St5 and audio encoding parameter signal St13, which supplies the encoding start and end timing. Based on the audio encoding parameter signal St13, the audio encoder 700 encodes a specific part of the audio stream St5 to generate the encoded audio stream St19.

The video stream buffer 400 is connected to the video encoder 300 and to the encoding system controller 200. The video stream buffer 400 stores the encoded video stream St15 input from the video encoder 300, and outputs the stored encoded video stream St15 as the time-delayed encoded video stream St27 based on the timing signal St21 supplied from the encoding system controller 200.

The sub-picture stream buffer 600 is similarly connected to the sub-picture encoder 500 and to the encoding system controller 200. The sub-picture stream buffer 600 stores the encoded sub-picture stream St17 output from the sub-picture encoder 500, and then outputs the stored encoded sub-picture stream St17 as time-delayed encoded sub-picture stream St29 based on the timing signal St23 supplied from the encoding system controller 200.

The audio stream buffer 800 is similarly connected to the audio encoder 700 and to the encoding system controller 200. The audio stream buffer 800 stores the encoded audio stream St19 input from the audio encoder 700, and then outputs the encoded audio stream St19 as the time-delayed encoded audio stream St31 based on the timing signal St25 supplied from the encoding system controller 200.

The system encoder 900 is connected to the video stream buffer 400, sub-picture stream buffer 600, audio stream buffer 800, and the encoding system controller 200, and is respectively supplied thereby with the time-delayed encoded video stream St27, time-delayed encoded sub-picture stream St29, time-delayed encoded audio stream St31, and the stream encoding data St33. Note that the system encoder 900 is a multiplexer that multiplexes the time-delayed streams St27, St29, and St31 based on the stream encoding data St33 (timing signal) to generate title editing unit (VOB) St35. The stream encoding data St33 contains the system encoding parameters, including the encoding start and end timing.

The video zone formatter 1300 is connected to the system encoder 900 and the encoding system controller 200 from which the title editing unit (VOB) St35 and title sequence control signal St39 (timing signal) are respectively supplied. The title sequence control signal St39 contains the formatting start and end timing, and the formatting parameters used to generate (format) a multimedia bitstream MBS. The video zone formatter 1300 rearranges the title editing units (VOB) St35 in one video zone VZ in the scenario sequence defined by the user based on the title sequence control signal St39 to generate the edited multimedia stream data St43.

The multimedia bitstream MBS St43 edited according to the user-defined scenario is then sent to the recorder 1200. The recorder 1200 processes the edited multimedia stream data St43 to the data stream St45 format of the recording medium M, and thus records the formatted data stream St45 to the recording medium M. Note that the multimedia bitstream MBS recorded to the recording medium M contains the volume file structure VFS, which includes the physical address of the data on the recording medium generated by the video zone formatter 1300.

Note that the encoded multimedia bitstream MBS St35 may be output directly to the decoder to immediately reproduce the edited title content. It will be obvious that the output multimedia bitstream MBS will not in this case contain the volume file structure VFS.

Authoring Decoder

A preferred embodiment of the authoring decoder DC used to decode the multimedia bitstream MBS edited by the authoring encoder EC of the present invention, and thereby reproduce the content of each title unit according to the user-defined scenario, is described next below with reference to FIG. 3. Note that in the preferred embodiment described below the multimedia bitstream St45 encoded by the authoring encoder EC is recorded to the recording medium M.

Figure 3:
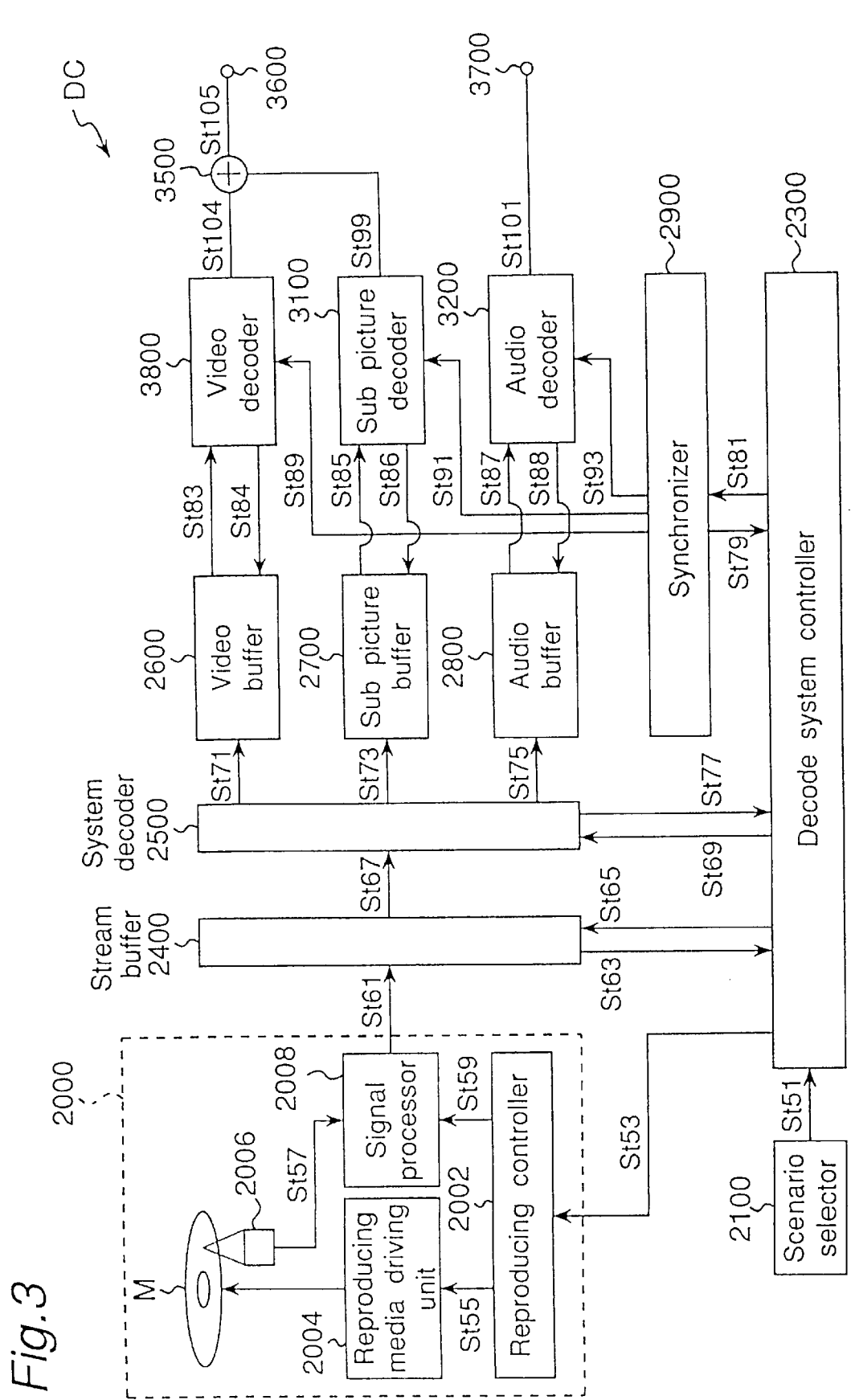
FIG. 3 is a block diagram showing an authoring decoder according to the present invention.

As shown in FIG. 3, the authoring decoder DC comprises a multimedia bitstream producer 2000, scenario selector 2100, decoding system controller 2300, stream buffer 2400, system decoder 2500, video buffer 2600, sub-picture buffer 2700, audio buffer 2800, synchronizer 2900, video decoder 3800, sub-picture decoder 3100, audio decoder 3200, synthesizer 3500, video data output terminal 3600, and audio data output terminal 3700.

The bitstream producer 2000 comprises a recording media drive unit 2004 for driving the recording medium M; a reading head 2006 for reading the information recorded to the recording medium M and producing the binary read signal St57; a signal processor 2008 for variously processing the read signal St57 to generate the reproduced bitstream St61; and a reproduction controller 2002.

The reproduction controller 2002 is connected to the decoding system controller 2300 from which the multimedia bitstream reproduction control signal St53 is supplied, and in turn generates the reproduction control signals St55 and St59 respectively controlling the recording media drive unit (motor) 2004 and signal processor 2008.

So that the user-defined video, sub-picture, and audio portions of the multimedia title edited by the authoring encoder EC are reproduced, the authoring decoder DC comprises a scenario selector 2100 for selecting and reproducing the corresponding scenes (titles). The scenario selector 2100 then outputs the selected titles as scenario data to the authoring decoder DC.

The scenario selector 2100 preferably comprises a keyboard, CPU, and monitor. Using the keyboard, the user then inputs the desired scenario based on the content of the scenario input by the authoring encoder EC. Based on the keyboard input, the CPU generates the scenario selection data St51 specifying the selected scenario. The scenario selector 2100 is connected by an infrared communications device, for example, to the decoding system controller 2300, to which it inputs the scenario selection data St51.

Based on the scenario selection data St51, the decoding system controller 2300 then generates the bitstream reproduction control signal St53 controlling the operation of the bitstream producer 2000.

The stream buffer 2400 has a specific buffer capacity used to temporarily store the reproduced bitstream St61 input from the bitstream producer 2000, extract the address information and initial synchronization data SCR (system clock reference) for each stream, and generate bitstream control data St63. The stream buffer 2400 is also connected to the decoding system controller 2300, to which it supplies the generated bitstream control data St63.

The synchronizer 2900 is connected to the decoding system controller 2300 from which it receives the system clock reference SCR contained in the synchronization control data St81 to set the internal system clock STC and supply the reset system clock St79 to the decoding system controller 2300.

Based on this system clock St79, the decoding system controller 2300 also generates the stream read signal St65 at a specific interval and outputs the read signal St65 to the stream buffer 2400.

Based on the supplied read signal St65, the stream buffer 2400 outputs the reproduced bitstream St61 at a specific interval to the system decoder 2500 as bitstream St67.

Based on the scenario selection data St51, the decoding system controller 2300 generates the decoding signal St69 defining the stream Ids for the video, sub-picture, and audio bitstreams corresponding to the selected scenario, and outputs to the system decoder 2500.

Based on the instructions contained in the decoding signal St69, the system decoder 2500 respectively outputs the video, sub-picture, and audio bitstreams input from the stream buffer 2400 to the video buffer 2600, sub-picture buffer 2700, and audio buffer 2800 as the encoded video stream St71, encoded sub-picture stream St73, and encoded audio stream St75.

The system decoder 2500 detects the presentation time stamp PTS and decoding time stamp DTS of the smallest control unit in each bitstream St67 to generate the time information signal St77. This time information signal St77 is supplied to the synchronizer 2900 through the decoding system controller 2300 as the synchronization control data St81.

Based on this synchronization control data St81, the synchronizer 2900 determines the decoding start timing whereby each of the bitstreams will be arranged in the correct sequence after decoding, and then generates and inputs the video stream decoding start signal St89 to the video decoder 3800 based on this decoding timing. The synchronizer 2900 also generates and supplies the sub-picture decoding start signal St91 and audio stream decoding start signal St93 to the sub-picture decoder 3100 and audio decoder 3200, respectively.

The video decoder 3800 generates the video output request signal St84 based on the video stream decoding start signal St89, and outputs to the video buffer 2600. In response to the video output request signal St84, the video buffer 2600 outputs the video stream St83 to the video decoder 3800. The video decoder 3800 thus detects the presentation time information contained in the video stream St83, and disables the video output request signal St84 when the length of the received video stream St83 is equivalent to the specified presentation time. A video stream equal in length to the specified presentation time is thus decoded by the video decoder 3800, which outputs the reproduced video signal St104 to the synthesizer 3500.

The sub-picture decoder 3100 similarly generates the sub-picture output request signal St86 based on the sub-picture decoding start signal St91, and outputs to the sub-picture buffer 2700. In response to the sub-picture output request signal St86, the sub-picture buffer 2700 outputs the sub-picture stream St85 to the sub-picture decoder 3100. Based on the presentation time information contained in the sub-picture stream St85, the sub-picture decoder 3100 decodes a length of the sub-picture stream St85 corresponding to the specified presentation time to reproduce and supply to the synthesizer 3500 the sub-picture signal St99.

The synthesizer 3500 superimposes the video signal St104 and sub-picture signal St99 to generate and output the multi-picture video signal St105 to the video data output terminal 3600.

The audio decoder 3200 generates and supplies to the audio buffer 2800 the audio output request signal St88 based on the audio stream decoding start signal St93. The audio buffer 2800 thus outputs the audio stream St87 to the audio decoder 3200. The audio decoder 3200 decodes a length of the audio stream St87 corresponding to the specified presentation time based on the presentation time information contained in the audio stream St87, and outputs the decoded audio stream St101 to the audio data output terminal 3700.

It is thus possible to reproduce a user-defined multimedia bitstream MBS in real-time according to a user-defined scenario. More specifically, each time the user selects a different scenario, the authoring decoder DC is able to reproduce the title content desired by the user in the desired sequence by reproducing the multimedia bitstream MBS corresponding to the selected scenario.

It is therefore possible by means of the authoring system of the present invention to generate a multimedia bitstream according to plural user-defined scenarios by real-time or batch encoding multimedia source data in a manner whereby the substreams of the smallest editing units (scenes), which can be divided into plural substreams, expressing the basic title content are arranged in a specific time-base relationship.

The multimedia bitstream thus encoded can then be reproduced according to the one scenario selected from among plural possible scenarios. It is also possible to change scenarios while playback is in progress, i.e., to select a different scenario and dynamically generate a new multimedia bitstream according to the most recently selected scenario. It is also possible to dynamically select and reproduce any of plural scenes while reproducing the title content according to a desired scenario.

It is therefore possible by means of the authoring system of the present invention to encode and not only reproduce but to repeatedly reproduce a multimedia bitstream MBS in real-time.

Details of the authoring system are disclosed in the Japanese Patent Application filed Sep. 27, 1996, and entitled and assigned to the same assignee as the present application.

Digital Video Disk (DVD)

Figure 4:
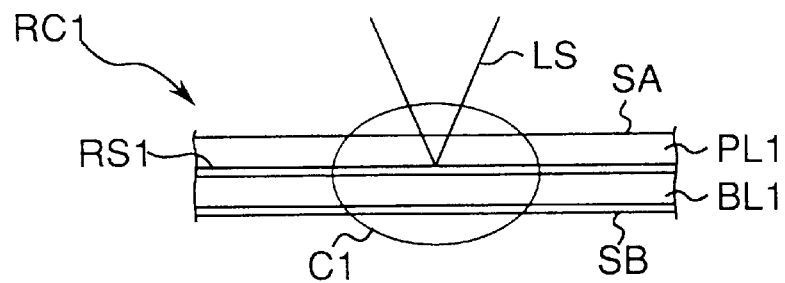
FIG. 4 is a side view of an optical disk storing the multi media bit stream of FIG. 1.

An example of a digital video disk (DVD) with only one recording surface (a single-sided DVD) is shown in FIG. 4.

The DVD recording medium RC1 in the preferred embodiment of the invention comprises a data recording surface RS1 to and from which data is written and read by emitting laser beam LS, and a protective layer PL1 covering the data recording surface RS1. A backing layer BL1 is also provided on the back of data recording surface RS1. The side of the disk on which protective layer PL1 is provided is therefore referred to below as side SA (commonly "side A"), and the opposite side (on which the backing layer BL1 is provided) is referred to as side SB ("side B"). Note that digital video disk recording media having a single data recording surface RS1 on only one side such as this DVD recording medium RC1 is commonly called a single-sided single layer disk.

Figure 5:
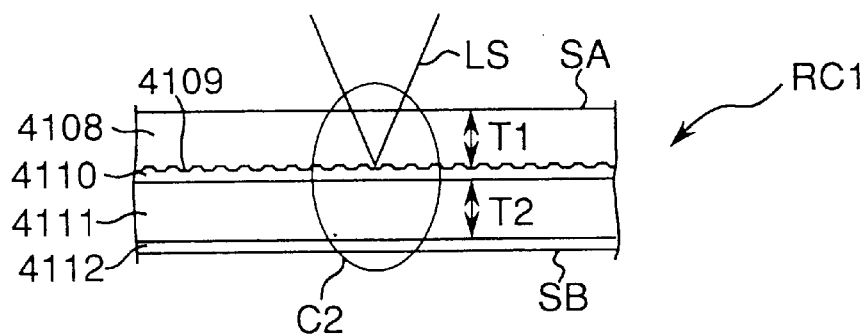
FIG. 5 is an enlarged view showing a portion confined by a circle of FIG. 4.

A detailed illustration of area C1 in FIG. 4 is shown in FIG. 5. Note that the data recording surface RS1 is formed by applying a metallic thin film or other reflective coating as a data layer 4109 on a first transparent layer 4108 having a particular thickness T1. This first transparent layer 4108 also functions as the protective layer PL1. A second transparent substrate 4111 of a thickness T2 functions as the backing layer BL1, and is bonded to the first transparent layer 4108 by means of an adhesive layer 4110 disposed therebetween.

A printing layer 4112 for printing a disk label may also be disposed on the second transparent substrate 4111 as necessary. The printing layer 4112 does not usually cover the entire surface area of the second transparent substrate 4111 (backing layer BL1), but only the area needed to print the text and graphics of the disk label. The area of second transparent substrate 4111 to which the printing layer 4112 is not formed may be left exposed. Light reflected from the data layer 4109 (metallic thin film) forming the data recording surface RS1 can therefore be directly observed where the label is not printed when the digital video disk is viewed from side SB. As a result, the background looks like a silver-white over which the printed text and graphics float when the metallic thin film is an aluminum thin film, for example.

Note that it is only necessary to provide the printing layer 4112 where needed for printing, and it is not necessary to provide the printing layer 4112 over the entire surface of the backing layer BL1.

Figure 6:
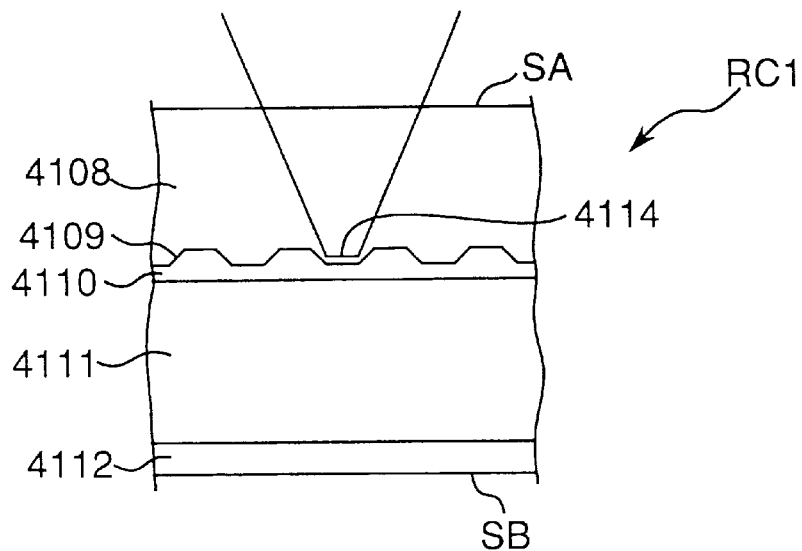
FIG. 6 is an enlarged view showing a portion confined by a circle of FIG. 5.

A detailed illustration of area C2 in FIG. 5 is shown in FIG. 6. Pits and lands are molded to the common contact surface between the first transparent layer 4108 and the data layer 4109 on side SA from which data is read by emitting a laser beam LS, and data is recorded by varying the lengths of the pits and lands (i.e., the length of the intervals between the pits). More specifically, the pit and land configuration formed on the first transparent layer 4108 is transferred to the data layer 4109. The lengths of the pits and lands is shorter, and the pitch of the data tracks formed by the pit sequences is narrower, than with a conventional Compact Disc (CD). The surface recording density is therefore greatly improved.

Side SA of the first transparent layer 4108 on which data pits are not formed is a flat surface. The second transparent substrate 4111 is for reinforcement, and is a transparent panel made from the same material as the first transparent layer 4108 with both sides flat. Thicknesses T1 and T2 are preferably equal and commonly approximately 0.6 mm, but the invention shall not be so limited.

As with a CD, information is read by irradiating the surface with a laser beam LS and detecting the change in the reflectivity of the light spot. Because the objective lens aperture NA can be large and the wavelength 1 of the light beam small in a digital video disk system, the diameter of the light spot Ls used can be reduced to approximately $\frac{1}{1.6}$ the light spot needed to read a CD. Note that this means the resolution of the laser beam LS in the DVD system is approximately 1.6 times the resolution of a conventional CD system.

The optical system used to read data from the digital video disk uses a short 650 nm wavelength red semiconductor laser and an objective lens with a 0.6 mm aperture NA. By thus also reducing the thickness T of the transparent panels to 0.6 mm, more than 5 GB of data can be stored to one side of a 120 mm diameter optical disk.

It is therefore possible to store motion picture (video) images having an extremely large per unit data size to a digital video disk system disk without losing image quality because the storage capacity of a single-sided, single-layer recording medium RC1 with one data recording surface RS1 as thus described is nearly ten times the storage capacity of a conventional CD. As a result, while the video presentation time of a conventional CD system is approximately 74 minutes if image quality is sacrificed, high quality video images with a video presentation time exceeding two hours can be recorded to a DVD.

The digital video disk is therefore well-suited as a recording medium for video images.

A digital video disk recording medium with plural recording surfaces RS as described above is shown in FIGS. 7 and 8. The DVD recording medium RC2 shown in FIG. 7 comprises two recording surfaces, i.e., first recording surface RS1 and semi-transparent second recording surface RS2, on the same side, i.e. side SA, of the disk. Data can be simultaneously recorded or reproduced from these two recording surfaces by using different laser beams LS1 and LS2 for the first recording surface RS1 and the second recording surface RS2. It is also possible to read/write both recording surfaces RS1 and RS2 using only one of the laser beams LS1 or LS2. Note that recording media thus comprised are called "single-side, dual-layer disks."

It should also be noted that while two recording surfaces RS1 and RS2 are provided in this example, it is also possible to produce digital video disk recording media having more than two recording surfaces RS. Disks thus comprised are known as "single-sided, multi-layer disks."

Figure 7:
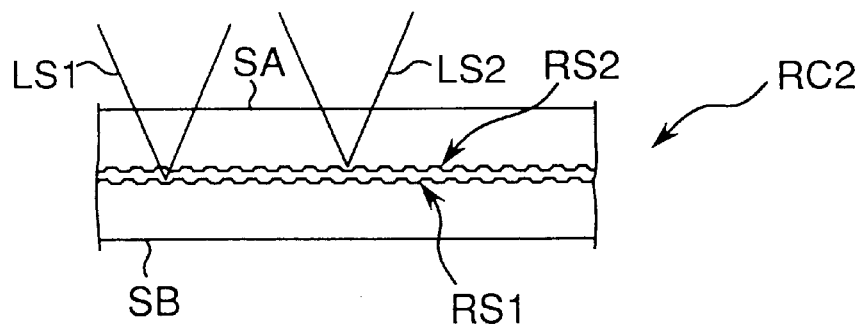
FIG. 7 is a side view showing a variation of the optical disk of FIG. 4.
Figure 8:
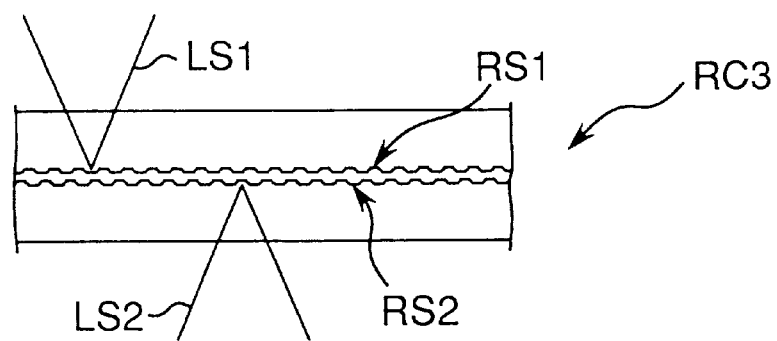
FIG. 8 is a side view showing another variation of the optical disk of FIG. 4.

Though comprising two recording surfaces similarly to the recording media shown in FIG. 7, the DVD recording medium RC3 shown in FIG. 8 has the recording surfaces on opposite sides of the disk, i.e., has the first data recording surface RS1 on side SA and the second data recording surface RS2 on side SB. It will also be obvious that while only two recording surfaces are shown on one digital video disk in this example, more than two recording surfaces may also be formed on a double-sided digital video disk. As with the recording medium shown in FIG. 7, it is also possible to provide two separate laser beams LS1 and LS2 for recording surfaces RS1 and RS2, or to read/write both recording surfaces RS1 and RS2 using a single laser beam. Note that this type of digital video disk is called a "double-sided, dual-layer disk." It will also be obvious that a double-sided digital video disk can be comprised with two or more recording surfaces per side. This type of disk is called a "double-sided, multi-layer disk."

Figure 9:
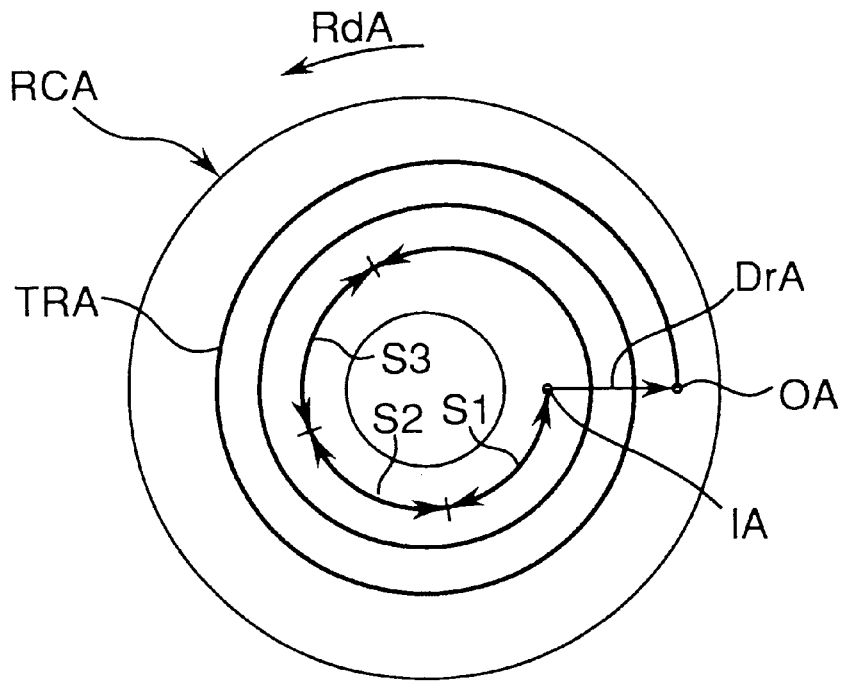
FIG. 9 is a plan view showing one example of track path formed on the recording surface of the optical disk of FIG. 4.
Figure 10:
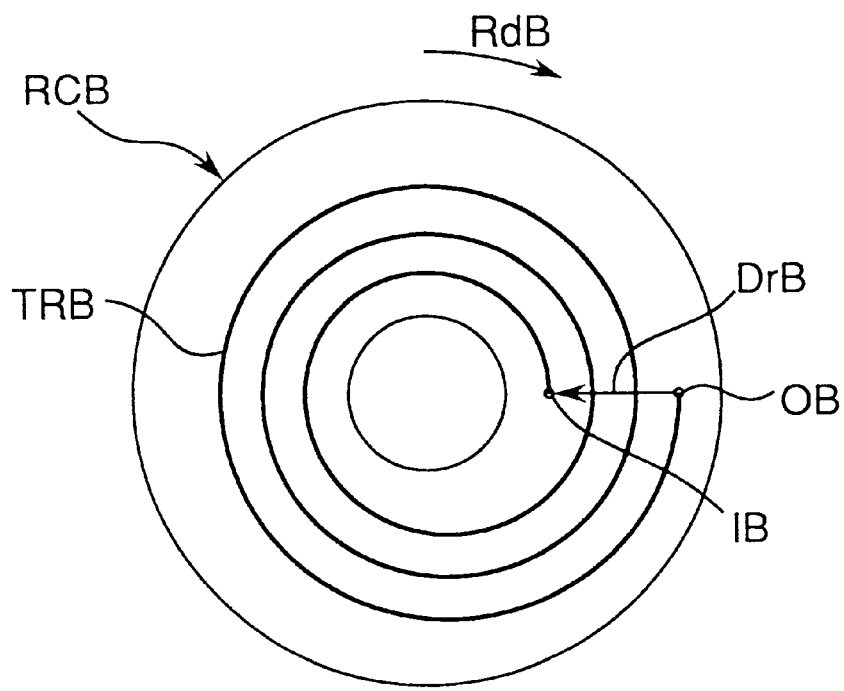
FIG. 10 is a plan view showing another example of track path formed on the recording surface of the optical disk of FIG. 4.

A plan view from the laser beam LS irradiation side of the recording surface RS of the DVD recording medium RC is shown in FIG. 9 and FIG. 10. Note that a continuous spiral data recording track TR is provided from the inside circumference to the outside circumference of the DVD. The data recording track TR is divided into plural sectors each having the same known storage capacity. Note that for simplicity only the data recording track TR is shown in FIG. 9 with more than three sectors per revolution.

As shown in FIG. 9, the data recording track TR is normally formed clockwise inside to outside (see arrow DrA) from the inside end point IA at the inside circumference of disk RCA to the outside end point OA at the outside circumference of the disk with the disk RCA rotating counterclockwise RdA. This type of disk RCA is called a clockwise disk, and the recording track formed thereon is called a clockwise track TRA.

Depending upon the application, the recording track TRB may be formed clockwise from outside to inside circumference (see arrow DrB in FIG. 10) from the outside end point OB at the outside circumference of disk RCB to the inside end point IB at the inside circumference of the disk with the disk RCB rotating clockwise RdB. Because the recording track appears to wind counterclockwise when viewed from the inside circumference to the outside circumference on disks with the recording track formed in the direction of arrow DrB, these disks are referred to as counterclockwise disk RCB with counterclockwise track TRB to distinguish them from disk RCA in FIG. 9. Note that track directions DrA and DrB are the track paths along which the laser beam travels when scanning the tracks for recording and playback. Direction of disk rotation RdA in which disk RCA turns is thus opposite the direction of track path DrA, and direction of disk rotation RdB in which disk RCB turns is thus opposite the direction of track path DrB.

Figure 11:
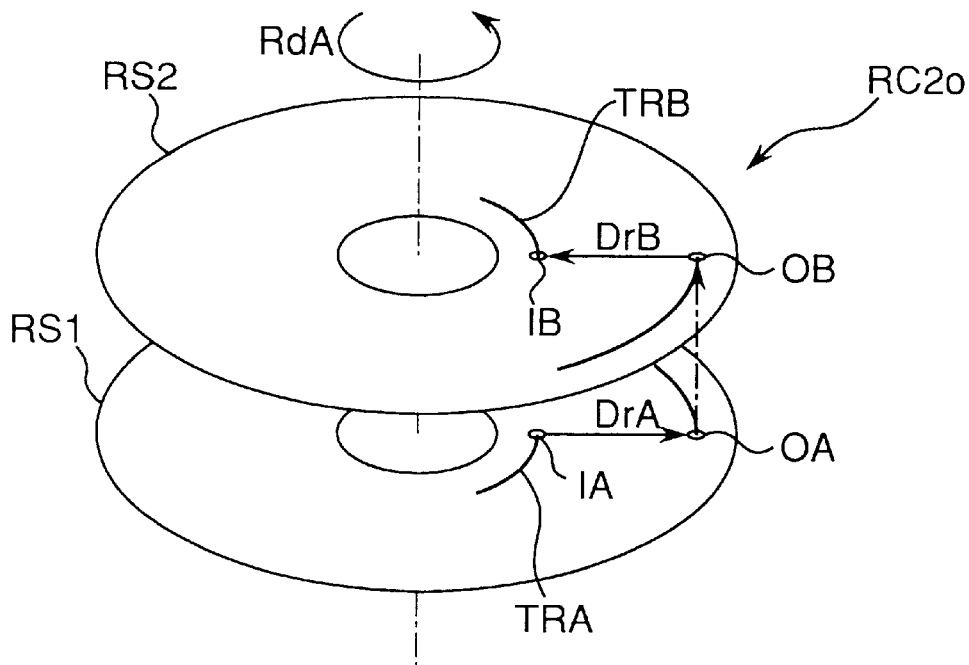
FIG. 11 is a diagonal view schematically showing one example of a track path pattern formed on the optical disk of FIG. 7.

An exploded view of the single-sided, dual-layer disk RC2 shown in FIG. 7 is shown as disk RC2o in FIG. 11. Note that the recording tracks formed on the two recording surfaces run in opposite directions. Specifically, a clockwise recording track TRA as shown in FIG. 9 is formed in clockwise direction DrA on the (lower) first data recording surface RS1, and a counterclockwise recording track TRB formed in counterclockwise direction DrB as shown in FIG. 10 is provided on the (upper) second data recording surface RS2. As a result, the outside end points OA and OB of the first and second (top and bottom) tracks are at the same radial position relative to the center axis of the disk RC2o. Note that track paths DrA and DrB of tracks TR are also the data read/write directions to disk RC. The first and second (top and bottom) recording tracks thus wind opposite each other with this disk RC, i.e., the track paths DrA and DrB of the top and bottom recording layers are opposite track paths.

Opposite track path type, single-sided, dual-layer disks RC2o rotate in direction RdA corresponding to the first recording surface RS1 with the laser beam LS traveling along track path DrA to trace the recording track on the first recording surface RS1. When the laser beam LS reaches the outside end point OA, the laser beam LS can be refocused to end point OB on the second recording surface RS2 to continue tracing the recording track from the first to the second recording surface uninterrupted. The physical distance between the recording tracks TRA and TRB on the first and second recording surfaces RS1 and RS2 can thus be instantaneously eliminated by simply adjusting the focus of the laser beam LS.

It is therefore possible with an opposite track path type, single-sided, dual-layer disk RC2o to easily process the recording tracks disposed to physically discrete top and bottom recording surfaces as a single continuous recording track. It is therefore also possible in an authoring system as described above with reference to FIG. 1 to continuously record the multimedia bitstream MBS that is the largest multimedia data management unit to two discrete recording surfaces RS1 and RS2 on a single recording medium RC2o.

It should be noted that the tracks on recording surfaces RS1 and RS2 can be wound in the directions opposite those described above, i.e., the counterclockwise track TRB may be provided on the first recording surface RS1 and the clockwise track TRA on the second recording surface RS2. In this case the direction of disk rotation is also changed to a clockwise rotation RdB, thereby enabling the two recording surfaces to be used as comprising a single continuous recording track as described above. For simplification, a further example of this type of disk is therefore neither shown nor described below.

It is therefore possible by thus constructing the digital video disk to record the multimedia bitstream MBS for a feature-length title to a single opposite track path type, single-sided, dual-layer disk RC2o. Note that this type of digital video disk medium is called a single-sided dual-layer disk with opposite track paths.

Figure 12:
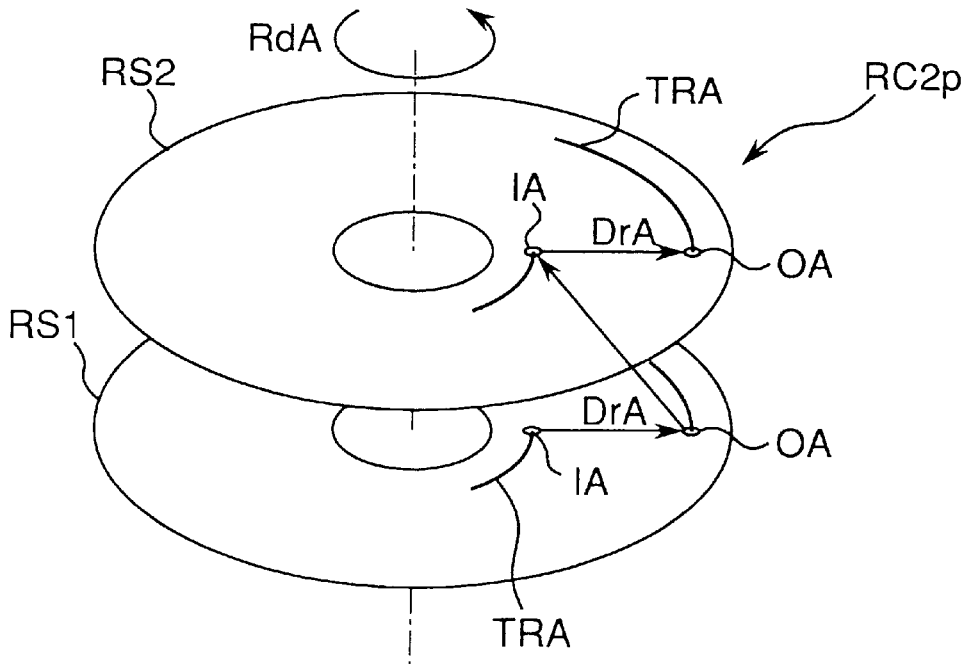
FIG. 12 is a plan view showing another example of track path formed on the recording surface of the optical disk of FIG. 7.

Another example of the single-sided, dual-layer DVD recording medium RC2 shown in FIG. 7 is shown as disk RC2p in FIG. 12. The recording tracks formed on both first and second recording surfaces RS1 and RS2 are clockwise tracks TRA as shown in FIG. 9. In this case, the single-sided, dual-layer disk RC2p rotates counterclockwise in the direction of arrow RdA, and the direction of laser beam LS travel is the same as the direction of the track spiral, i.e., the track paths of the top and bottom recording surfaces are mutually parallel (parallel track paths). The outside end points OA of both top and bottom tracks are again preferably positioned at the same radial position relative to the center axis of the disk RC2p as described above. As also described above with disk RC2o shown in FIG. 11, the access point can be instantaneously shifted from outside end point OA of track TRA on the first recording surface RS1 to the outside end point OA of track TRA on the second recording surface RS2 by appropriately adjusting the focus of the laser beam LS at outside end point OA.

However, for the laser beam LS to continuously access the clockwise recording track TRA on the second recording surface RS2, the recording medium RC2p must be driven in the opposite direction (clockwise, opposite direction RdA). Depending on the radial position of the laser beam LS, however, it is inefficient to change the rotational direction of the recording medium. As shown by the diagonal arrow in FIG. 12, the laser beam LS is therefore moved from the outside end point OA of the track on the first recording surface RS1 to the inside end point IA of the track on the second recording surface RS2 to use these physically discrete recording tracks as one logically continuous recording track.

Rather than using the recording tracks on top and bottom recording surfaces as one continuous recording track, it is also possible to use the recording tracks to record the multimedia bitstreams MBS for different titles. This type of digital video disk recording medium is called a "single-sided, dual-layer disk with parallel track paths."

Note that if the direction of the tracks formed on the recording surfaces RS1 and RS2 is opposite that described above, i.e., counterclockwise recording tracks TRB are formed, disk operation remains the same as that described above except for the direction of disk rotation, which is clockwise as shown by arrow RdB.

Whether using clockwise or counterclockwise recording tracks, the single-sided, dual-layer disk RC2p with parallel track paths thus described is well-suited to storing on a single disk encyclopedia and similar multimedia bitstreams comprising multiple titles that are frequently and randomly accessed.

Figure 13:
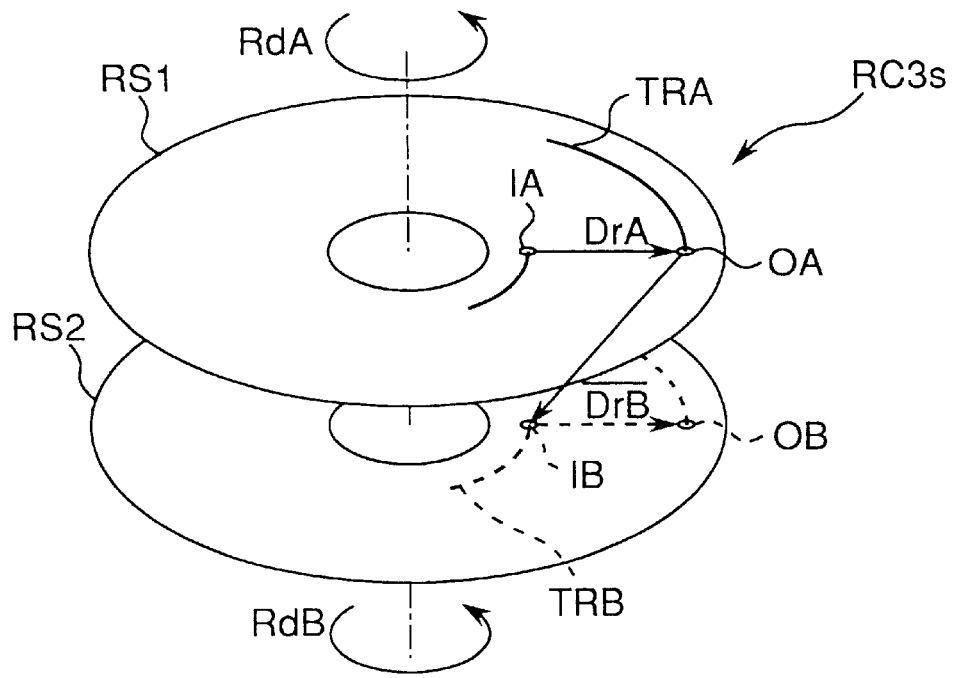
FIG. 13 is a diagonal view schematically showing one example of a track path pattern formed on the optical disk of FIG. 8.

An exploded view of the dual-sided single-layer DVD recording medium RC3 comprising one recording surface layer RS1 and RS2 on each side as shown in FIG. 8 is shown as DVD recording medium RC3s in FIG. 13. Clockwise recording track TRA is provided on the one recording surface RS1, and a counterclockwise recording track TRB is provided on the other recording surface RS2. As in the preceding recording media, the outside end points OA and OB of the recording tracks on each recording surface are preferably positioned at the same radial position relative to the center axis of the DVD recording medium RC3s.

Note that while the recording tracks on these recording surfaces RS1 and RS2 rotate in opposite directions, the track paths are symmetrical. This type of recording medium is therefore known as a double-sided dual layer disk with symmetrical track paths. This double-sided dual layer disk with symmetrical track paths RC3s rotates in direction RdA when reading/writing the first recording surface RS1. As a result, the track path on the second recording surface RS2 on the opposite side is opposite the direction DrB in which the track winds, i.e., direction DrA. Accessing both recording surfaces RS1 and RS2 using a single laser beam LS is therefore not realistic irrespective of whether access is continuous or non-continuous. In addition, a multimedia bitstream MBS is separately recorded to the recording surfaces on the first and second sides of the disk.

Figure 14:
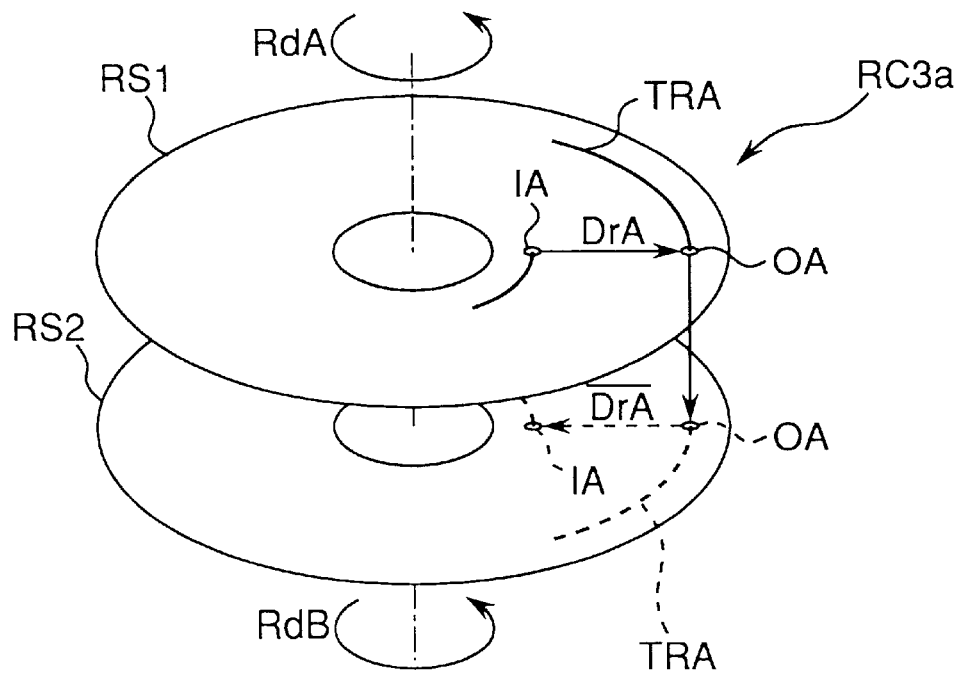
FIG. 14 is a plan view showing another example of track path formed on the recording surface of the optical disk of FIG. 8.

A different example of the double-sided single layer disk RC3 shown in FIG. 8 is shown in FIG. 14 as disk RC3a. Note that this disk comprises clockwise recording tracks TRA as shown in FIG. 9 on both recording surfaces RS1 and RS2. As with the preceding recording media, the outside end points OA and OA of the recording tracks on each recording surface are preferably positioned at the same radial position relative to the center axis of the DVD recording medium RC3a. Unlike the double-sided dual layer disk with symmetrical track paths RC3s described above, the tracks on these recording surfaces RS1 and RS2 are asymmetrical. This type of disk is therefore known as a double-sided dual layer disk with asymmetrical track paths. This double-sided dual layer disk with asymmetrical track paths RC3a rotates in direction RdA when reading/writing the first recording surface RS1. As a result, the track path on the second recording surface RS2 on the opposite side is opposite the direction DrA in which the track winds, i.e., direction DrB.

This means that if a laser beam LS is driven continuously from the inside circumference to the outside circumference on the first recording surface RS1, and then from the outside circumference to the inside circumference on the second recording surface RS2, both sides of the recording medium RC3a can be read/written without turning the disk over and without providing different laser beams for the two sides.

The track paths for recording surfaces RS1 and RS2 are also the same with this double-sided dual layer disk with asymmetrical track paths RC3a. As a result, it is also possible to read/write both sides of the disk without providing separate laser beams for each side if the recording medium RC3a is turned over between sides, and the read/write apparatus can therefore be constructed economically.

It should be noted that this recording medium remains functionally identical even if counterclockwise recording track TRB is provided in place of clockwise recording track TRA on both recording surfaces RS1 and RS2.

As described above, the true value of a DVD system whereby the storage capacity of the recording medium can be easily increased by using a multiple layer recording surface is realized in multimedia applications whereby plural video data units, plural audio data units, and plural graphics data units recorded to a single disk are reproduced through interactive operation by the user.

It is therefore possible to achieve one long-standing desire of software (programming) providers, specifically, to provide programming content such as a commercial movie on a single recording medium in plural versions for different language and demographic groups while retaining the image quality of the original.

Parental Control

Content providers of movie and video titles have conventionally had to produce, supply, and manage the inventory of individual titles in multiple languages, typically the language of each distribution market, and multi-rated title packages conforming to the parental control (censorship) regulations of individual countries in Europe and North America. The time and resources required for this are significant. While high image quality is obviously important, the programming content must also be consistently reproducible.

The digital video disk recording medium is close to solving these problems.

Multiple Angles

One interactive operation widely sought in multimedia applications today is for the user to be able to change the position from which a scene is viewed during reproduction of that scene. This capability is achieved by means of the multiple angle function.

This multiple angle function makes possible applications whereby, for example, a user can watch a baseball game from different angles (or virtual positions in the stadium), and can freely switch between the views while viewing is in progress. In this example of a baseball game, the available angles may include a position behind the backstop centered on the catcher, batter, and pitcher; one from behind the backstop centered on a fielder, the pitcher, and the catcher; and one from center field showing the view to the pitcher and catcher.

To meet these requirements, the digital video disk system uses MPEG, the same basic standard format used with Video-Cds to record the video, audio, graphics, and other signal data. Because of the differences in storage capacity, transfer rates, and signal processing performance within the reproduction apparatus, DVD uses MPEG2, the compression method and data format of which differ slightly from the MPEG1 format used with Video-Cds.

It should be noted that the content of and differences between the MPEG1 and MPEG2 standards have no direct relationship to the intent of the present invention, and further description is therefore omitted below (for more information, see MPEG specifications ISO-11172 and ISO-13818).

The data structure of the DVD system according to the present invention is described in detail below with reference to FIGS. 16, 17, 18, 19, 20, and 21.

Multi-scene Control

A fully functional and practical parental lock playback function and multi-angle scene playback function must enable the user to modify the system output in minor, subtle ways while still presenting substantially the same video and audio output. If these functions are achieved by preparing and recording separate titles satisfying each of the many possible parental lock and multi-angle scene playback requests, titles that are substantially identical and differ in only minor ways must be recorded to the recording medium. This results in identical data being repeatedly recorded to the larger part of the recording medium, and significantly reduces the utilization efficiency of the available storage capacity. More particularly, it is virtually impossible to record discrete titles satisfying every possible request even using the massive capacity of the digital video disk medium. While it may be concluded that this problem can be easily solved by increasing the capacity of the recording medium, this is an obviously undesirable solution when the effective use of available system resources is considered.

Using multi-scene control, the concept of which is described in another section below, in a DVD system, it is possible to dynamically construct titles for numerous variations of the same basic content using the smallest possible amount of data, and thereby effectively utilize the available system resources (recording medium). More specifically, titles that can be played back with numerous variations are constructed from basic (common) scene periods containing data common to each title, and multi-scene periods comprising groups of different scenes corresponding to the various requests. During reproduction, the user is able to freely and at any time select particular scenes from the multi-scene periods to dynamically construct a title conforming to the desired content, e.g., a title omitting certain scenes using the parental lock control function.

Note that multi-scene control enabling a parental lock playback control function and multi-angle scene playback is described in another section below with reference to FIG. 21.

Data Structure of the DVD System

Figure 22:
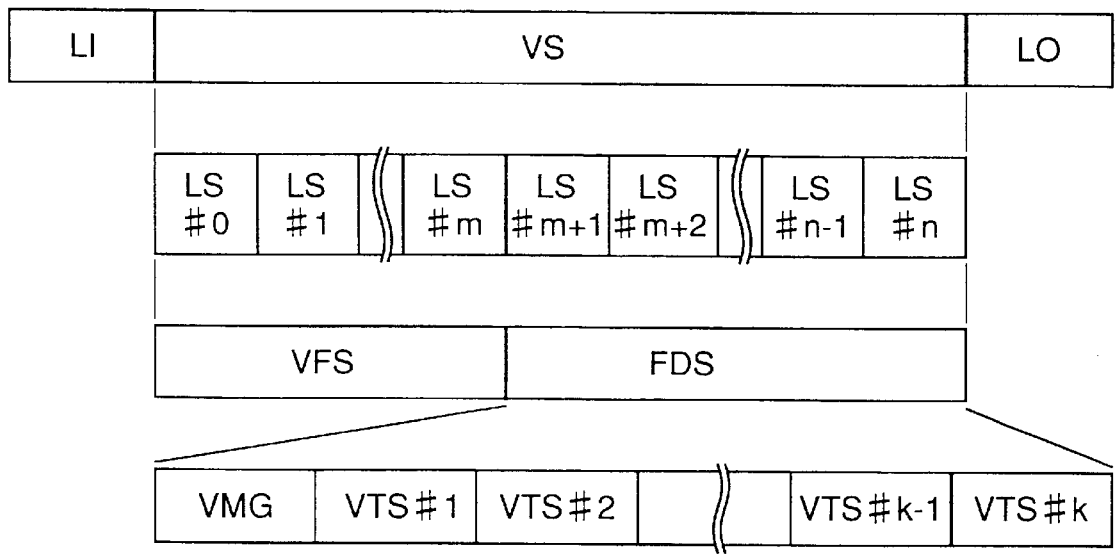
FIG. 22 is a graph schematically showing the data structure used in a digital video disk system according to the present invention.

The data structure used in the authoring system of a digital video disk system according to the present invention is shown in FIG. 22. To record a multimedia bitstream MBS, this digital video disk system divides the recording medium into three major recording areas, the lead-in area LI, the volume space VS, and the lead-out area LO.

The lead-in area LI is provided at the inside circumference area of the optical disk. In the disks described with reference to FIGS. 9 and 10, the lead-in area LI is positioned at the inside end points IA and IB of each track. Data for stabilizing the operation of the reproducing apparatus when reading starts is written to the lead-in area LI.

The lead-out area LO is correspondingly located at the outside circumference of the optical disk, i.e., at outside end points OA and OB of each track in the disks described with reference to FIGS. 9 and 10. Data identifying the end of the volume space VS is recorded in this lead-out area LO.

The volume space VS is located between the lead-in area LI and lead-out area LO, and is recorded as a one-dimensional array of n+1 (where n is an integer greater than or equal to zero) 2048-byte logic sectors LS. The logic sectors LS are sequentially number #0, #1, #2, . . . #n. The volume space VS is also divided into a volume and file structure management area VFS and a file data structure area FDS.

The volume and file structure management area VFS comprises m+1 logic sectors LS#0 to LS#m (where m is an integer greater than or equal to zero and less than n. The file data structure FDS comprises n−m logic sectors LS #m+1 to LS #n.

Figure 1:
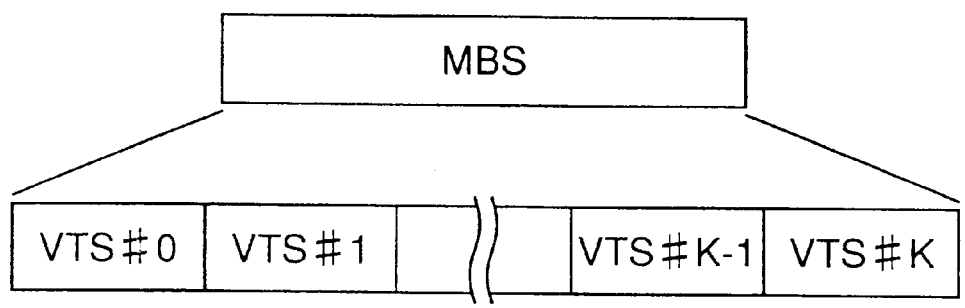
FIG. 1 is a graph schematically showing a structure of multi media bit stream according to the present invention.

Note that this file data structure area FDS corresponds to the multimedia bitstream MBS shown in FIG. 1 and described above.

The volume file structure VFS is the file system for managing the data stored to the volume space VS as files, and is divided into logic sectors LS#0–LS#m where m is the number of sectors required to store all data needed to manage the entire disk, and is a natural number less than n. Information for the files stored to the file data structure area FDS is written to the volume file structure VFS according to a known specification such as ISO-9660 or ISO-13346.

The file data structure area FDS comprises n−m logic sectors LS#m–LS#n, each comprising a video manager VMG sized to an integer multiple of the logic sector (2048×I, where I is a known integer), and k video title sets VTS #1–VTS#k (where k is a natural number less than 100).

The video manager VMG stores the title management information for the entire disk, and information for building a volume menu used to set and change reproduction control of the entire volume.

Any video title set VTS #k is also called a "video file" representing a title comprising video, audio, and/or still image data.

Figure 16:
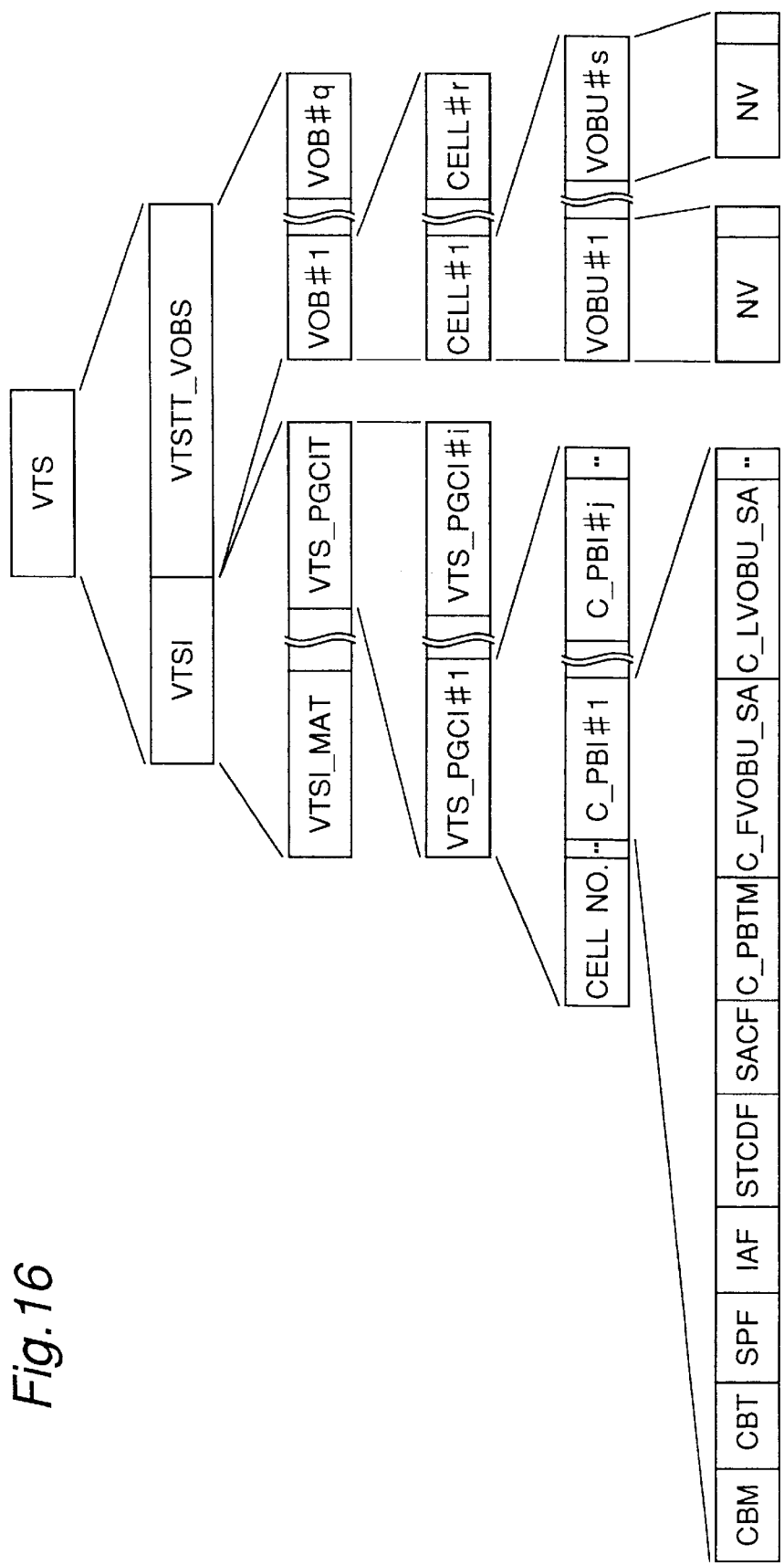
FIG. 16 is a graph schematically showing the structure of multimedia bit stream for use in Digital Video Disk system according to the present invention.

The internal structure of each video title set VTS shown in FIG. 22 is shown in FIG. 16. Each video title set VTS comprises VTS information VTSI describing the management information for the entire disk, and the VTS title video objects VOB (VTSTT_VOBS), i.e., the system stream of the multimedia bitstream. The VTS information VTSI is described first below, followed by the VTS title VOBS.

The VTS information primarily includes the VTSI management table VTSI_MAT and VTSPGC information table VTS_PGCIT.

The VTSI management table VTSI_MAT stores such information as the internal structure of the video title set VTS, the number of selectable audio streams contained in the video title set VTS, the number of sub-pictures, and the video title set VTS location (storage address).

The VTSPGC information table VTS_PGCIT records i (where i is a natural number) program chain (PGC) data blocks VTS_PGCI #1–VTS_PGCI #i for controlling the playback sequence. Each of the table entries VTS_PGCI #i is a data entry expressing the program chain, and comprises j (where j is a natural number) cell playback information blocks C_PBI #1–C_PBI #j. Each cell playback information block C_PBI #j contains the playback sequence of the cell and playback control information.

The program chain PGC is a conceptual structure describing the story of the title content, and therefore defines the structure of each title by describing the cell playback sequence. Note that these cells are described in detail below.

If, for example, the video title set information relates to the menus, the video title set information VTSI is stored to a buffer in the playback device when playback starts. If the user then presses a MENU button on a remote control device, for example, during playback, the playback device references the buffer to fetch the menu information and display the top menu #1. If the menus are hierarchical, the main menu stored as program chain information VTS_PGCI #1 may be displayed, for example, by pressing the MENU button, VTS_PGCI #2–#9 may correspond to submenus accessed using the numeric keypad on the remote control, and VTS_PGCI #10 and higher may correspond to additional submenus further down the hierarchy. Alternatively, VTS_PGCI #1 may be the top menu displayed by pressing the MENU button, while VTS_PGCI #2 and higher may be voice guidance reproduced by pressing the corresponding numeric key.

The menus themselves are expressed by the plural program chains defined in this table. As a result, the menus may be freely constructed in various ways, and shall not be limited to hierarchical or non-hierarchical menus or menus containing voice guidance.

In the case of a movie, for example, the video title set information VTSI is stored to a buffer in the playback device when playback starts, the playback device references the cell playback sequence described by the program chain PGC, and reproduces the system stream.

The "cells" referenced here may be all or part of the system stream, and are used as access points during playback. Cells can therefore be used, for example, as the "chapters" into which a title may be divided.

Note that each of the PGC information entries C_PBI #j contain both cell playback processing information and a cell information table. The cell playback processing information comprises the processing information needed to reproduce the cell, such as the presentation time and number of repetitions. More specifically, this information includes the cell block mode CBM, cell block type CBT, seamless playback flag SPF, interleaved allocation flag IAF, STC resetting flag STCDF, cell presentation time C_PBTM, seamless angle change flag SACF, first cell VOBU start address C_FVOBU_SA, and the last cell VOBU start address C_LVOBU_SA.

Note that seamless playback refers to the reproduction in a digital video disk system of multimedia data including video, audio, and sub-picture data without intermittent breaks in the data or information. Seamless playback is described in detail in another section below with reference to FIG. 23 and FIG. 24.

The cell block mode CBM indicates whether plural cells constitute one functional block. The cell playback information of each cell in a functional block is arranged consecutively in the PGC information. The cell block mode CBM of the first cell playback information in this sequence contains the value of the first cell in the block, and the cell block mode CBM of the last cell playback information in this sequence contains the value of the last cell in the block. The cell block mode CBM of each cell arrayed between these first and last cells contains a value indicating that the cell is a cell between these first and last cells in that block.

The cell block type CBT identifies the type of the block indicated by the cell block mode CBM. For example, when a multiple angle function is enabled, the cell information corresponding to each of the reproducible angles is programmed as one of the functional blocks mentioned above, and the type of these functional blocks is defined by a value identifying "angle" in the cell block type CBT for each cell in that block.

The seamless playback flag SPF simply indicates whether the corresponding cell is to be linked and played back seamlessly with the cell or cell block reproduced immediately therebefore. To seamlessly reproduce a given cell with the preceding cell or cell block, the seamless playback flag SPF is set to 1 in the cell playback information for that cell; otherwise SPF is set to 0.

The interleaved allocation flag IAF stores a value identifying whether the cell exists in a contiguous or interleaved block. If the cell is part of an interleaved block, the flag IAF is set to 1; otherwise it is set to 0.

The STC resetting flag STCDF identifies whether the system time clock STC used for synchronization must be reset when the cell is played back; when resetting the system time clock STC is necessary, the STC resetting flag STCDF is set to 1.

The seamless angle change flag SACF stores a value indicating whether a cell in a multi-angle period should be connected seamlessly at an angle change. If the angle change is seamless, the seamless angle change flag SACF is set to 1; otherwise it is set to 0.

The cell presentation time C_PBTM expresses the cell presentation time with video frame precision.

The first cell VOBU start address C_FVOBU_SA is the VOBU start address of the first cell in a block, and is also expressed as the distance from the logic sector of the first cell in the VTS title VOBS (VTSTT_VOBS) as measured by the number of sectors.

The last cell VOBU start address C_LVOBU_SA is the VOBU start address of the last cell in the block. The value of this address is expressed as the distance from the logic sector of the first cell in the VTS title VOBS (VTSTT_VOBS) as measured by the number of sectors.

The VTS title VOBS (VTSTT_VOBS), i.e., the multimedia system stream data, is described next. The system stream data VTSTT_VOBS comprises i (where i is a natural number) system streams SS, each of which is referred to as a "video object" (VOB). Each video object VOB #1–VOB #i comprises at least one video data block interleaved with up to a maximum eight audio data blocks and up to a maximum 32 sub-picture data blocks.

Each video object VOB comprises q (where q is a natural number) cells C#1–C#q. Each cell C comprises r (where r is a natural number) video object units VOBU #1–VOBU #r.

Each video object unit VOBU comprises plural groups_of_pictures GOP, and the audio and sub-pictures corresponding to the playback of the plural groups_of_pictures GOP. Note that the group_of_pictures GOP corresponds to the video encoding refresh cycle. Each video object unit VOBU also starts with an NV pack, i.e., the control data for that VOBU.

The structure of the navigation packs NV is described with reference to FIG. 18.

Figure 17:
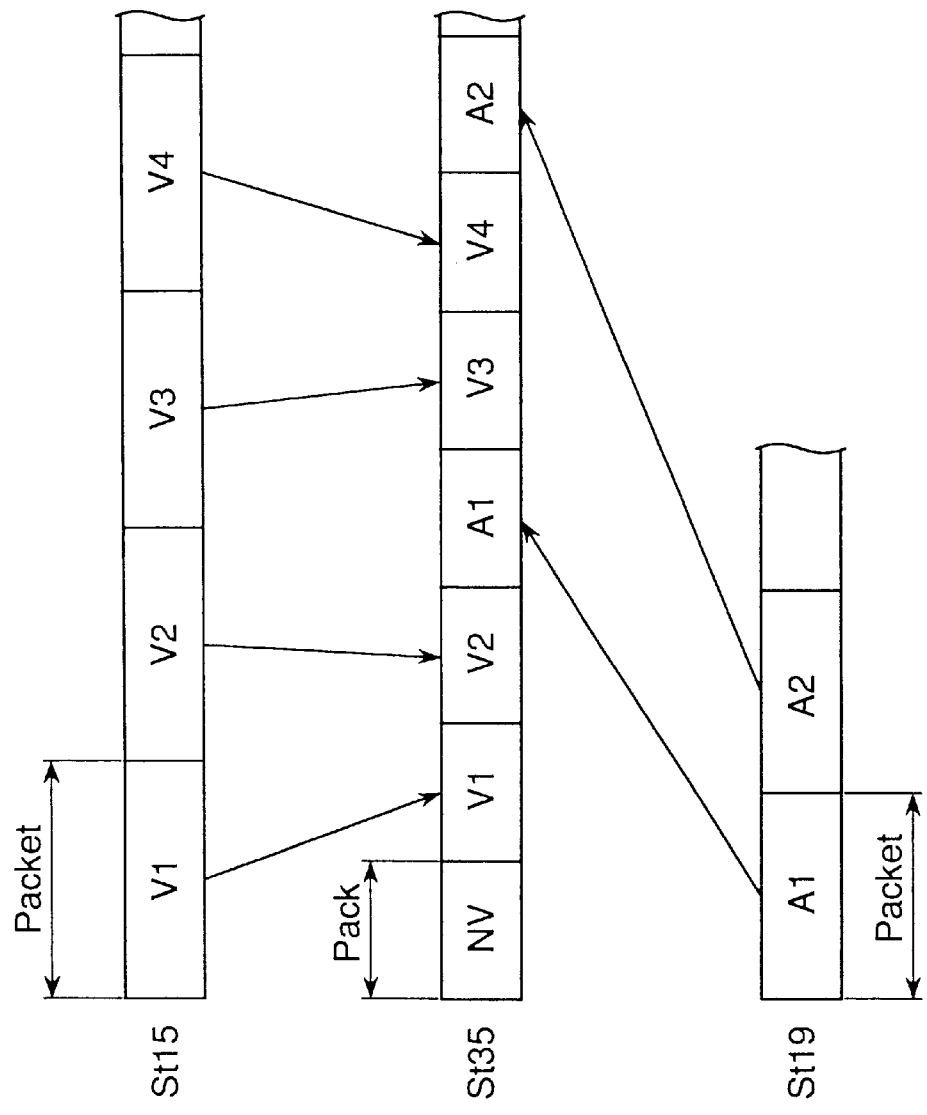
FIG. 17 is a graph schematically showing the encoded video stream according to the present invention.
Figure 25:
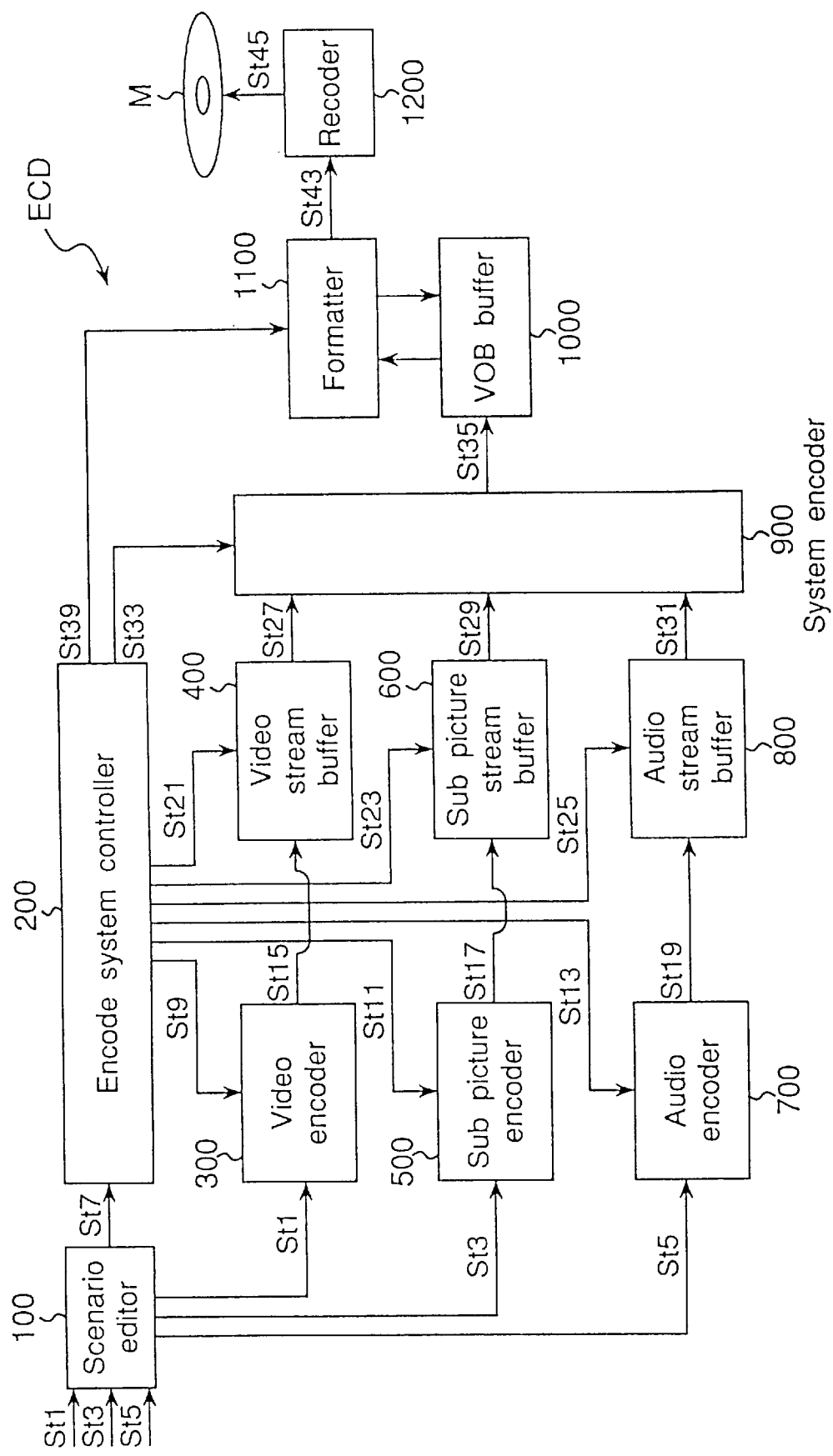
FIG. 25 is a block diagram showing a DVD encoder according to the present invention.

Before describing the navigation pack NV, the internal structure of the video zone VZ (see FIG. 22), i.e., the system stream St35 encoded by the authoring encoder EC described with reference to FIG. 25, is described with reference to FIG. 17. Note that the encoded video stream St15 shown in FIG. 17 is the compressed one-dimensional video data stream encoded by the video encoder 300. The encoded audio stream St19 is likewise the compressed one-dimensional audio data stream multiplexing the right and left stereo audio channels encoded by the audio encoder 700. Note that the audio signal shall not be limited to a stereo signal, and may also be a multichannel surround-sound signal.

Figure 21:
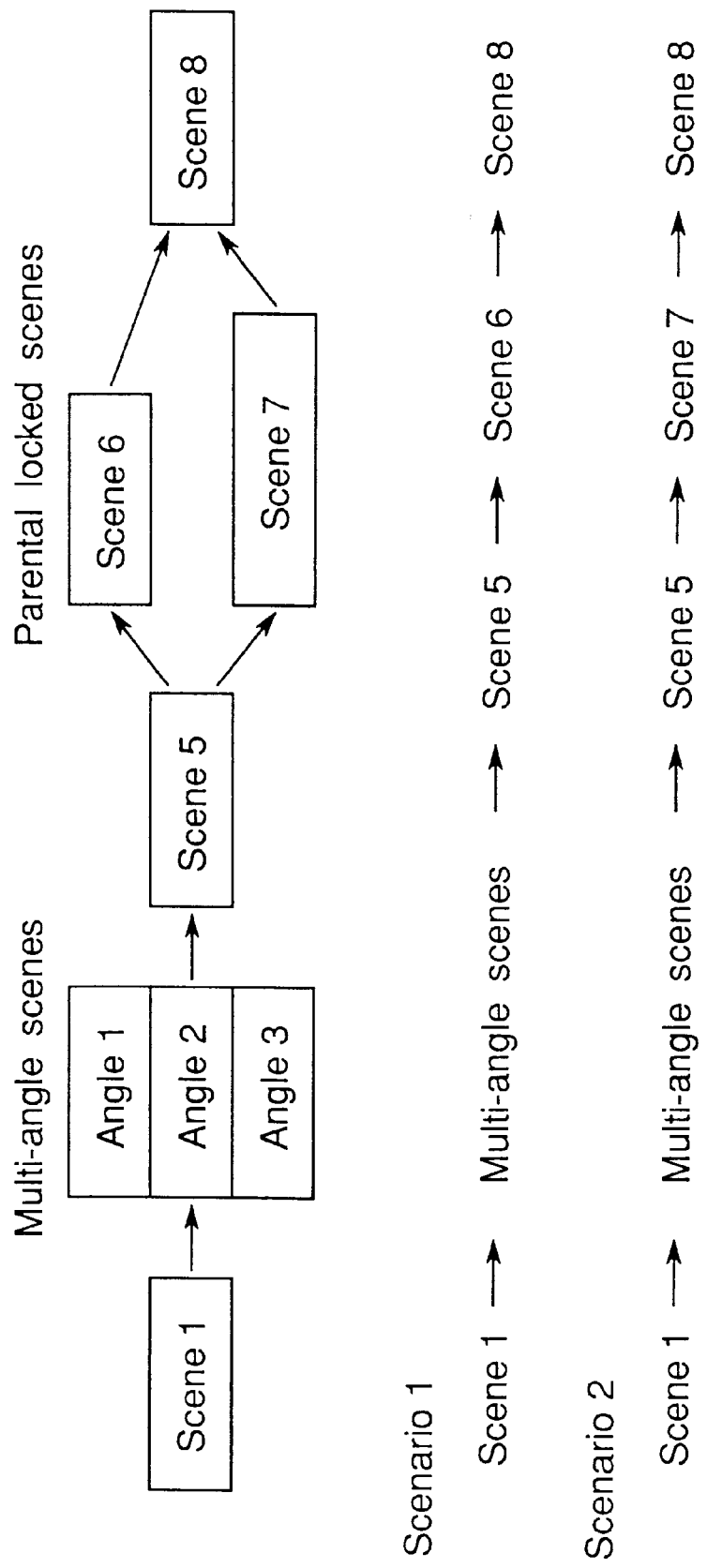
FIG. 21 is a graph is assistance of explaining a concept of parental lock playback control according to the present invention.

The system stream (title editing unit VOB) St35 is a one dimensional array of packs with a byte size corresponding to the logic sectors LS #n having a 2048-byte capacity as described using FIG. 21. A stream control pack is placed at the beginning of the title editing unit (VOB) St35, i.e., at the beginning of the video object unit VOBU. This stream control pack is called the "navigation pack NV", and records the data arrangement in the system stream and other control information.

The encoded video stream St15 and the encoded audio stream St19 are packetized in byte units corresponding to the system stream packs. These packets are shown in FIG. 17 as packets V1, V2, V3, V4 . . . and A1, A2, A3 . . . . As shown in FIG. 17, these packets are interleaved in the appropriate sequence as system stream St35, thus forming a packet stream, with consideration given to the decoder buffer size and the time required by the decoder to expand the video and audio data packets. In the example shown in FIG. 17, the packet stream is interleaved in the sequence V1, V2, A1, V3, V4, A2 . . . .

Note that the sequence shown in FIG. 17 interleaves one video data unit with one audio data unit. Significantly increased recording/playback capacity, high speed recording/playback, and performance improvements in the signal processing LSI enable the DVD system to record plural audio data and plural sub-picture data (graphics data) to one video data unit in a single interleaved MPEG system stream, and thereby enable the user to select the specific audio data and sub-picture data to be reproduced during playback. The structure of the system stream used in this type of DVD system is shown in FIG. 18 and described below.

Figure 18:
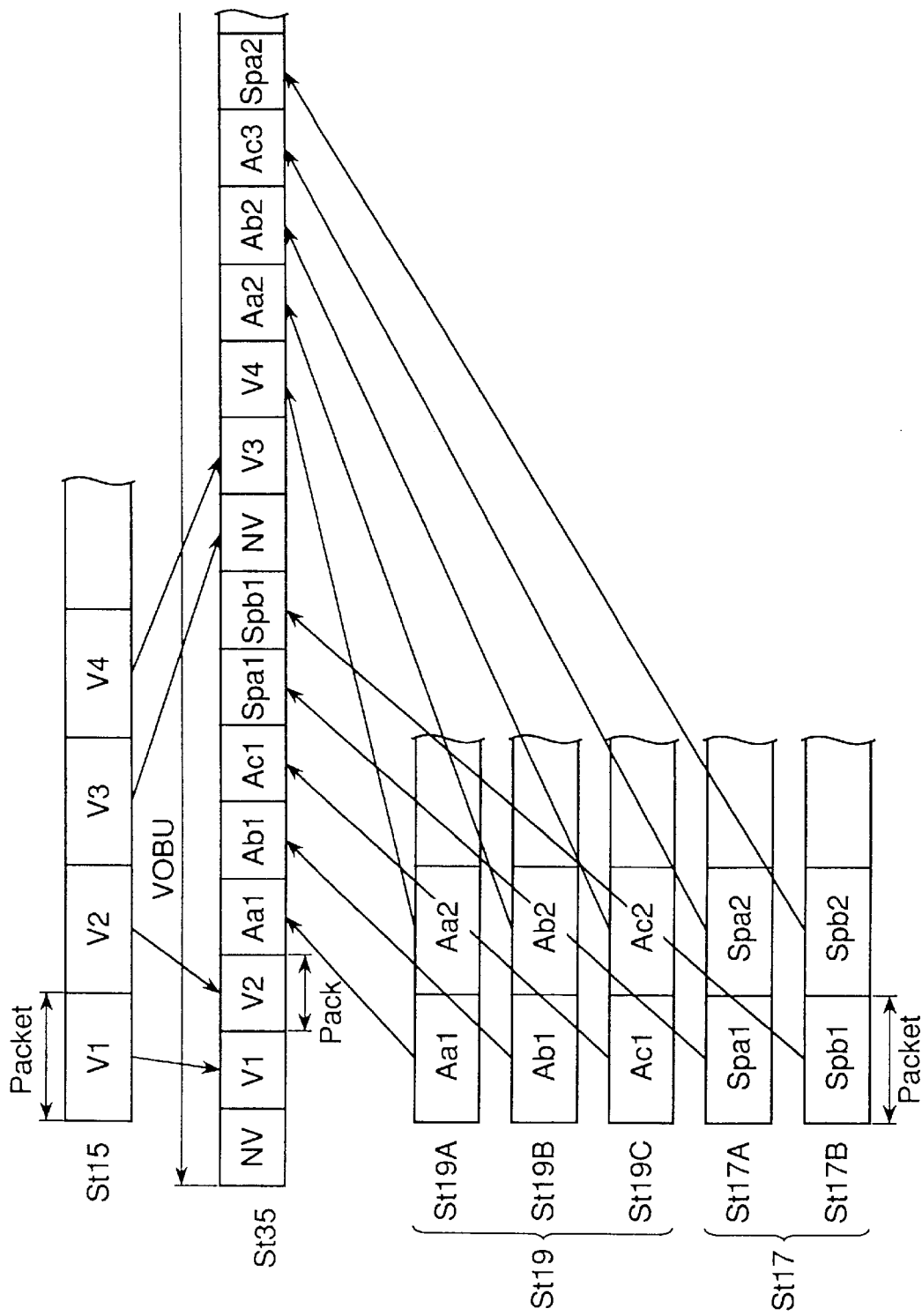
FIG. 18 is a graph schematically showing an internal structure of a video zone of FIG. 16.

As in FIG. 17, the packetized encoded video stream St15 is shown in FIG. 18 as V1, V2, V3, V4, . . . In this example, however, there is not just one encoded audio stream St19, but three encoded audio streams St19A, St19B, and St19C input as the source data. There are also two encoded sub-picture streams St17A and St17B input as the source data sub-picture streams. These six compressed data streams, St15, St19A, St19B, St19C, St17A and St17B, are interleaved to a single system stream St35.

The video data is encoded according to the MPEG specification with the group_of_pictures GOP being the unit of compression. In general, each group_of_pictures GOP contains 15 frames in the case of an NTSC signal, but the specific number of frames compressed to one GOP is variable. The stream management pack, which describes the management data containing, for example, the relationship between interleaved data, is also interleaved at the GOP unit interval. Because the group_of_pictures GOP unit is based on the video data, changing the number of video frames per GOP unit changes the interval of the stream management packs. This interval is expressed in terms of the presentation time on the digital video disk within a range from 0.4 sec. to 1.0 sec. referenced to the GOP unit. If the presentation time of contiguous plural GOP units is less than 1 sec., the management data packs for the video data of the plural GOP units is interleaved to a single stream.

These management data packs are referred to as navigation packs NV in the digital video disk system. The data from one navigation pack NV to the packet immediately preceding the next navigation pack NV forms one video object unit VOBU. In general, one contiguous playback unit that can be defined as one scene is called a video object VOB, and each video object VOB contains plural video object units VOBU. Data sets of plural video objects VOB form a VOB set (VOBS). Note that these data units were first used in the digital video disk.

When plural of these data streams are interleaved, the navigation packs NV defining the relationship between the interleaved packs must also be interleaved at a defined unit known as the pack number unit. Each group_of_pictures GOP is normally a unit containing approximately 0.5 sec. of video data, which is equivalent to the presentation time required for 12–15 frames, and one navigation pack NV is generally interleaved with the number of data packets required for this presentation time.

Figure 19:
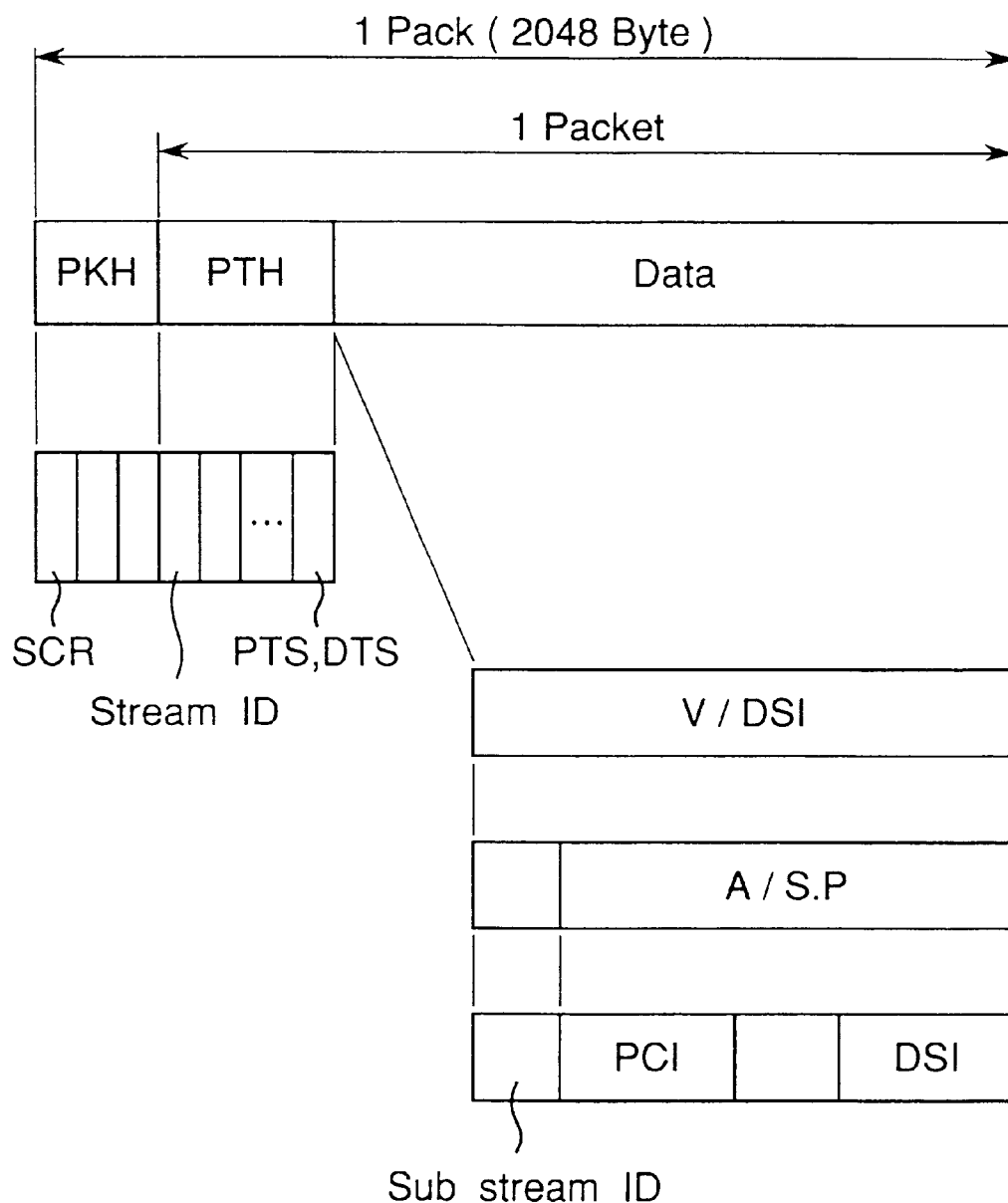
FIG. 19 is a graph schematically showing the stream management information according to the present invention.

The stream management information contained in the interleaved video, audio, and sub-picture data packets constituting the system stream is described below with reference to FIG. 19 As shown in FIG. 19, the data contained in the system stream is recorded in a format packed or packetized according to the MPEG2 standard. The packet structure is essentially the same for video, audio, and sub-picture data. One pack in the digital video disk system has a 2048 byte capacity as described above, and contains a pack header PKH and one packet PES; each packet PES contains a packet header PTH and data block.

The pack header PKH records the time at which that pack is to be sent from stream buffer 2400 to system decoder 2500 (see FIG. 26), i.e., the system clock reference SCR defining the reference time for synchronized audio-visual data playback. The MPEG standard assumes that the system clock reference SCR is the reference clock for the entire decoder operation. With such disk media as the digital video disk, however, time management specific to individual disk players can be used, and a reference clock for the decoder system is therefore separately provided.

The packet header PTH similarly contains a presentation time stamp PTS and a decoding time stamp DTS, both of which are placed in the packet before the access unit (the decoding unit). The presentation time stamp PTS defines the time at which the video data or audio data contained in the packet should be output as the playback output after being decoded, and the decoding time stamp DTS defines the time at which the video stream should be decoded. Note that the presentation time stamp PTS effectively defines the display start timing of the access unit, and the decoding time stamp DTS effectively defines the decoding start timing of the access unit. If the PTS and DTS are the same time, the DTS is omitted.

The packet header PTH also contains an 8-bit field called the stream ID identifying the packet type, i.e., whether the packet is a video packet containing a video data stream, a private packet, or an MPEG audio packet.

Private packets under the MPEG2 standard are data packets of which the content can be freely defined. Private packet 1 in this embodiment of the invention is used to carry audio data other than the MPEG audio data, and sub-picture data; private packet 2 carries the PCI packet and DSI packet.

Private packets 1 and 2 each comprise a packet header, private data area, and data area. The private data area contains an 8-bit sub-stream ID indicating whether the recorded data is audio data or sub-picture data. The audio data defined by private packet 2 may be defined as any of eight types #0–#7 of linear PCM or AC-3 encoded data. Sub-picture data may be defined as one of up to 32 types #0–#31.

The data area is the field to which data compressed according to the MPEG2 specification is written if the stored data is video data; linear PCM, AC-3, or MPEG encoded data is written if audio data is stored; or graphics data compressed by runlength coding is written if sub-picture data is stored.

MPEG2-compressed video data may be compressed by constant bit rate (CBR) or variable bit rate (VBR) coding. With constant bit rate coding, the video stream is input continuously to the video buffer at a constant rate. This contrasts with variable bit rate coding in which the video stream is input intermittently to the video buffer, thereby making it possible to suppress the generation of unnecessary code. Both constant bit rate and variable bit rate coding can be used in the digital video disk system.

Because MPEG video data is compressed with variable length coding, the data quantity in each group_of_pictures GOP is not constant. The video and audio decoding times also differ, and the time-base relationship between the video and audio data read from an optical disk, and the time-base relationship between the video and audio data output from the decoder, do not match. The method of time-base synchronizing the video and audio data is therefore described in detail below with reference to FIG. 26, but is described briefly below based on constant bit rate coding.

Figure 20:
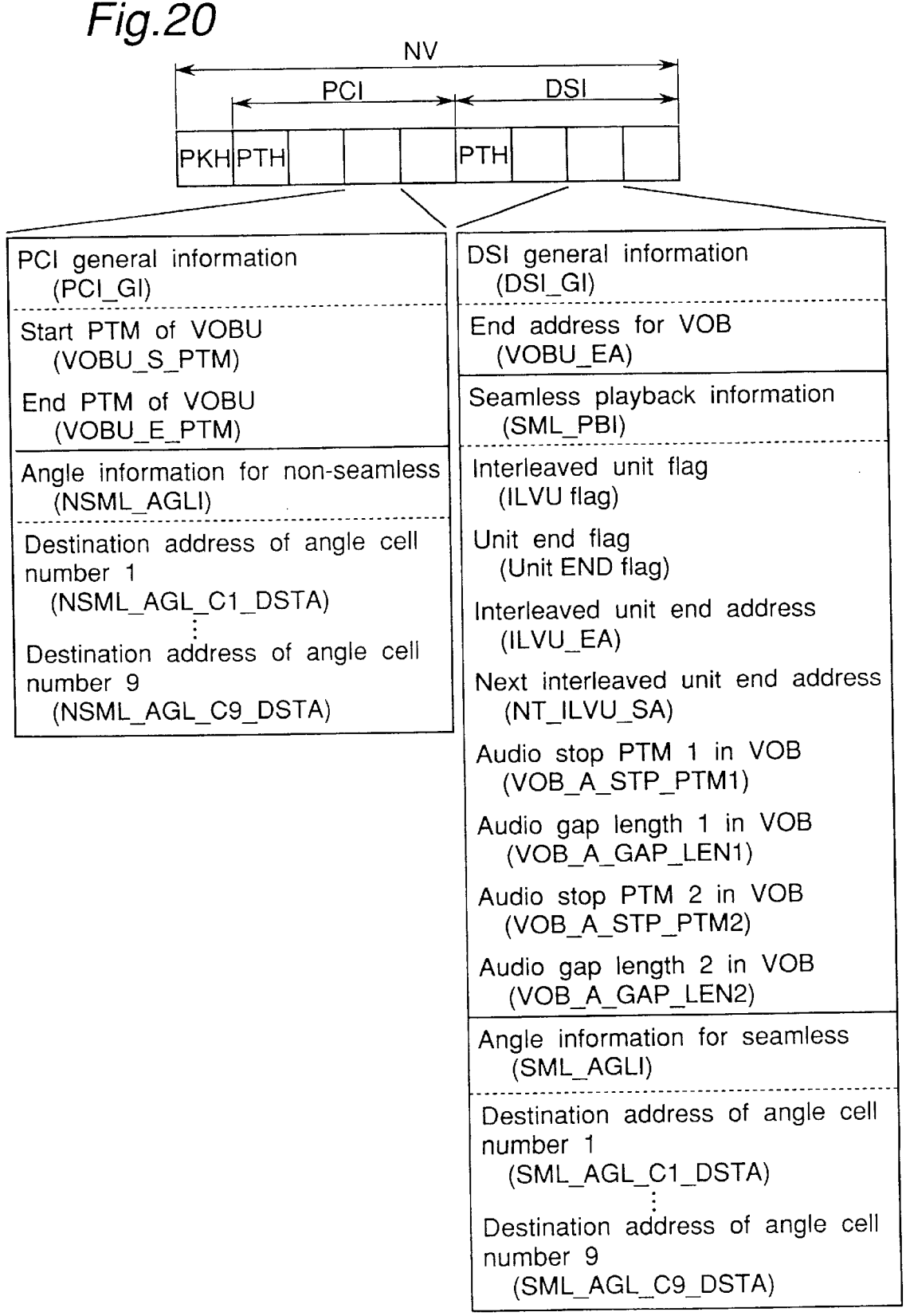
FIG. 20 is a graph schematically showing the structure the navigation pack NV of FIG. 17.

The navigation pack NV structure is shown in FIG. 20. Each navigation pack NV starts with a pack header PKH, and contains a PCI packet and DSI packet.

As described above, the pack header PKH records the time at which that pack is to be sent from stream buffer 2400 to system decoder 2500 (see FIG. 26), i.e., the system clock reference SCR defining the reference time for synchronized audio-visual data playback.

Each PCI packet contains PCI General Information (PCI_GI) and Angle Information for Non-seamless playback (NMSL_AGLI).

The PCI General Information (PCI_GI) declares the display time of the first video frame (the Start PTM of VOBU (VOBU_S_PTM)), and the display time of the last video frame (End PTM of VOBU (VOBU_E_PTM) ), in the corresponding video object unit VOBU with system clock precision (90 Khz).

The Angle Information for Non-seamless playback (NMSL_AGLI) states the read start address of the corresponding video object unit VOBU when the angle is changed expressed as the number of sectors from the beginning of the video object VOB. Because there are nine or fewer angles in this example, there are nine angle address declaration cells: Destination Address of Angle Cell #1 for Non-seamless playback (NMSL_AGL_C1_DSTA) to Destination Address of Angle Cell #9 for Non-seamless playback (NMSL_AGL_C9_DSTA).

Each DSI packet contains DSI General Information (DSI_GI), Seamless Playback Information (SML_PBI), and Angle Information for Seamless playback (SML_AGLI).

The DSI General Information (DSI_GI) declares the address of the last pack in the video object unit VOBU, i. e., the End Address for VOB (VOBU_EA), expressed as the number of sectors from the beginning of the video object unit VOBU.

While seamless playback is described in detail later, it should be noted that the continuously read data units must be interleaved (multiplexed) at the system stream level as an interleaved unit ILVU in order to seamlessly reproduce split or combined titles. Plural system streams interleaved with the interleaved unit ILVU as the smallest unit are defined as an interleaved block.

The Seamless Playback Information (SML_PBI) is declared to seamlessly reproduce the stream interleaved with the interleaved unit ILVU as the smallest data unit, and contains an Interleaved Unit Flag (ILVU flag) identifying whether the corresponding video object unit VOBU is an interleaved block. The ILVU flag indicates whether the video object unit VOBU is in an interleaved block, and is set to 1 when it is. Otherwise the ILVU flag is set to 0.

When a video object unit VOBU is in an interleaved block, a Unit END flag is declared to indicate whether the video object unit VOBU is the last VOBU in the interleaved unit ILVU. Because the interleaved unit ILVU is the data unit for continuous reading, the Unit END flag is set to 1 if the VOBU currently being read is the last VOBU in the interleaved unit ILVU. Otherwise the Unit END flag is set to 0.

An Interleaved Unit End Address (ILVU_EA) identifying the address of the last pack in the ILVU to which the VOBU belongs, and the starting address of the next interleaved unit ILVU, Next Interleaved Unit Start Address (NT_ILVU_SA), are also declared when a video object unit VOBU is in an interleaved block. Both the Interleaved Unit End Address (ILVU_EA) and Next Interleaved Unit Start Address (NT_ILVU_SA) are expressed as the number of sectors from the navigation pack NV of that VOBU.

When two system streams are seamlessly connected but the audio components of the two system streams are not contiguous, particularly immediately before and after the seam, it is necessary to pause the audio output to synchronize the audio and video components of the system stream following the seam. Note that non-contiguous audio may result from different audio signals being recording with the corresponding video blocks. With an NTSC signal, for example, the video frame cycle is approximately 33.33 msec while the AC-3 audio frame cycle is 32 msec.

To enable this resynchronization, audio reproduction stopping times 1 and 2, i.e., Audio Stop PTM 1 in VOB (VOB_A_STP_PTM1), and Audio Stop PTM2 in VOB (VOB_A_STP_PTM2), indicating the time at which the audio is to be paused; and audio reproduction stopping periods 1 and 2, i.e., Audio Gap Length 1 in VOB (VOB_A_GAP_LEN1) and Audio Gap Length 2 in VOB (VOB_A_GAP_LEN2), indicating for how long the audio is to be paused, are also declared in the DSI packet. Note that these times are specified at the system clock precision (90 Khz).

The Angle Information for Seamless playback (SML_AGLI) declares the read start address when the angle is changed. Note that this field is valid when seamless, multi-angle control is enabled. This address is also expressed as the number of sectors from the navigation pack NV of that VOBU. Because there are nine or fewer angles, there are nine angle address declaration cells: Destination Address of Angle Cell #1 for Seamless playback (SML_AGL_C1_DSTA) to Destination Address of Angle Cell #9 for Seamless playback (SML_AGL_C9_DSTA).

Note also that each title is edited in video object (VOB) units. Interleaved video objects (interleaved title editing units) are referenced as "VOBS" ; and the encoded range of the source data is the encoding unit.

DVD Encoder

A preferred embodiment of a digital video disk system authoring encoder ECD in which the multimedia bitstream authoring system according to the present invention is applied to a digital video disk system is described below and shown in FIG. 25. It will be obvious that the authoring encoder ECD applied to the digital video disk system, referred to below as a DVD encoder, is substantially identical to the authoring encoder EC shown in FIG. 2. The basic difference between these encoders is the replacement in the DVD encoder ECD of the video zone formatter 1300 of the authoring encoder EC above with a VOB buffer 1000 and formatter 1100. It will also be obvious that the bitstream encoded by this DVD encoder ECD is recorded to a digital video disk medium M. The operation of this DVD encoder ECD is therefore described below in comparison with the authoring encoder EC described above.

As in the above authoring encoder EC, the encoding system controller 200 generates control signals St9, St11, St13, St21, St23, St25, St33, and St39 based on the scenario data St7 describing the user-defined editing instructions input from the scenario editor 100, and controls the video encoder 300, sub-picture encoder 500, and audio encoder 700 in the DVD encoder ECD. Note that the user-defined editing instructions in the DVD encoder ECD are a superset of the editing instructions of the authoring encoder EC described above.

Specifically, the user-defined editing instructions (scenario data St7) in the DVD encoder ECD similarly describe what source data is selected from all or a subset of the source data containing plural titles within a defined time period, and how the selected source data is reassembled to reproduce the scenario (sequence) intended by the user. The scenario data St7 of the DVD encoder ECD, however, further contains such information as: the number of streams contained in the editing units, which are obtained by splitting a multi-title source stream into blocks at a constant time interval; the number of audio and sub-picture data cells contained in each stream, and the sub-picture display time and period; whether the title is a multi-rated title enabling parental lock control; whether the user content is selected from plural streams including, for example, multiple viewing angles; and the method of connecting scenes when the angle is switched among the multiple viewing angles.

The scenario data St7 of the DVD encoder ECD also contains control information on a video object VOB unit basis. This information is required to encode the media source stream, and specifically includes such information as whether there are multiple angles or parental control features. When multiple angle viewing is enabled, the scenario data St7 also contains the encoding bit rate of each stream considering data interleaving and the disk capacity, the start and end times of each control, and whether a seamless connection should be made between the preceding and following streams.

The encoding system controller 200 extracts this information from the scenario data St7, and generates the encoding information table and encoding parameters required for encoding control. The encoding information table and encoding parameters are described with reference to FIGS. 27, 28, and 29 below.

The stream encoding data St33 contains the system stream encoding parameters and system encoding start and end timing values required by the DVD system to generate the VOBs. These system stream encoding parameters include the conditions for connecting one video object VOB with those before and after, the number of audio streams, the audio encoding information and audio Ids, the number of sub-pictures and the sub-picture Ids, the video playback starting time information VPTS, and the audio playback starting time information APTS.

The title sequence control signal St39 supplies the multimedia bitstream MBS formatting start and end timing information and formatting parameters declaring the reproduction control information and interleave information.

Based on the video encoding parameter and encoding start/end timing signal St9, the video encoder 300 encodes a specific part of the video stream St1 to generate an elementary stream conforming to the MPEG2 Video standard defined in ISO-13818. This elementary stream is output to the video stream buffer 400 as encoded video stream St15.

Note that while the video encoder 300 generates an elementary stream conforming to the MPEG2 Video standard defined in ISO-13818, specific encoding parameters are input via the video encoding parameter signal St9, including the encoding start and end timing, bit rate, the encoding conditions for the encoding start and end, the material type, including whether the material is an NTSC or PAL video signal or telecine converted material, and whether the encoding mode is set for either open GOP or closed GOP encoding.

The MPEG2 coding method is basically an interframe coding method using the correlation between frames for maximum signal compression, i.e., the frame being coded (the target frame) is coded by referencing frames before and/or after the target frame. However, intra-coded frames, i. e. , frames that are coded based solely on the content of the target frame, are also inserted to avoid error propagation and enable accessibility from mid-stream (random access). The coding unit containing at least one intra-coded frame ("intra-frame") is called a group_of_pictures GOP.

A group_of_pictures GOP in which coding is closed completely within that GOP is known as a "closed GOP." A group_of_pictures GOP containing a frame coded with reference to a frame in a preceding or following (ISO-13818 DOES NOT LIMIT P-spand B-picture CODING to referencing PAST frames) group_of_pictures GOP is an "open GOP." It is therefore possible to playback a closed GOP using only that GOP. Reproducing an open GOP, however, also requires the presence of the referenced GOP, generally the GOP preceding the open GOP.

The GOP is often used as the access unit. For example, the GOP may be used as the playback start point for reproducing a title from the middle, as a transition point in a movie, or for fast-forward play and other special reproduction modes. High speed reproduction can be achieved in such cases by reproducing only the intra-frame coded frames in a GOP or by reproducing only frames in GOP units.

Based on the sub-picture stream encoding parameter signal St11, the sub-picture encoder 500 encodes a specific part of the sub-picture stream St3 to generate a variable length coded bitstream of bitmapped data. This variable length coded bitstream data is output as the encoded sub-picture stream St17 to the sub-picture stream buffer 600.

Based on the audio encoding parameter signal St13, the audio encoder 700 encodes a specific part of the audio stream St5 to generate the encoded audio data. This encoded audio data may be data based on the MPEG1 audio standard defined in ISO-11172 and the MPEG2 audio standard defined in ISO-13818, AC-3 audio data, or PCM (LPCM) data. Note that the methods and means of encoding audio data according to these standards are known and commonly available.

The video stream buffer 400 is connected to the video encoder 300 and to the encoding system controller 200. The video stream buffer 400 stores the encoded video stream St15 input from the video encoder 300, and outputs the stored encoded video stream St15 as the time-delayed encoded video stream St27 based on the timing signal St21 supplied from the encoding system controller 200.

The sub-picture stream buffer 600 is similarly connected to the sub-picture encoder 500 and to the encoding system controller 200. The sub-picture stream buffer 600 stores the encoded sub-picture stream St17 input from the sub-picture encoder 500, and then outputs the stored encoded sub-picture stream St17 as time-delayed encoded sub-picture stream St29 based on the timing signal St23 supplied from the encoding system controller 200.

The audio stream buffer 800 is similarly connected to the audio encoder 700 and to the encoding system controller 200. The audio stream buffer 800 stores the encoded audio stream St19 input from the audio encoder 700, and then outputs the encoded audio stream St19 as the time-delayed encoded audio stream St31 based on the timing signal St25 supplied from the encoding system controller 200.

The system encoder 900 is connected to the video stream buffer 400, sub-picture stream buffer 600, audio stream buffer 800, and the encoding system controller 200, and is respectively supplied thereby with the time-delayed encoded video stream St27, time-delayed encoded sub-picture stream St29, time-delayed encoded audio stream St31, and the system stream encoding parameter data St33. Note that the system encoder 900 is a multiplexer that multiplexes the time-delayed streams St27, St29, and St31 based on the stream encoding data St33 (timing signal) to generate title editing units (VOBs) St35.

The VOB buffer 1000 temporarily stores the video objects VOBs produced by the system encoder 900. The formatter 1100 reads the delayed video objects VOB from the VOB buffer 1000 based on the title sequence control signal St39 to generate one video zone VZ, and adds the volume file structure VFS to generate the edited multimedia stream data St43.

The multimedia bitstream MBS St43 edited according to the user-defined scenario is then sent to the recorder 1200. The recorder 1200 processes the edited multimedia stream data St43 to the data stream St45 format of the recording medium M, and thus records the formatted data stream St45 to the recording medium M.

DVD Decoder

A preferred embodiment of a digital video disk system authoring decoder DCD in which the multimedia bitstream authoring system of the present invention is applied to a digital video disk system is described below and shown in FIG. 26. The authoring decoder DCD applied to the digital video disk system, referred to below as a DVD decoder DCD, decodes the multimedia bitstream MBS edited using the DVD encoder ECD of the present invention, and recreates the content of each title according to the user-defined scenario. It will also be obvious that the multimedia bitstream St45 encoded by this DVD encoder ECD is recorded to a digital video disk medium M.

The basic configuration of the DVD decoder DCD according to this embodiment is the same as that of the authoring decoder DC shown in FIG. 3. The differences are that a different video decoder 3801 (shown as 3800 in FIG. 26) is used in place of the video decoder 3800, and a reordering buffer 3300 and selector 3400 are disposed between the video decoder 3801 and synthesizer 3500.

Note that the selector 3400 is connected to the synchronizer 2900, and is controlled by a switching signal St103.

The operation of this DVD decoder DCD is therefore described below in comparison with the authoring decoder DC described above.

Figure 26:
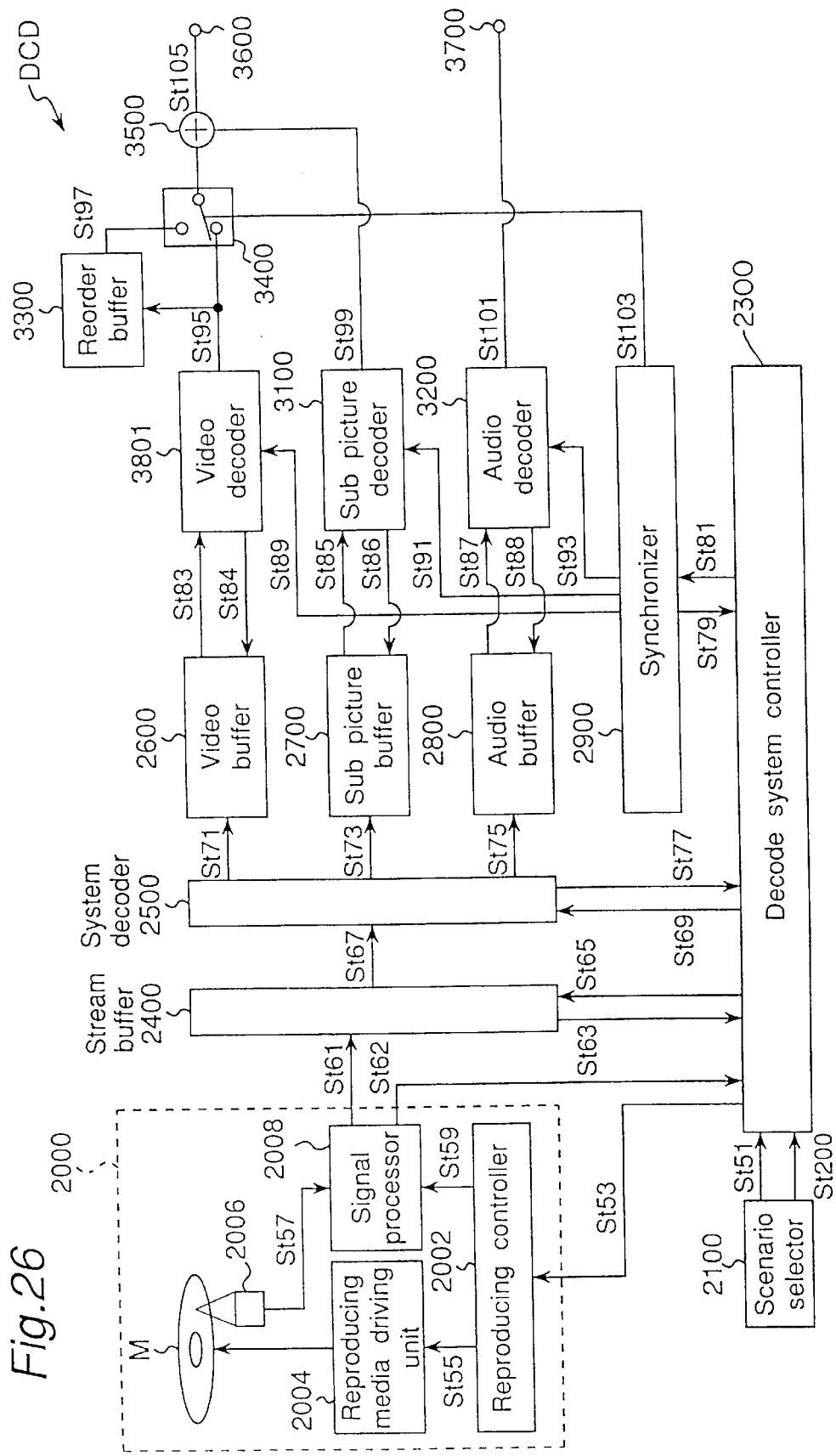
FIG. 26 is a block diagram showing a DVD decoder according to the present invention.

As shown in FIG. 26, the DVD decoder DCD comprises a multimedia bitstream producer 2000, scenario selector 2100, decoding system controller 2300, stream buffer 2400, system decoder 2500, video buffer 2600, sub-picture buffer 2700, audio buffer 2800, synchronizer 2900, video decoder 3801, reordering buffer 3300, sub-picture decoder 3100, audio decoder 3200, selector 3400, synthesizer 3500, video data output terminal 3600, and audio data output terminal 3700.

The bitstream producer 2000 comprises a recording media drive unit 2004 for driving the recording medium M; a reading head 2006 for reading the information recorded to the recording medium M and producing the binary read signal St57; a signal processor 2008 for variously processing the read signal St57 to generate the reproduced bitstream St61; and a reproduction controller 2002.

The reproduction controller 2002 is connected to the decoding system controller 2300 from which the multimedia bitstream reproduction control signal St53 is supplied, and in turn generates the reproduction control signals St55 and St59 respectively controlling the recording media drive unit (motor) 2004 and signal processor 2008.

So that the user-defined video, sub-picture, and audio portions of the multimedia title edited by the authoring encoder EC are reproduced, the authoring decoder DC comprises a scenario selector 2100 for selecting and reproducing the corresponding scenes (titles). The scenario selector 2100 then outputs the selected titles as scenario data to the DVD decoder DCD.

The scenario selector 2100 preferably comprises a keyboard, CPU, and monitor. Using the keyboard, the user then inputs the desired scenario based on the content of the scenario input by the DVD encoder ECD. Based on the keyboard input, the CPU generates the scenario selection data St51 specifying the selected scenario. The scenario selector 2100 is connected to the decoding system controller 2300 by an infrared communications device, for example, and inputs the generated scenario selection data St51 to the decoding system controller 2300.

The stream buffer 2400 has a specific buffer capacity used to temporarily store the reproduced bitstream St61 input from the bitstream producer 2000, extract the volume file structure VFS, the initial synchronization data SCR (system clock reference) in each pack, and the VOBU control information (DSI) in the navigation pack NV, to generate the bitstream control data St63. The stream buffer 2400 is also connected to the decoding system controller 2300, to which it supplies the generated bitstream control data St63.

Based on the scenario selection data St51 supplied by the scenario selector 2100, the decoding system controller 2300 then generates the bitstream reproduction control signal St53 controlling the operation of the bitstream producer 2000. The decoding system controller 2300 also extracts the user-defined playback instruction data from the bitstream reproduction control signal St53, and generates the decoding information table required for decoding control. This decoding information table is described further below with reference to FIGS. 47 and 48. The decoding system controller 2300 also extracts the title information recorded to the optical disk M from the file data structure area FDS of the bitstream control data St63 to generate the title information signal St200. Note that the extracted title information includes the video manager VMG, VTS information VTSI, the PGC information entries C_PBI #j, and the cell presentation time C_PBTM.

Note that the bitstream control data St63 is generated in pack units as shown in FIG. 19, and is supplied from the stream buffer 2400 to the decoding system controller 2300, to which the stream buffer 2400 is connected.

The synchronizer 2900 is connected to the decoding system controller 2300 from which it receives the system clock reference SCR contained in the synchronization control data St81 to set the internal system clock STC and supply the reset system clock St79 to the decoding system controller 2300.

Based on this system clock St79, the decoding system controller 2300 also generates the stream read signal St65 at a specific interval and outputs the read signal St65 to the stream buffer 2400. Note that the read unit in this case is the pack.

The method of generating the stream read signal St65 is described next.

The decoding system controller 2300 compares the system clock reference SCR contained in the stream control data extracted from the stream buffer 2400 with the system clock St79 supplied from the synchronizer 2900, and generates the read request signal St65 when the system clock St79 is greater than the system clock reference SCR of the bitstream control data St63. Pack transfers are controlled by executing this control process on a pack unit.

Based on the scenario selection data St51, the decoding system controller 2300 generates the decoding signal St69 defining the stream Ids for the video, sub-picture, and audio bitstreams corresponding to the selected scenario, and outputs to the system decoder 2500.

When a title contains plural audio tracks, e.g. audio tracks in Japanese, English, French, and/or other languages, and plural sub-picture tracks for subtitles in Japanese, English, French, and/or other languages, for example, a discrete ID is assigned to each of the language tracks. As described above with reference to FIG. 19, a stream ID is assigned to the video data and MPEG audio data, and a substream ID is assigned to the sub-picture data, AC-3 audio data, linear PCM data, and navigation pack NV information. While the user need never be aware of these ID numbers, the user can select the language of the audio and/or subtitles using the scenario selector 2100. If English language audio is selected, for example, the ID corresponding to the English audio track is sent to the decoding system controller 2300 as scenario selection data St51. The decoding system controller 2300 then adds this ID to the decoding signal St69 output to the system decoder 2500.

Based on the instructions contained in the decoding signal St69, the system decoder 2500 respectively outputs the video, sub-picture, and audio bitstreams input from the stream buffer 2400 to the video buffer 2600, sub-picture buffer 2700, and audio buffer 2800 as the encoded video stream St71, encoded sub-picture stream St73, and encoded audio stream St75. Thus, when the stream ID input from the scenario selector 2100 and the pack ID input from the stream buffer 2400 match, the system decoder 2500 outputs the corresponding packs to the respective buffers (i.e., the video buffer 2600, sub-picture buffer 2700, and audio buffer 2800).

The system decoder 2500 detects the presentation time stamp PTS and decoding time stamp DTS of the smallest control unit in each bitstream st67 to generate the time information signal St77. This time information signal St77 is supplied to the synchronizer 2900 through the decoding system controller 2300 as the synchronization control data St81.

Based on this synchronization control data St81, the synchronizer 2900 determines the decoding start timing whereby each of the bitstreams will be arranged in the correct sequence after decoding, and then generates and inputs the video stream decoding start signal St89 to the video decoder 3801 based on this decoding timing. The synchronizer 2900 also generates and supplies the sub-picture decoding start signal St91 and audio stream decoding start signal St93 to the sub-picture decoder 3100 and audio decoder 3200, respectively.

The video decoder 3801 generates the video output request signal St84 based on the video stream decoding start signal St89, and outputs to the video buffer 2600. In response to the video output request signal St84, the video buffer 2600 outputs the video stream St83 to the video decoder 3801. The video decoder 3801 thus detects the presentation time information contained in the video stream St83, and disables the video output request signal St84 when the length of the received video stream St83 is equivalent to the specified presentation time. A video stream equal in length to the specified presentation time is thus decoded by the video decoder 3801, which outputs the reproduced video signal St95 to the reordering buffer 3300 and selector 3400.

Because the encoded video stream is coded using the interframe correlations between pictures, the coded order and display order do not necessarily match on a frame unit basis. The video cannot, therefore, be displayed in the decoded order. The decoded frames are therefore temporarily stored to the reordering buffer 3300. The synchronizer 2900 therefore controls the switching signal St103 so that the reproduced video signal St95 output from the video decoder 3800 and the reordering buffer output St97 are appropriately selected and output in the display order to the synthesizer 3500.

The sub-picture decoder 3100 similarly generates the sub-picture output request signal St86 based on the sub-picture decoding start signal St91, and outputs to the sub-picture buffer 2700. In response to the sub-picture output request signal St86, the sub-picture buffer 2700 outputs the sub-picture stream St85 to the sub-picture decoder 3100. Based on the presentation time information contained in the sub-picture stream St85, the sub-picture decoder 3100 decodes a length of the sub-picture stream St85 corresponding to the specified presentation time to reproduce and supply to the synthesizer 3500 the sub-picture signal St99.

The synthesizer 3500 superimposes the selector 3400 output with the sub-picture signal St99 to generate and output the video signal St105 to the video data output terminal 3600.

The audio decoder 3200 generates and supplies to the audio buffer 2800 the audio output request signal St88 based on the audio stream decoding start signal St93. The audio buffer 2800 thus outputs the audio stream St87 to the audio decoder 3200. The audio decoder 3200 decodes a length of the audio stream St87 corresponding to the specified presentation time based on the presentation time information contained in the audio stream St87, and outputs the decoded audio stream St101 to the audio data output terminal 3700.

It is thus possible to reproduce a user-defined multimedia bitstream MBS in real-time according to a user-defined scenario. More specifically, each time the user selects a different scenario, the DVD decoder DCD is able to reproduce the title content desired by the user in the desired sequence by reproducing the multimedia bitstream MBS corresponding to the selected scenario.

It should be noted that the decoding system controller 2300 may supply the title information signal St200 to the scenario selector 2100 by means of the infrared communications device mentioned above or another means. Interactive scenario selection controlled by the user can also be made possible by the scenario selector 2100 extracting the title information recorded to the optical disk M from the file data structure area FDS of the bitstream control data St63 contained in the title information signal St200, and displaying this title information on a display for user selection.

Note, further, that the stream buffer 2400, video buffer 2600, sub-picture buffer 2700, audio buffer 2800, and reordering buffer 3300 are expressed above and in the figures as separate entities because they are functionally different. It will be obvious, however, that a single buffer memory can be controlled to provide the same discrete functionality by time-share controlled use of a buffer memory with an operating speed plural times faster than the read and write rates of these separate buffers.

Multi-scene Control

The concept of multiple angle scene control according to the present invention is described below with reference to FIG. 21. As described above, titles that can be played back with numerous variations are constructed from basic scene periods containing data common to each title, and multi-scene periods comprising groups of different scenes corresponding to the various scenario requests. In FIG. 21, scenes 1, 5, and 8 are the common scenes of the basic scene periods. The multi-angle scenes (angles 1, 2, and 3) between scenes 1 and 5, and the parental locked scenes (scenes 6 and 7) between scenes 5 and 8, are the multi-scene periods.

Scenes taken from different angles, i.e., angles 1, 2, and 3 in this example, can be dynamically selected and reproduced during playback in the multi-angle scene period. In the parental locked scene period, however, only one of the available scenes, scenes 6 and 7, having different content can be selected, and must be selected statically before playback begins.

Which of these scenes from the multi-scene periods is to be selected and reproduced is defined by the user operating the scenario selector 2100 and thereby generating the scenario selection data St51. In scenario 1 in FIG. 21 the user can freely select any of the multi-angle scenes, and scene 6 has been preselected for output in the parental locked scene period. Similarly in scenario 2, the user can freely select any of the multi-angle scenes, and scene 7 has been preselected for output in the parental locked scene period.

Figure 30:
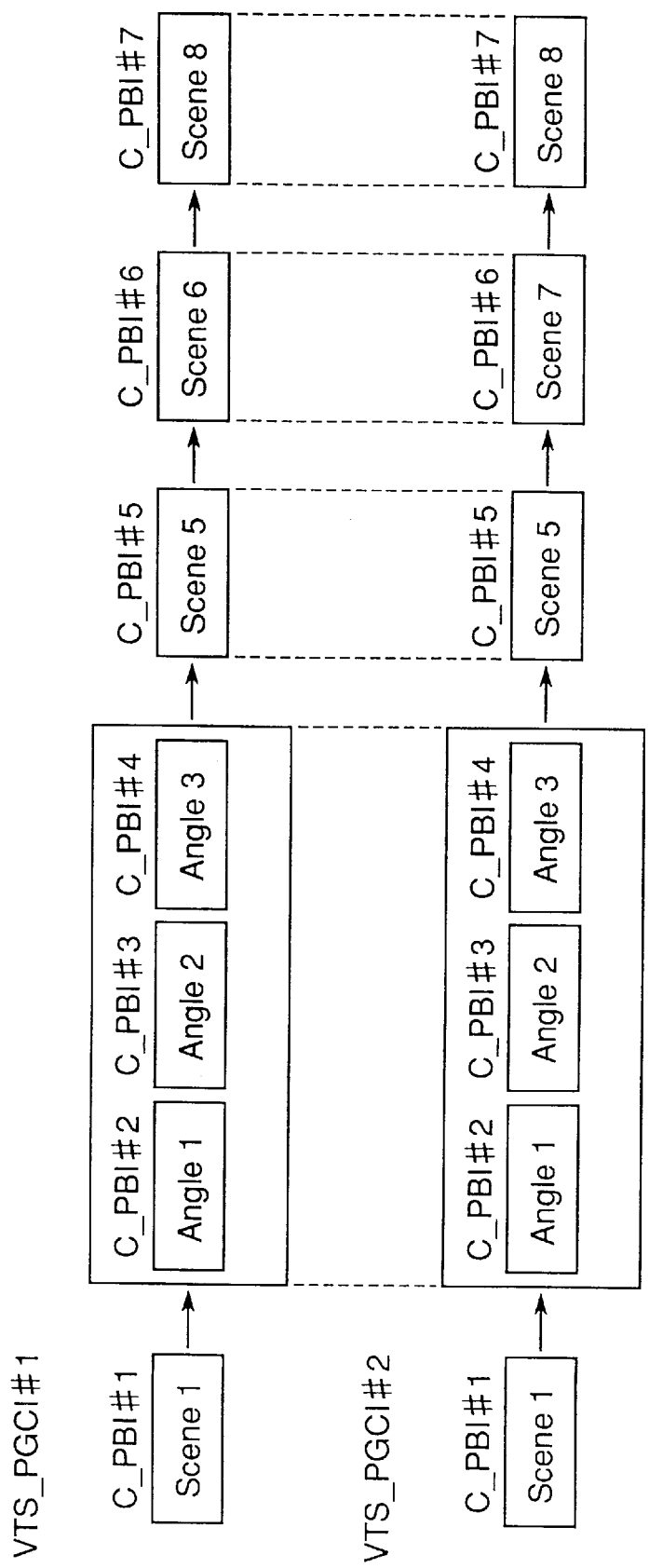
FIG. 30 is a graph schematically showing an example of the contents of the program chain information according to the present invention.
Figure 31:
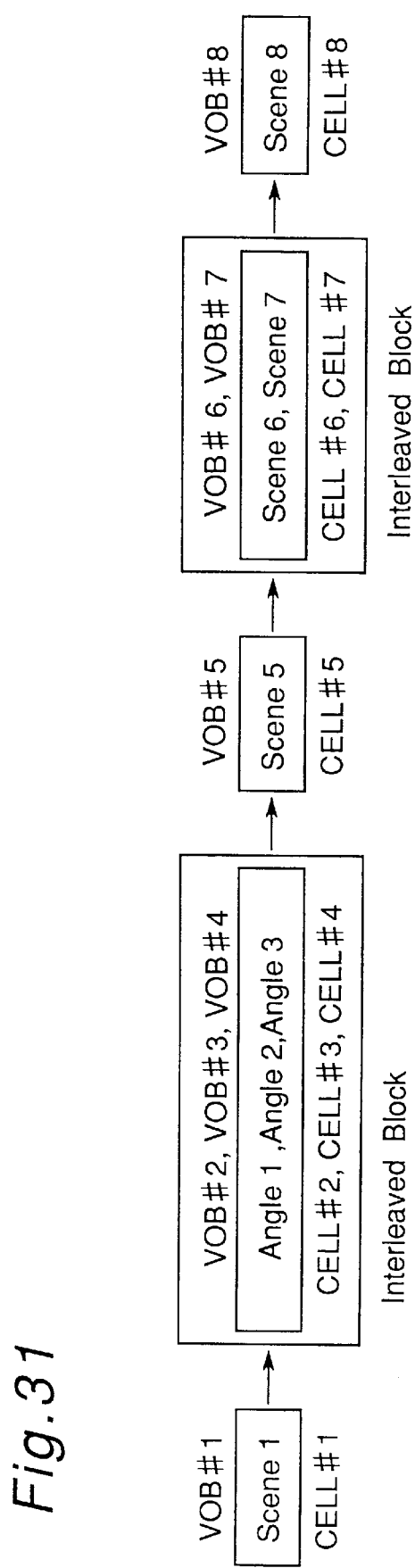
FIG. 31 is a graph schematically showing another example of the contents of the program chain information according to the present invention.

With reference to FIGS. 30 and 31, furthermore, the contents of the program chain information VTS_PGCI are described. In FIG. 30, the case that a scenario requested by the user is shown with respect to a VTSI data construction. The scenario 1 and scenario 2 shown in FIG. 21 are described as program chain information VTS_PGC#1 and VTS_PGC#2. VTS_PGC#1 describing the scenario 1 consists of cell playback information C_PBI#1 corresponding to scene 1, C_PBI#2, C_PBI#3, and C_PBI#4 within a multi-angle cell block, C_PBI#5 corresponding to scene 5, C_PBI#6 corresponding to scene 6, and C_PBI#7 corresponding to scene 8.

VTS_PGCI#2 describing the scenario 2 consists of cell playback information C_PBI#1 corresponding to scene 1, C_PBI#2, C_PBI#3, and C_PBI#4 within a multi-angle cell block corresponding to a multi-angle scene, C_PBI#5 corresponding to scene 5, C_PBI#6 corresponding to scene 7, and C_PBI#7 corresponding to scene 8. According to the digital video system data structure, a scene which is a control unit of a scenario is described as a cell which is a unit thereunder, thus a scenario requested by a user can be obtained.

In FIG. 31, the case that a scenario requested by the user shown in FIG. 21 is shown with respect to a VOB data construction VTSTT_VOBS. As specifically shown in FIG. 31, the two scenarios 1 and 2 use the same VOB data in common. With respect to a single scene commonly owned by each scenario, VOB#1 corresponding to scene 1, VOB#5 corresponding to scene 5, and VOB#8 corresponding to scene 8 are arranged in non-interleaved block which is the contiguous block.

With respect to the multi-angle data commonly owned by scenarios 1 and 2, one angle scene data is constructed by a single VOB. Specifically angle 1 is constructed by VOB#2, and angle 2 is constructed by VOB#3, angle 3 is constructed by VOB#4. Thus constructed multi-angle data is formed as the interleaved block for the sake of switching between each angle and seamless reproduction of each angle data. Scenes 6 and 7 peculiar to scenarios 1 and 2, respectively, are formed as the interleaved block for the sake of seamless reproduction between common scenes before and behind thereof as well as seamless reproduction between each scene.

As described in the above, the user's requesting scenario shown in FIG. 21 can be realized by utilizing the video title playback control information shown in FIG. 30 and the title playback VOB data structure shown in FIG. 31.

Seamless Playback

The seamless playback capability briefly mentioned above with regard to the digital video disk system data structure is described below. Note that seamless playback refers to the reproduction in a digital video disk system of multimedia data including video, audio, and sub-picture data without intermittent breaks in the data or information between basic scene periods, between basic scene periods and multi-scene periods, and between multi-scene periods.

Hardware factors contributing to intermittent playback of this data and title content include decoder underflow, i.e., an imbalance between the source data input speed and the decoding speed of the input source data.

Other factors relate to the properties of the playback data. When the playback data is data that must be continuously reproduced for a constant time unit in order for the user to understand the content or information, e.g., audio data, data continuity is lost when the required continuous presentation time cannot be assured. Reproduction of such information whereby the required continuity is assured is referred to as "contiguous information reproduction," or "seamless information reproduction." Reproduction of this information when the required continuity cannot be assured is referred to as "non-continuous information reproduction," or "non-seamless information reproduction." It is obvious that continuous information reproduction and non-continuous information reproduction are, respectively, seamless and non-seamless reproduction.

Note that seamless reproduction can be further categorized as seamless data reproduction and seamless information reproduction. Seamless data reproduction is defined as preventing physical blanks or interruptions in the data playback (intermittent reproduction) as a result of a buffer underflow state, for example. Seamless information reproduction is defined as preventing apparent interruptions in the information when perceived by the user (intermittent presentation) when recognizing information from the playback data where there are no actual physical breaks in the data reproduction. The specific method enabling seamless reproduction as thus described is described later below with reference to FIGS. 23 and 24.

Interleaving

The DVD data system streams described above are recorded using an appropriate authoring encoder EC as a movie or other multimedia title on a DVD recording medium. Note that the following description refers to a movie as the multimedia title being processed, but it will be obvious that the invention shall not be so limited.

Supplying a single movie in a format enabling the movie to be used in plural different cultural regions or countries requires the script to be recorded in the various languages used in those regions or countries. It may even necessitate editing the content to conform to the mores and moral expectations of different cultures. Even using such a large-capacity storage system as the DVD system, however, it is necessary to reduce the bit rate, and therefore the image quality, if plural full-length titles edited from a single common source title are recorded to a single disk. This problem can be solved by recording the common parts of plural titles only once, and recording the segments different in each title for each different title only. This method makes it possible to record plural titles for different countries or cultures to a single optical disk without reducing the bit rate, and, therefore, retaining high image quality.

As shown in FIG. 21, the titles recorded to a single optical disk contain basic scene periods of scenes common to all scenarios, and multi-scene periods containing scenes specific to certain scenarios, to provide parental lock control and multi-angle scene control functions.

In the case of the parental lock control function, titles containing sex scenes, violent scenes, or other scenes deemed unsuitable for children, i.e., so-called "adult scenes," are recorded with a combination of common scenes, adult scenes, and children's scenes. These title streams are achieved by arraying the adult and children's scenes to multi-scene periods between the common basic scene periods.

Multi-angle control can be achieved in a conventional single-angle title by recording plural multimedia scenes obtained by recording the subjects from the desired plural camera angles to the multi-scene periods arrayed between the common basic scene periods. Note, however, that while these plural scenes are described here as scenes recorded from different camera angles (positions), it will be obvious that the scenes may be recorded from the same camera angle but at different times, data generated by computer graphics, or other video data.

When data is shared between different scenarios of a single title, it is obviously necessary to move the laser beam LS from the common scene data to the non-common scene data during reproduction, i.e., to move the optical pickup to a different position on the DVD recording medium RC1. The problem here is that the time required to move the optical pickup makes it difficult to continue reproduction without creating breaks in the audio or video, i.e., to sustain seamless reproduction. This problem can be theoretically solved by providing a track buffer (stream buffer 2400) to delay data output an amount equivalent to the worst access time. In general, data recorded to an optical disk is read by the optical pickup, appropriately processed, and temporarily stored to the track buffer. The stored data is subsequently decoded and reproduced as video or audio data.

Definition of Interleaving

To thus enable the user to selectively excise scenes and choose from among plural scenes, a state wherein non-selected scene data is recorded inserted between common scene data and selective scene data necessarily occurs because the data units associated with individual scenes are contiguously recorded to the recording tracks of the recording medium. If data is then read in the recorded sequence, non-selected scene data must be accessed before accessing and decoding the selected scene data, and seamless connections with the selected scene are difficult. The excellent random access characteristics of the digital video disk system, however, make seamless connections with the selected scenes possible.

In other words, by splitting scene-specific data into plural units of a specified data size, and interleaving plural split data units for different scenes in a predefined sequence that is recorded to disk within the jumping range whereby an data underflow state does not occur, it is possible to reproduce the selected scenes without data interruptions by intermittently accessing and decoding the data specific to the selected scenes using these split data units. Seamless data reproduction is thereby assured.

Interleaved Block and Interleave Unit

Figure 24:
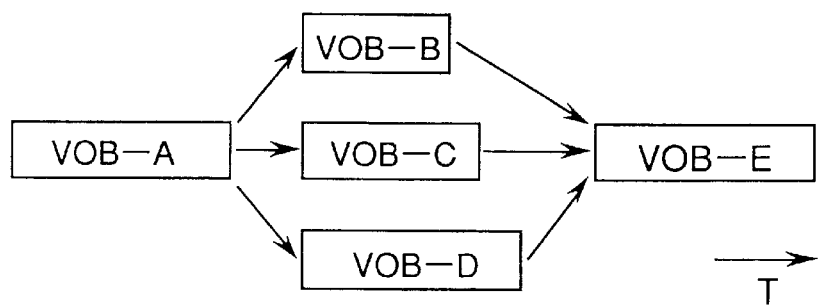
FIG. 24 is a graph in assistance of explaining a concept of multi scene data connection.

The interleaving method enabling seamless data reproduction according to the present invention is described below with reference to FIG. 24 and FIG. 65. Shown in FIG. 24 is a case from which three scenarios may be derived, i.e., branching from one video object VOB-A to one of plural video objects VOB-B, VOB-C, and VOB-D, and then merging back again to a single video object VOB-E. The actual arrangement of these blocks recorded to a data recording track TR on disk is shown in FIG. 65.

Figure 65:
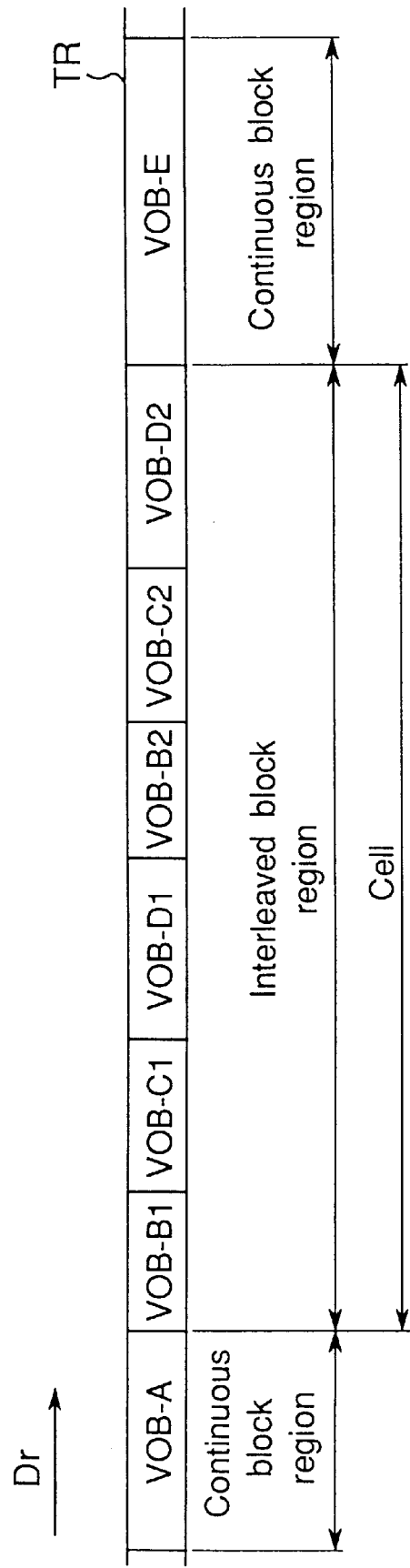
FIG. 65 is a graph schematically showing an actual arrangement of data blocks recorded to a data recording track on a recording medium according to the present invention.

Referring to FIG. 65, VOB-A and VOB-E are video objects with independent playback start and end times, and are in principle arrayed to contiguous block regions. As shown in FIG. 24, the playback start and end times of VOB-B, VOB-C, and VOB-D are aligned during interleaving. The interleaved data blocks are then recorded to disk to a contiguous interleaved block region. The contiguous block regions and interleaved block regions are then written to disk in the track path Dr direction in the playback sequence. Plural video objects VOB, i.e., interleaved video objects VOBS, arrayed to the data recording track TR are shown in FIG. 65.

Referring to FIG. 65, data regions to which data is continuously arrayed are called "blocks," of which there are two types: "contiguous block regions" in which VOB with discrete starting and end points are contiguously arrayed, and "interleaved block regions" in which plural VOB with aligned starting and end points are interleaved. The respective blocks are arrayed as shown in FIG. 66 in the playback sequence, i.e., block 1, block 2, block 3, . . . block 7.

Figure 66:
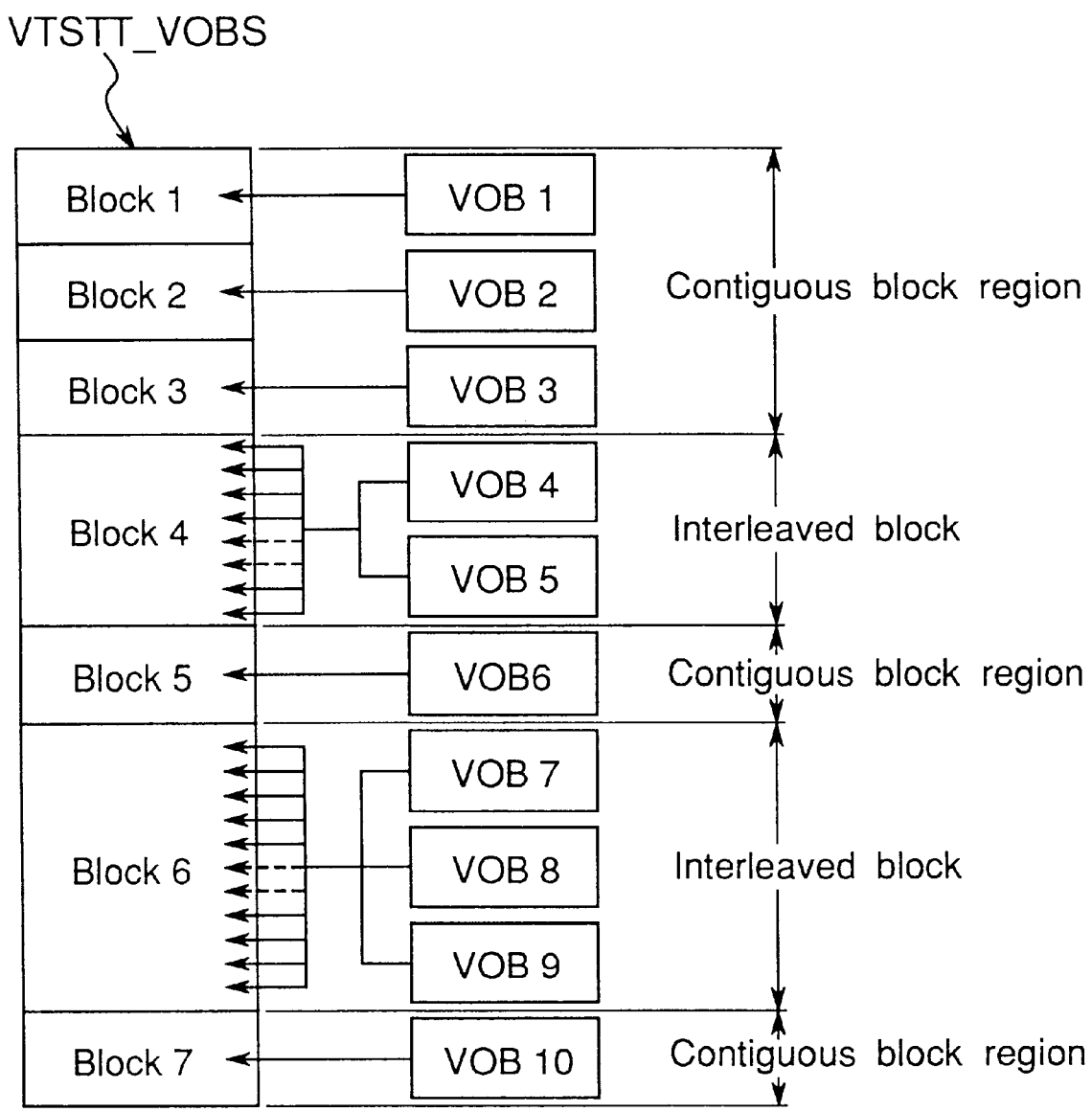
FIG. 66 is a graph schematically showing contiguous block regions and interleaved block regions array.

As shown in FIG. 66, the VTS title VOBS (VTSTT_VOBS) consist of blocks 1–7, inclusive. Block 1 contains VOB 1 alone. Blocks 2, 3, 5, and 7 similarly discretely contain VOBS 2, 3, 6, and 10. Blocks 2, 3, 5, and 7 are thus contiguous block regions.

Block 4, however, contains VOB 4 and VOB 5 interleaved together, while block 6 contains VOB 7, VOB 8, and VOB 9 interleaved together. Blocks 4 and 6 are thus interleaved block regions.

Figure 67:
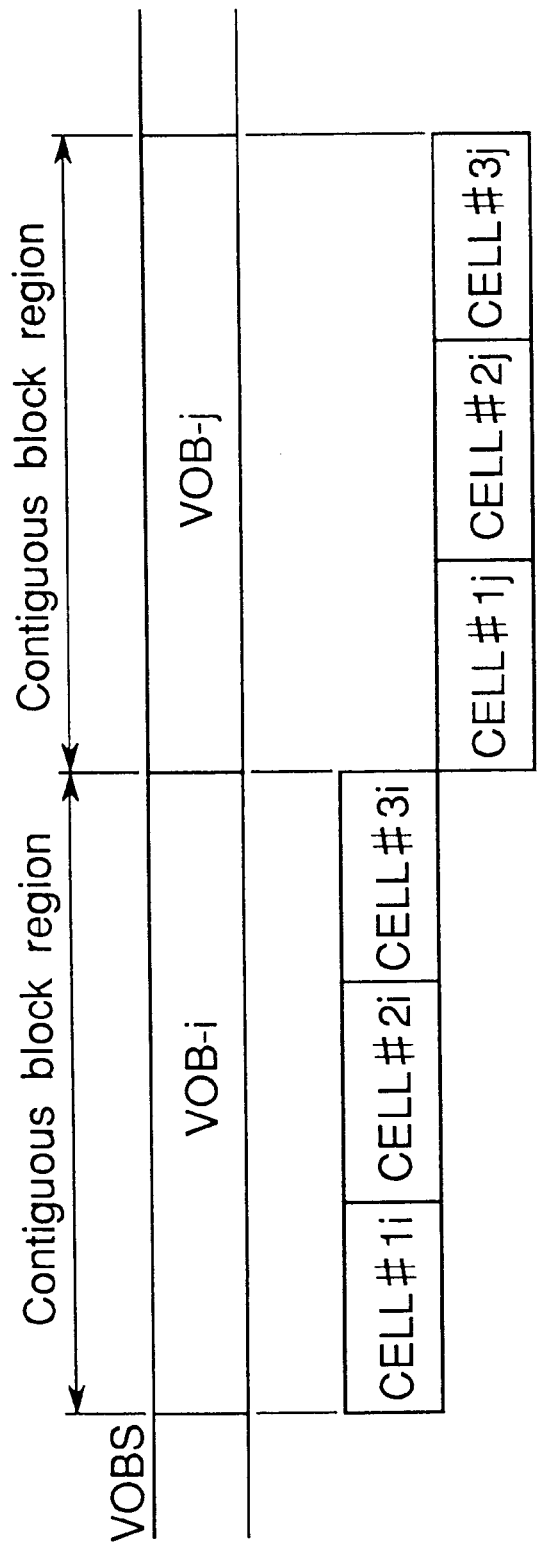
FIG. 67 is a graph schematically showing a content of a VTS title VOBS (VTSTT_VOBS) according to the present invention.

The internal data structure of the contiguous block regions is shown in FIG. 67 with VOB-i and VOB-j arrayed as the contiguous blocks in the VOBs. As described with reference to FIG. 16, VOB-i and VOB-j inside the contiguous block regions are further logically divided into cells as the playback unit. Both VOB-i and VOB-j in this figure are shown comprising three cells CELL #1, CELL #2, and CELL #3.

Each cell comprises one or more video object unit VOBU with the video object unit VOBU defining the boundaries of the cell. Each cell also contains information identifying the position of the cell in the program chain PGC (the playback control information of the digital video disk system). More specifically, this position information is the address of the first and last VOBU in the cell. As also shown in FIG. 67, these VOB and the cells defined therein are also recorded to a contiguous block region so that contiguous blocks are contiguously reproduced. Reproducing these contiguous blocks is therefore no problem.

The internal data structure of the interleaved block regions is shown in FIG. 68. In the interleaved block regions each video object VOB is divided into interleaved units ILVU, and the interleaved units ILVU associated with each VOB are alternately arrayed. Cell boundaries are defined independently of the interleaved units ILVU. For example, VOB-k is divided into four interleaved units ILVUk1, ILVUk2, ILVUk3, and ILVUk4, and are confined by a single cell CELL#k. VOB-k is likewise divided into four interleaved units ILVUm1, ILVUm2, ILVUm3, and ILVUm4, and is confined by a single cell CELL#m. Note that instead of a single cell CELL#k or CELL#m, each of VOB-k and VOB-m can be divided into more than two cells. The interleaved units ILVU thus contains both audio and video data.

In the example shown in FIG. 68, the interleaved units ILVUk1, ILVUk2, ILVUk3, and ILVUk4, and ILVUm1, ILVUm2, ILVUm3, and ILVUm4, from two different video objects VOB-k and VOB-m are alternately arrayed within a single interleaved block. By interleaving the interleaved units ILVU of two video objects VOB in this sequence, it is possible to achieve seamless reproduction branching from one scene to one of plural scenes, and from one of plural scenes to one scene.

Multi-scene Control

The multi-scene period is described together with the concept of multi-scene control according to the present invention using by way of example a title comprising scenes recorded from different angles.

Each scene in multi-scene control is recorded from the same angle, but may be recorded at different times or may even be computer graphics data. The multi-angle scene periods may therefore also be called multi-scene periods.

Parental Control

The concept of recording plural titles comprising alternative scenes for such functions as parental lock control and recording director's cuts is described below using FIG. 15.

Figure 15:
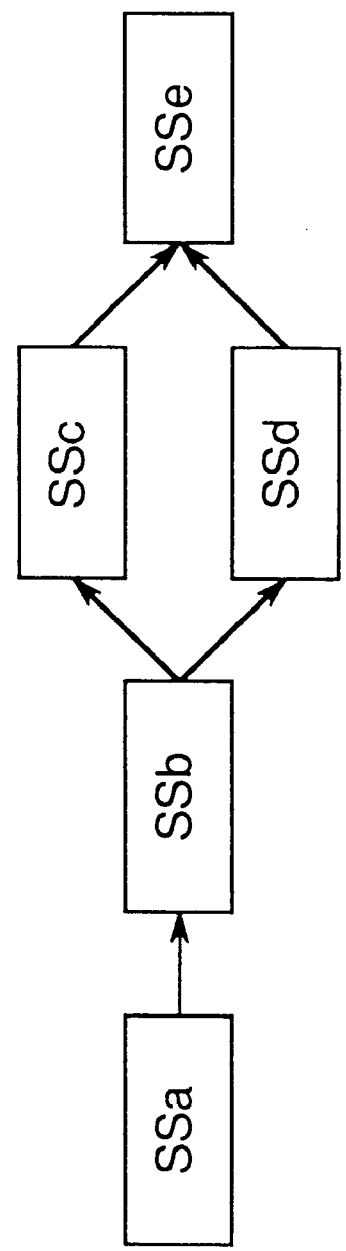
FIG. 15 is a graph in assistance of explaining a concept of parental control according to the present invention.

An example of a multi-rated title stream providing for parental lock control is shown in FIG. 15. When so-called "adult scenes" containing sex, violence, or other scenes deemed unsuitable for children are contained in a title implementing parental lock control, the title stream is recorded with a combination of common system streams SSa, SSb, and Sse, an adult-oriented system stream SSc containing the adult scenes, and a child-oriented system stream SSd containing only the scenes suitable for children. Title streams such as this are recorded as a multi-scene system stream containing the adult-oriented system stream Ssc and the child-oriented system stream Ssd arrayed to the multi-scene period between common system streams Ssb and Sse.

The relationship between each of the component titles and the system stream recorded to the program chain PGC of a title stream thus comprised is described below.

The adult-oriented title program chain PGC1 comprises in sequence the common system streams Ssa and Ssb, the adult-oriented system stream Ssc, and the common system stream Sse. The child-oriented title program chain PGC2 comprises in sequence the common system streams Ssa and Ssb, the child-oriented system stream Ssd, and the common system stream Sse.

By thus arraying the adult-oriented system stream Ssc and child-oriented system stream Ssd to a multi-scene period, the decoding method previously described can reproduce the title containing adult-oriented content by reproducing the common system streams Ssa and Ssb, then selecting and reproducing the adult-oriented system stream Ssc, and then reproducing the common system stream Sse as instructed by the adult-oriented title program chain PGC1. By alternatively following the child-oriented title program chain PGC2 and selecting the child-oriented system stream Ssd in the multi-scene period, a child-oriented title from which the adult-oriented scenes have been expurgated can be reproduced.

This method of providing in the title stream a multi-scene period containing plural alternative scenes, selecting which of the scenes in the multi-scene period are to be reproduced before playback begins, and generating plural titles containing essentially the same title content but different scenes in part, is called parental lock control.

Note that parental lock control is so named because of the perceived need to protect children from undesirable content. From the perspective of system stream processing, however, parental lock control is a technology for statically generating different title streams by means of the user pre-selecting specific scenes from a multi-scene period. Note, further, that this contrasts with multi-angle scene control, which is a technology for dynamically changing the content of a single title by means of the user selecting scenes from the multi-scene period freely and in real-time during title playback.

This parental lock control technology can also be used to enable title stream editing such as when making the director's cut. The director's cut refers to the process of editing certain scenes from a movie to, for example, shorten the total presentation time. This may be necessary, for example, to edit a feature-length movie for viewing on an airplane where the presentation time is too long for viewing within the flight time or certain content may not be acceptable. The movie director thus determines which scenes may be cut to shorten the movie. The title can then be recorded with both a full-length, unedited system stream and an edited system stream in which the edited scenes are recorded to multi-scene periods. At the transition from one system stream to another system stream in such applications, parental lock control must be able to maintain smooth playback image output. More specifically, seamless data reproduction whereby a data underflow state does not occur in the audio, video, or other buffers, and seamless information reproduction whereby no unnatural interruptions are audibly or visibly perceived in the audio and video playback, are necessary.

Multi-angle Control

Figure 33:
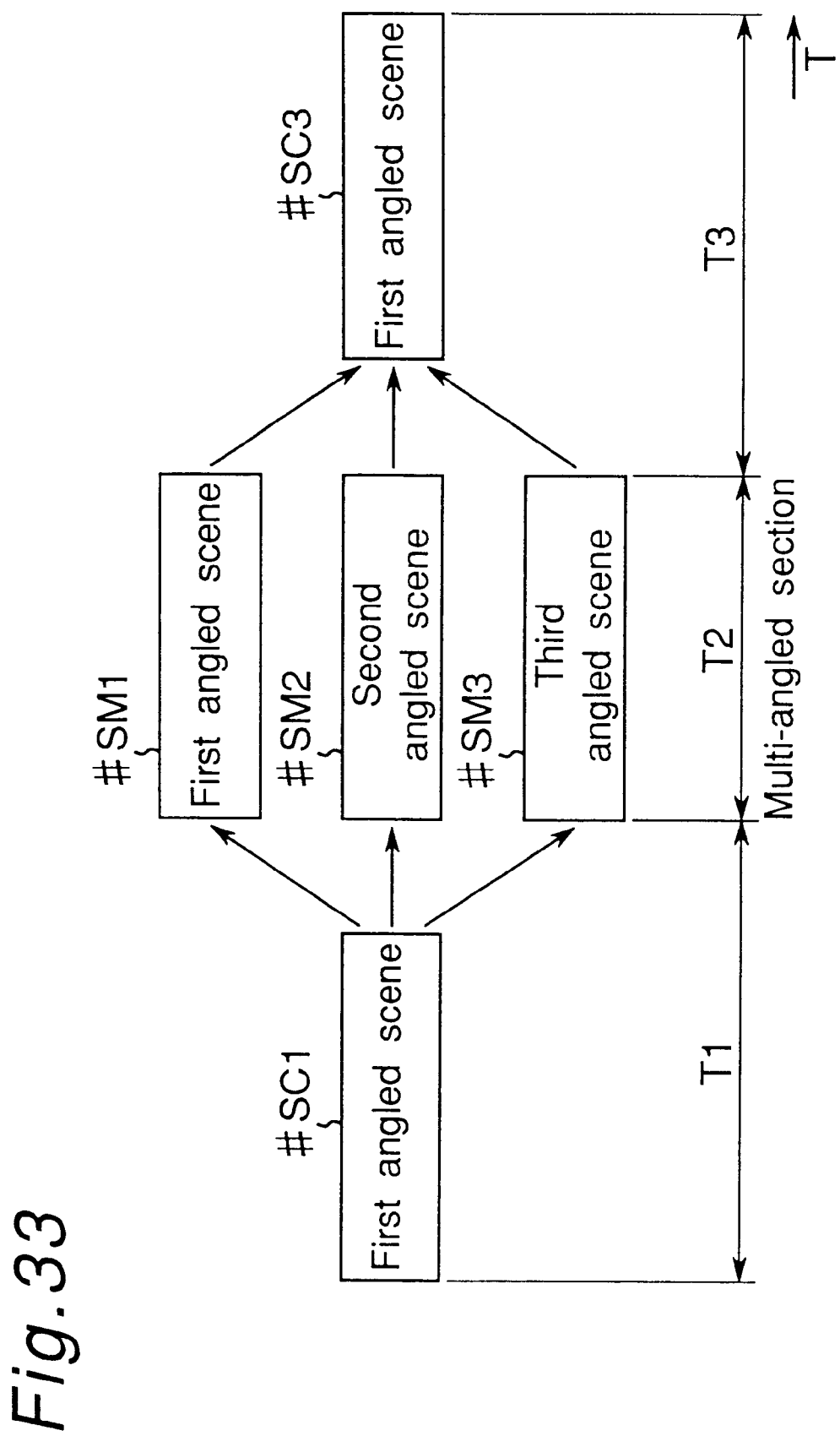
FIG. 33 is a graph in assistance of explaining a concept of multi-angle scene control according to the present in invention.

The concept of multi-angle scene control in the present invention is described next with reference to FIG. 33. In general, multimedia titles are obtained by recording both the audio and video information (collectively "recording" below) of the subject over time T. The angled scene blocks #SC1, #SM1, #SM2, #SM3, and #SC3 represent the multimedia scenes obtained at recording unit times T1, T2, and T3 by recording the subject at respective camera angles. Scenes #SM1, #SM2, and #SM3 are recorded at mutually different (first, second, and third) camera angles during recording unit time T2, and are referenced below as the first, second, and third angled scenes.

Note that the multi-scene periods referenced herein are basically assumed to comprise scenes recorded from different angles. The scenes may, however, be recorded from the same angle but at different times, or they may be computer graphics data. The multi-angle scene periods are thus the multi-scene periods from which plural scenes can be selected for presentation in the same time period, whether or not the scenes are actually recorded at different camera angles.

Scenes #SC1 and #SC3 are scenes recorded at the same common camera angle during recording unit times T1 and T3, i.e., before and after the multi-angle scenes. These scenes are therefore called "common angle scenes." Note that one of the multiple camera angles used in the multi-angle scenes is usually the same as the common camera angle.

To understand the relationship between these various angled scenes, multi-angle scene control is described below using a live broadcast of a baseball game for example only.

The common angle scenes #SC1 and #SC3 are recorded at the common camera angle, which is here defined as the view from center field on the axis through the pitcher, batter, and catcher.

The first angled scene #SM1 is recorded at the first multi-camera angle, i.e., the camera angle from the backstop on the axis through the catcher, pitcher, and batter. The second angled scene #SM2 is recorded at the second multi-camera angle, i.e., the view from center field on the axis through the pitcher, batter, and catcher. Note that the second angled scene #SM2 is thus the same as the common camera angle in this example. It therefore follows that the second angled scene #SM2 is the same as the common angle scene #SC2 recorded during recording unit time T2. The third angled scene #SM3 is recorded at the third multi-camera angle, i.e., the camera angle from the backstop focusing on the infield.

The presentation times of the multiple angle scenes #SM1, #SM2, and #SM3 overlap in recording unit time T2; this period is called the "multi-angle scene period." By freely selecting one of the multiple angle scenes #SM1, #SM2, and #SM3 in this multi-angle scene period, the viewer is able to change his or her virtual viewing position to enjoy a different view of the game as though the actual camera angle is changed. Note that while there appears to be a time gap between common angle scenes #SC1 and #SC3 and the multiple angle scenes #SM1, #SM2, and #SM3 in FIG. 33, this is simply to facilitate the use of arrows in the figure for easier description of the data reproduction paths reproduced by selecting different angled scenes. There is no actual time gap during playback.

Figure 23:
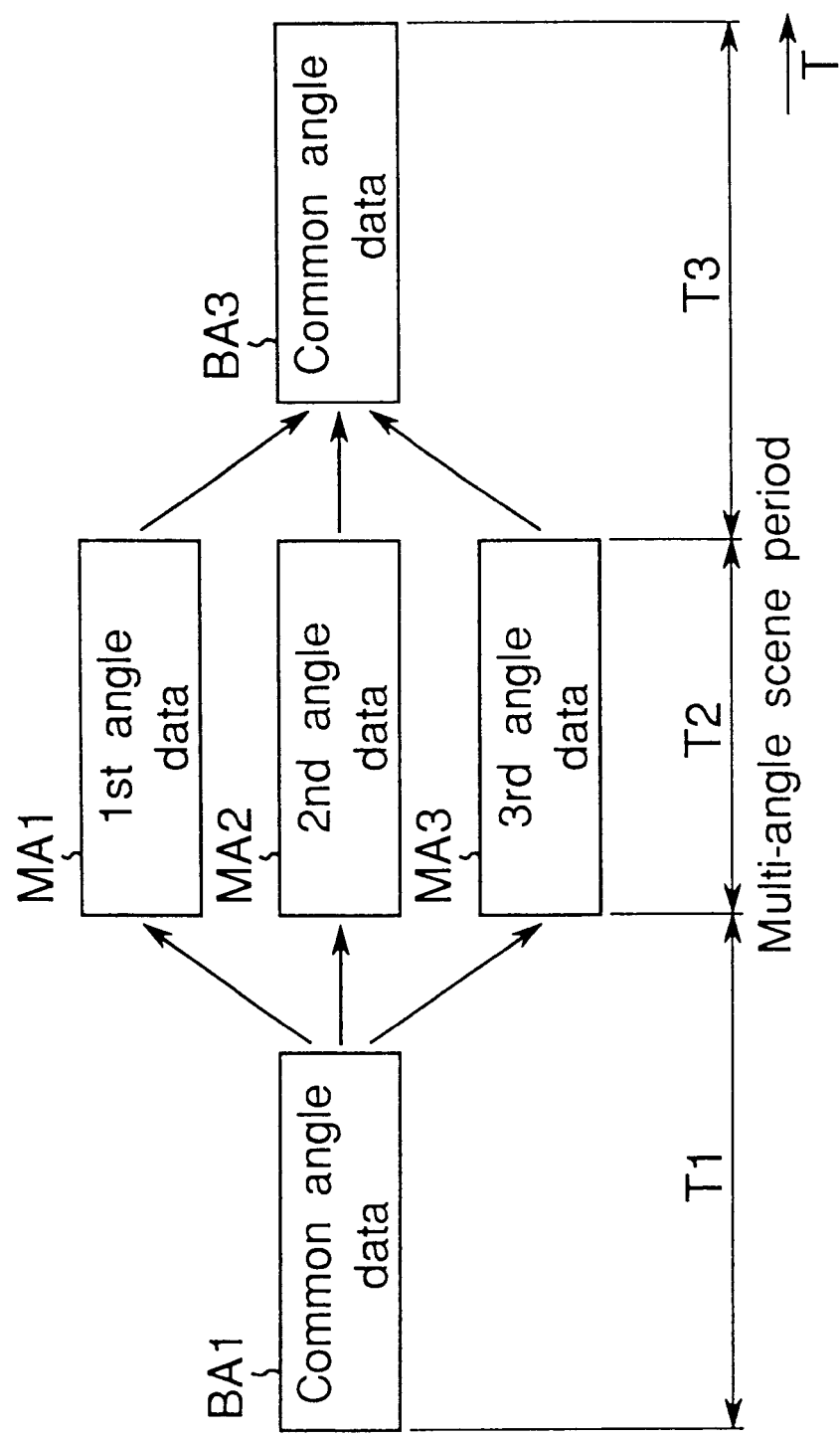
FIG. 23 is a graph in assistance of explaining a concept of Multi-angle scene control according to the present invention.

Multi-angle scene control of the system stream based on the present invention is described next with reference to FIG. 23 from the perspective of connecting data blocks. The multimedia data corresponding to common angle scene #SC is referenced as common angle data BA, and the common angle data BA in recording unit times T1 and T3 are referenced as BA1 and BA3, respectively. The multimedia data corresponding to the multiple angle scenes #SM1, #SM2, and #SM3 are referenced as first, second, and third angle scene data MA1, MA2, and MA3. As previously described with reference to FIG. 33, scenes from the desired angled can be viewed by selecting one of the multiple angle data units MA1, MA2, and MA3. There is also no time gap between the common angle data BA1 and BA3 and the multiple angle data units MA1, MA2, and MA3.

In the case of an MPEG system stream, however, intermittent breaks in the playback information can result between the reproduced common and multiple angle data units depending upon the content of the data at the connection between the selected multiple angle data unit MA1, MA2, and MA3 and the common angle data BA (either the first common angle data BA1 before the angle selected in the multi-angle scene period or the common angle data BA3 following the angle selected in the multi-angle scene period). The result in this case is that the title stream is not naturally reproduced as a single contiguous title, i.e., seamless data reproduction is achieved but non-seamless information reproduction results.

The multi-angle selection process whereby one of plural scenes is selectively reproduced from the multi-angle scene period with seamless information presentation to the scenes before and after is described below with application in a digital video disk system using FIG. 23.

Changing the scene angle, i.e., selecting one of the multiple angle data units MA1, MA2, and MA3, must be completed before reproduction of the preceding common angle data BA1 is completed. It is extremely difficult, for example, to change to a different angle data unit MA2 during reproduction of common angle data BA1. This is because the multimedia data has a variable length coded MPEG data structure, which makes it difficult to find the data break points (boundaries) in the selected data blocks. The video may also be disrupted when the angle is changed because inter-frame correlations are used in the coding process. The group_of_pictures GOP processing unit of the MPEG standard contains at least one refresh frame, and closed processing not referencing frames belonging to another GOP is possible within this GOP processing unit.

In other words, if the desired angle data, e. g., MA3, is selected before reproduction reaches the multi-angle scene period, and at the latest by the time reproduction of the preceding common angle data BA1 is completed, the angle data selected from within the multi-angle scene period can be seamlessly reproduced. However, it is extremely difficult while reproducing one angle to select and seamlessly reproduce another angle within the same multi-angle scene period. It is therefore difficult when in a multi-angle scene period to dynamically select a different angle unit presenting, for example, a view from a different camera angle.

Flow Chart: Encoder

The encoding information table generated by the encoding system controller 200 from information extracted from the scenario data St7 is described below referring to FIG. 27.

The encoding information table contains VOB set data streams containing plural VOB corresponding to the scene periods beginning and ending at the scene branching and connecting points, and VOB data streams corresponding to each scene. These VOB set data streams shown in FIG. 27 are the encoding information tables generated at step #100 in FIG. 34 by the encoding system controller 200 for creating the DVD multimedia stream based on the user-defined title content.

The user-defined scenario contains branching points from common scenes to plural scenes, or connection points to other common scenes. The VOB corresponding to the scene period delimited by these branching and connecting points is a VOB set, and the data generated to encode a VOB set is the VOB set data stream. The title number specified by the VOB set data stream is the title number TITLE_NO of the VOB set data stream.

Figure 27:
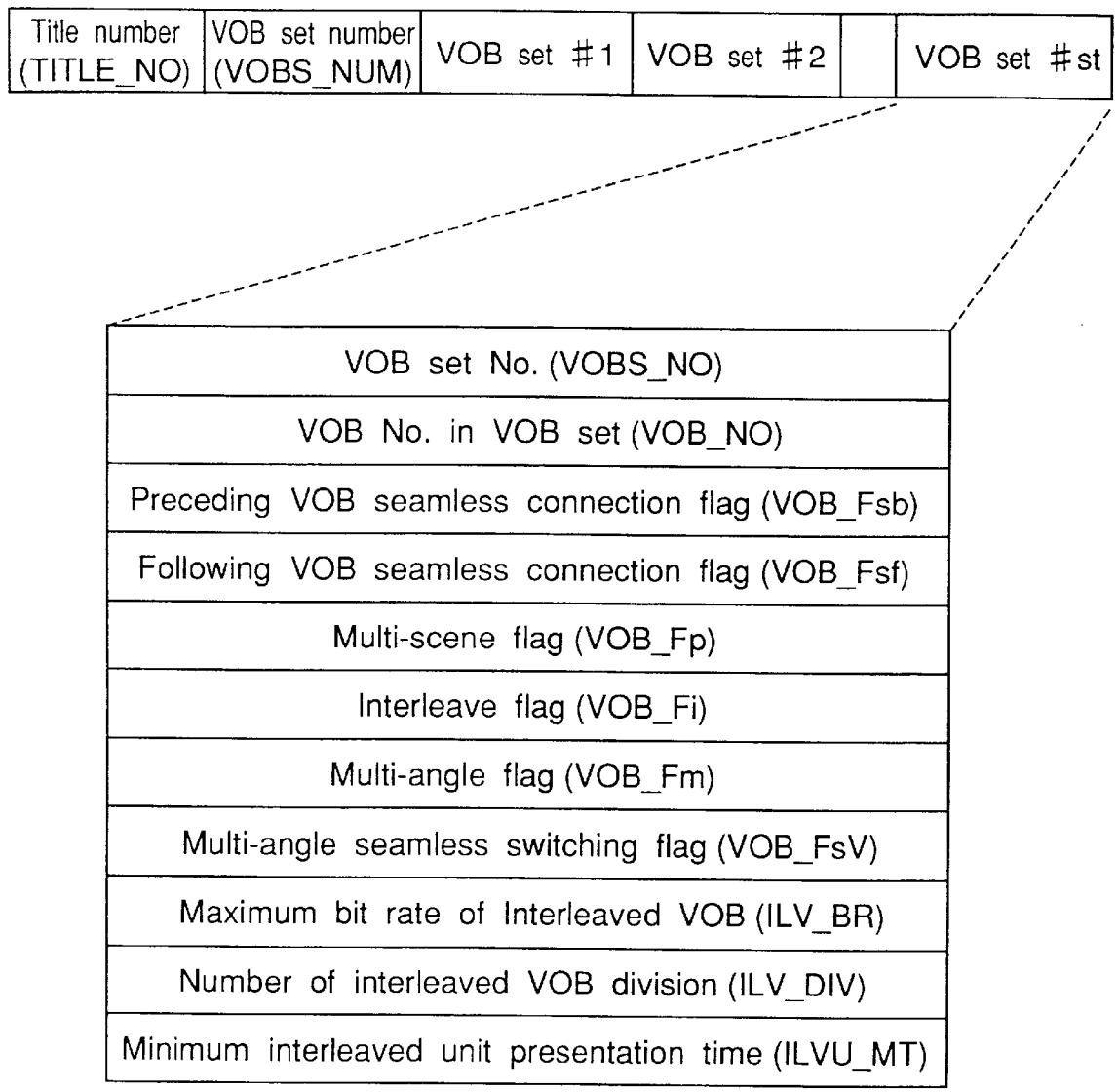
FIG. 27 is a graph schematically showing an encoding information table generated by the encoding system controller of FIG. 25.

The VOB Set data structure in FIG. 27 shows the data content for encoding one VOB set in the VOB set data stream, and comprises: the VOB set number VOBS_NO, the VOB number VOB_NO in the VOB set, the preceding VOB seamless connection flag VOB_Fsb, the following VOB seamless connection flag VOB_Fsf, the multi-scene flag VOB_Fp, the interleave flag VOB_Fi, the multi-angle flag VOB_Fm, the multi-angle seamless switching flag VOB_FSV, the maximum bit rate of the interleaved VOB ILV_BR, the number of interleaved VOB divisions ILV_DIV, and the minimum interleaved unit presentation time ILVU_MT.

The VOB set number VOBS_NO is a sequential number identifying the VOB set and the position of the VOB set in the reproduction sequence of the title scenario.

The VOB number VOB_NO is a sequential number identifying the VOB and the position of the VOB in the reproduction sequence of the title scenario.

The preceding VOB seamless connection flag VOB_Fsb indicates whether a seamless connection with the preceding VOB is required for scenario reproduction.

The following VOB seamless connection flag VOB_Fsf indicates whether there is a seamless connection with the following VOB during scenario reproduction.

The multi-scene flag VOB_Fp identifies whether the VOB set comprises plural video objects VOB.

The interleave flag VOB_Fi identifies whether the VOB in the VOB set are interleaved.

The multi-angle flag VOB_Fm identifies whether the VOB set is a multi-angle set.

The multi-angle seamless switching flag VOB_FsV identifies whether angle changes within the multi-angle scene period are seamless or not.

The maximum bit rate of the interleaved VOB ILV_BR defines the maximum bit rate of the interleaved VOBs.

The number of interleaved VOB divisions ILV_DIV identifies the number of interleave units in the interleaved VOB.

The minimum interleave unit presentation time ILVU_MT defines the time that can be reproduced when the bit rate of the smallest interleave unit at which a track buffer data underflow state does not occur is the maximum bit rate of the interleaved VOB ILV_BR during interleaved block reproduction.

The encoding information table for each VOB generated by the encoding system controller 200 based on the scenario data St7 is described below referring to FIG. 28. The VOB encoding parameters described below and supplied to the video encoder 300, audio encoder 700, and system encoder 900 for stream encoding are produced based on this encoding information table.

Figure 28:
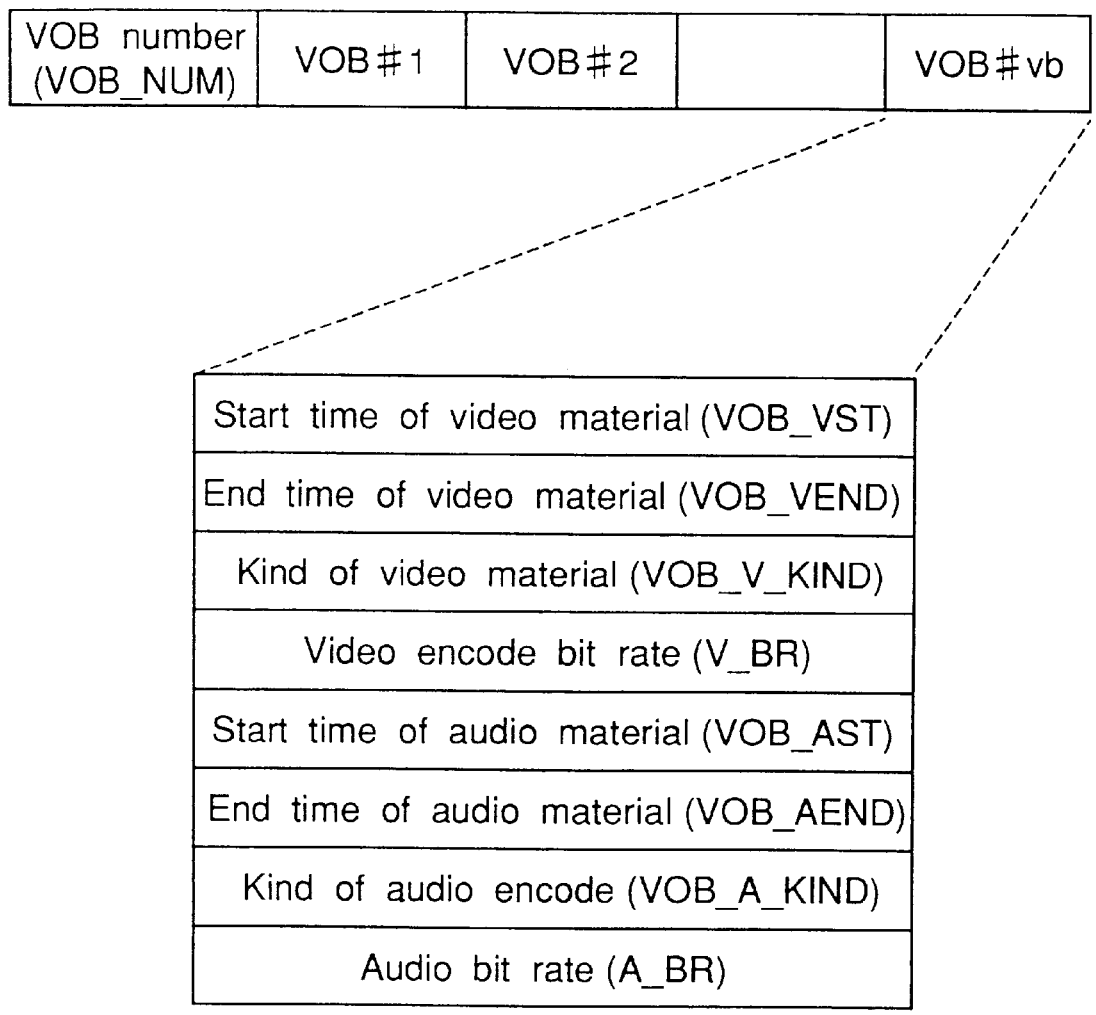
FIG. 28 is a graph schematically showing an encoding information table.
Figure 51:
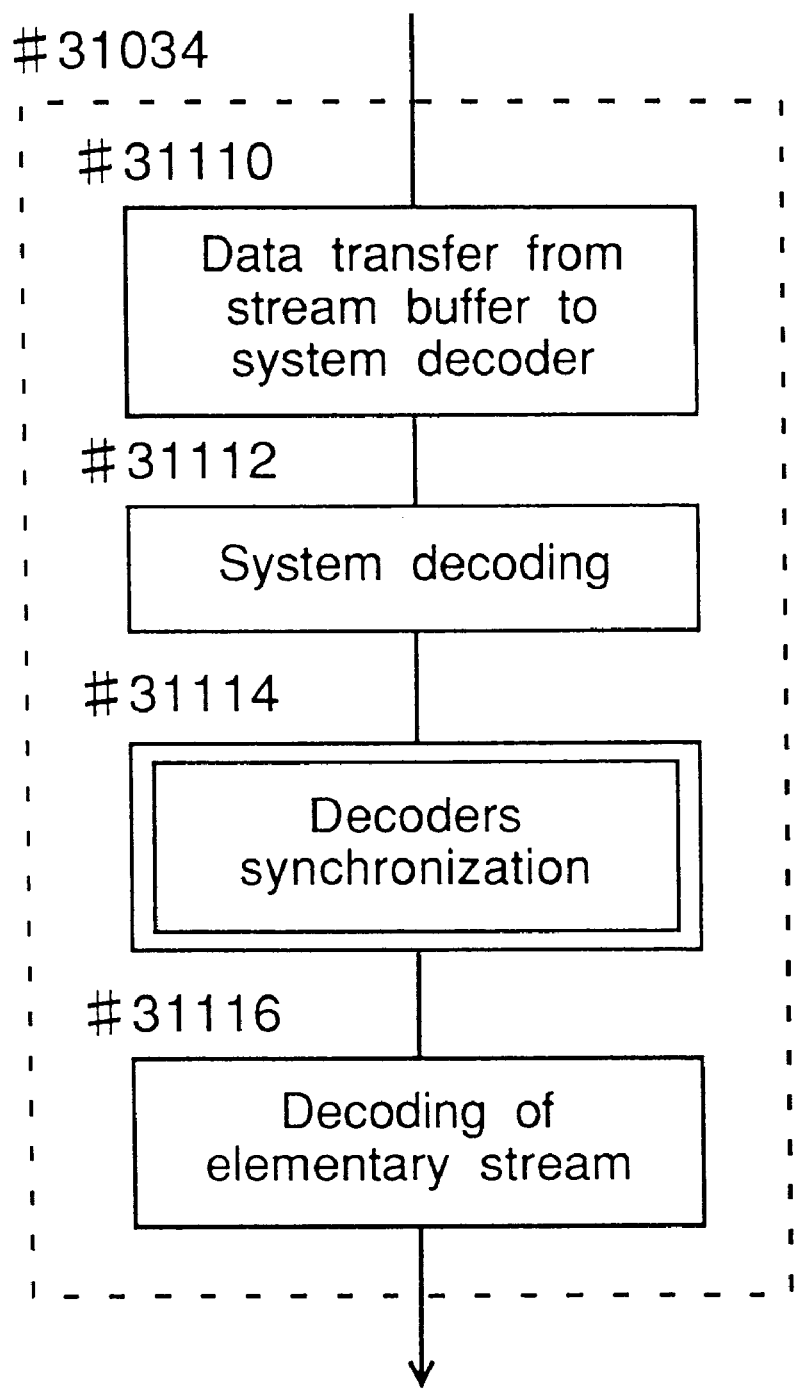
FIG. 51 is a flow chart showing details of the decoding data process of FIG. 50, performed by the stream buffer, is shown.

The VOB data streams shown in FIG. 28 are the encoding information tables generated at step #100 in FIG. 51 by the encoding system controller 200 for creating the DVD multimedia stream based on the user-defined title content.

The encoding unit is the video object VOB, and the data generated to encode each video object VOB is the VOB data stream. For example, a VOB set comprising three angle scenes comprises three video objects VOB. The data structure shown in FIG. 28 shows the content of the data for encoding one VOB in the VOB data stream.

The VOB data structure contains the video material start time VOB_VST, the video material end time VOB_VEND, the video signal type VOB_V_KIND, the video encoding bit rate V_BR, the audio material start time VOB_AST, the audio material end time VOB_AEND, the audio coding method VOB_A_KIND, and the audio encoding bit rate A_BR.

The video material start time VOB_VST is the video encoding start time corresponding to the time of the video signal.

The video material end time VOB_VEND is the video encoding end time corresponding to the time of the video signal.

The video material type VOB_V_KIND identifies whether the encoded material is in the NTSC or PAL format, for example, or is photographic material (a movie, for example) converted to a television broadcast format (so-called telecine conversion).

The video encoding bit rate V_BR is the bit rate at which the video signal is encoded.

The audio material start time VOB_AST is the audio encoding start time corresponding to the time of the audio signal.

The audio material end time VOB_AEND is the audio encoding end time corresponding to the time of the audio signal.

The audio coding method VOB_A_KIND identifies the audio encoding method as AC-3, MPEG, or linear PCM, for example.

The audio encoding bit rate A_BR is the bit rate at which the audio signal is encoded.

The encoding parameters used by the video encoder 300, sub-picture encoder 500, and audio encoder 700, and system encoder 900 for VOB encoding are shown in FIG. 29. The encoding parameters include: the VOB number VOB_NO, video encode start time V_STTM, video encode end time V_ENDTM, the video encode mode V_ENCMD, the video encode bit rate V_RATE, the maximum video encode bit rate V_MRATE, the GOP structure fixing flag GOP_Fxflag, the video encode GOP structure GOPST, the initial video encode data V_INTST, the last video encode data V_ENDST, the audio encode start time A_STTM, the audio encode end time A_ENDTM, the audio encode bit rate A_RATE, the audio encode method A_ENCMD, the audio start gap A_STGAP, the audio end gap A_ENDGAP, the preceding VOB number B_VOB_NO, and the following VOB number F_VOB_NO.

The VOB number VOB_NO is a sequential number identifying the VOB and the position of the VOB in the reproduction sequence of the title scenario.

The video encode start time V_STTM is the start time of video material encoding.

The video encode end time V_ENDTM is the end time of video material encoding.

The video encode mode V_ENCMD is an encoding mode for declaring whether reverse telecine conversion shall be accomplished during video encoding to enable efficient coding when the video material is telecine converted material.

The video encode bit rate V_RATE is the average bit rate of video encoding.

The maximum video encode bit rate V_MRATE is the maximum bit rate of video encoding.

The GOP structure fixing flag GOP_Fxflag specifies whether encoding is accomplished without changing the GOP structure in the middle of the video encoding process. This is a useful parameter for declaring whether seamless switch is enabled in a multi-angle scene period.

The video encode GOP structure GOPST is the GOP structure data from encoding.

The initial video encode data V_INTST sets the initial value of the VBV buffer (decoder buffer) at the start of video encoding, and is referenced during video decoding to initialize the decoding buffer. This is a useful parameter for declaring seamless reproduction with the preceding encoded video stream.

The last video encode data V_ENDST sets the end value of the VBV buffer (decoder buffer) at the end of video encoding, and is referenced during video decoding to initialize the decoding buffer. This is a useful parameter for declaring seamless reproduction with the preceding encoded video stream.

The audio encode start time A_STTM is the start time of audio material encoding.

The audio encode end time A_ENDTM is the end time of audio material encoding.

The audio encode bit rate A_RATE is the bit rate used for audio encoding.

The audio encode method A_ENCMD identifies the audio encoding method as AC-3, MPEG, or linear PCM, for example.

The audio start gap A_STGAP is the time offset between the start of the audio and video presentation at the beginning of a VOB. This is a useful parameter for declaring seamless reproduction with the preceding encoded system stream.

The audio end gap A_ENDGAP is the time offset between the end of the audio and video presentation at the end of a VOB. This is a useful parameter for declaring seamless reproduction with the preceding encoded system stream.

The preceding VOB number B_VOB_NO is the VOB_NO of the preceding VOB when there is a seamlessly connected preceding VOB.

The following VOB number F_VOB_NO is the VOB_NO of the following VOB when there is a seamlessly connected following VOB.

The operation of a DVD encoder ECD according to the present invention is described below with reference to the flow chart in FIG. 34. Note that the steps shown with a double line are subroutines. It should be obvious that while the operation described below relates specifically in this case to the DVD encoder ECD of the present invention, the operation described also applies to an authoring encoder EC.

At step #100, the user inputs the editing commands according to the user-defined scenario while confirming the content of the multimedia source data streams St1, St2, and St3.

At step #200, the scenario editor 100 generates the scenario data St7 containing the above edit command information according to the user's editing instructions.

When generating the scenario data St7 in step #200, the user editing commands related to multi-angle and parental lock multi-scene periods in which interleaving is presumed must be input to satisfy the following conditions.

First, the VOB maximum bit rate must be set to assure sufficient image quality, and the track buffer capacity, jump performance, jump time, and jump distance of the DVD decoder DCD used as the reproduction apparatus of the DVD encoded data must be determined. Based on these values, the reproduction time of the shortest interleaved unit is obtained from equations 3 and 4. Based on the reproduction time of each scene in the multi-scene period, it must then be determined whether equations 5 and 6 are satisfied. If equations 5 and 6 are not satisfied, the user must change the edit commands until equations 5 and 6 are satisfied by, for example, connecting part of the following scene to each scene in the multi-scene period.

When multi-angle edit commands are used, equation 7 must be satisfied for seamless switching, and edit commands matching the audio reproduction time with the reproduction time of each scene in each angle must be entered. If non-seamless switching is used, the user must enter commands to satisfy equation 8.

At step #300, the encoding system controller 200 first determines whether the target scene is to be seamlessly connected to the preceding scene based on the scenario data St7.

Note that when the preceding scene period is a multi-scene period comprising plural scenes but the presently selected target scene is a common scene (not in a multi-scene period), a seamless connection refers to seamlessly connecting the target scene with any one of the scenes contained in the preceding multi-scene period. When the target scene is a multi-scene period, a seamless connection still refers to seamlessly connecting the target scene with any one of the scenes from the same multi-scene period.

If step #300 returns NO, i.e., a non-seamless connection is valid, the procedure moves to step #400.

At step #400, the encoding system controller 200 resets the preceding VOB seamless connection flag VOB_Fsb indicating whether there is a seamless connection between the target and preceding scenes. The procedure then moves to step #600.

On the other hand, if step #300 returns YES, i.e., there is a seamless connection to the preceding scene, the procedure moves to step #500.

At step #500 the encoding system controller 200 sets the preceding VOB seamless connection flag VOB_Fsb. The procedure then moves to step #600.

At step #600 the encoding system controller 200 determines whether there is a seamless connection between the target and following scenes based on scenario data St7. If step #600 returns NO, i.e., a non-seamless connection is valid, the procedure moves to step #700.

At step #700, the encoding system controller 200 resets the following VOB seamless connection flag VOB_Fsf indicating whether there is a seamless connection with the following scene. The procedure then moves to step #900.

However, if step #600 returns YES, i.e., there is a seamless connection to the following scene, the procedure moves to step #800.

At step #800 the encoding system controller 200 sets the following VOB seamless connection flag VOB_Fsf. The procedure then moves to step #900.

At step #900 the encoding system controller 200 determines whether there is more than connection target scene, i.e., whether a multi-scene period is selected, based on the scenario data St7. As previously described, there are two possible control methods in multi-scene periods: parental lock control whereby only one of plural possible reproduction paths that can be constructed from the scenes in the multi-scene period is reproduced, and multi-angle control whereby the reproduction path can be switched within the multi-scene period to present different viewing angles.

If step #900 returns NO, i.e., there are not multiple scenes, the procedure moves to step #1000.

At step #1000 the multi-scene flag VOB_Fp identifying whether the VOB set comprises plural video objects VOB (a multi-scene period is selected) is reset, and the procedure moves to step #1800 for encode parameter production. This encode parameter production subroutine is described below.

However, if step #900 returns YES, there is a multi-scene connection, the procedure moves to step #1100.

At step #1100, the multi-scene flag VOB_Fp is set, and the procedure moves to step #1200 whereat it is judged whether a multi-angle connection is selected, or not.

At step #1200 it is determined whether a change is made between plural scenes in the multi-scene period, i.e., whether a multi-angle scene period is selected. If step #1200 returns NO, i.e., no scene change is allowed in the multi-scene period as parental lock control reproducing only one reproduction path has been selected, the procedure moves to step #1300.

At step #1300 the multi-angle flag VOB_Fm identifying whether the target connection scene is a multi-angle scene is reset, and the procedure moves to step #1302.

At step #1302 it is determined whether either the preceding VOB seamless connection flag VOB_Fsb or following VOB seamless connection flag VOB_Fsf is set. If step #1302 returns YES, i.e., the target connection scene seamlessly connects to the preceding, the following, or both the preceding and following scenes, the procedure moves to step #1304.

At step #1304 the interleave flag VOB_Fi identifying whether the VOB, the encoded data of the target scene, is interleaved is set. The procedure then moves to step #1800.

However, if step #1302 returns NO, i.e., the target connection scene does not seamlessly connect to the preceding or following scene, the procedure moves to step #1306.

At step #1306 the interleave flag VOB_Fi is reset, and the procedure moves to step #1800.

If step #1200 returns YES, however, i.e., there is a multi-angle connection, the procedure moves to step #1400.

At step #1400, the multi-angle flag VOB_Fm and interleave flag VOB_Fi are set, and the procedure moves to step #1500.

At step #1500 the encoding system controller 200 determines whether the audio and video can be seamlessly switched in a multi-angle scene period, i.e., at a reproduction unit smaller than the VOB, based on the scenario data St7. If step #1500 returns NO, i.e., non-seamless switching occurs, the procedure moves to step #1600.

At step #1600 the multi-angle seamless switching flag VOB_FsV indicating whether angle changes within the multi-angle scene period are seamless or not is reset, and the procedure moves to step #1800.

However, if step #1500 returns YES, i.e., seamless switching occurs, the procedure moves to step #1700.

At step #1700 the multi-angle seamless switching flag VOB_FsV is set, and the procedure moves to step #1800.

Therefore, as shown by the flow chart in FIG. 34, encode parameter production (step #1800) is only begun after the editing information is detected from the above flag settings in the scenario data St7 reflecting the user-defined editing instructions.

Based on the user-defined editing instructions detected from the above flag settings in the scenario data St7, information is added to the encoding information tables for the VOB Set units and VOB units as shown in FIGS. 27 and 28 to encode the source streams, and the encoding parameters of the VOB data units shown in FIG. 29 are produced, in step #1800. The procedure then moves to step #1900 for audio and video encoding.

The encode parameter production steps (step #1800) are described in greater detail below referring to FIGS. 35, 36, 37, and 38.

Based on the encode parameters produced in step #1800, the video data and audio data are encoded in step #1900, and the procedure moves to step #2000.

Note that the sub-picture data is normally inserted during video reproduction on an as-needed basis, and contiguity with the preceding and following scenes is therefore not usually necessary. Moreover, the sub-picture data is normally video information for one frame, and unlike audio and video data having an extended time-base, sub-picture data is usually static, and is not normally presented continuously. Because the present invention relates specifically to seamless and non-seamless contiguous reproduction as described above, description of sub-picture data encoding is omitted herein for simplicity.

Step #2000 is the last step in a loop comprising steps #300 to step #2000, and causes this loop to be repeated as many times as there are VOB Sets. This loop formats the program chain VTS_PGC#i to contain the reproduction sequence and other reproduction information for each VOB in the title (FIG. 16) in the program chain data structure, interleaves the VOB in the multi-scene periods, and completes the VOB Set data stream and VOB data stream needed for system stream encoding. The procedure then moves to step #2100.

At step #2100 the VOB Set data stream is completed as the encoding information table by adding the total number of VOB Sets VOBS_NUM obtained as a result of the loop through step #2000 to the VOB Set data stream, and setting the number of titles TITLE_NO defining the number of scenario reproduction paths in the scenario data St7. The procedure then moves to step #2200.

System stream encoding producing the VOB (VOB#i) data in the VTS title VOBS (VTSTT_VOBS) (FIG. 16) is accomplished in step #2200 based on the encoded video stream and encoded audio stream output from step #1900, and the encode parameters in FIG. 29. The procedure then moves to step #2300.

At step #2300 the VTS information VTSI, VTSI management table VTSI_MAT, VTSPGC information table VTS_PGCIT, and the program chain information VTS_PGCI#i controlling the VOB data reproduction sequence shown in FIG. 16 are produced, and formatting to, for example, interleave the VOB contained in the multi-scene periods, is accomplished.

Figure 34B:
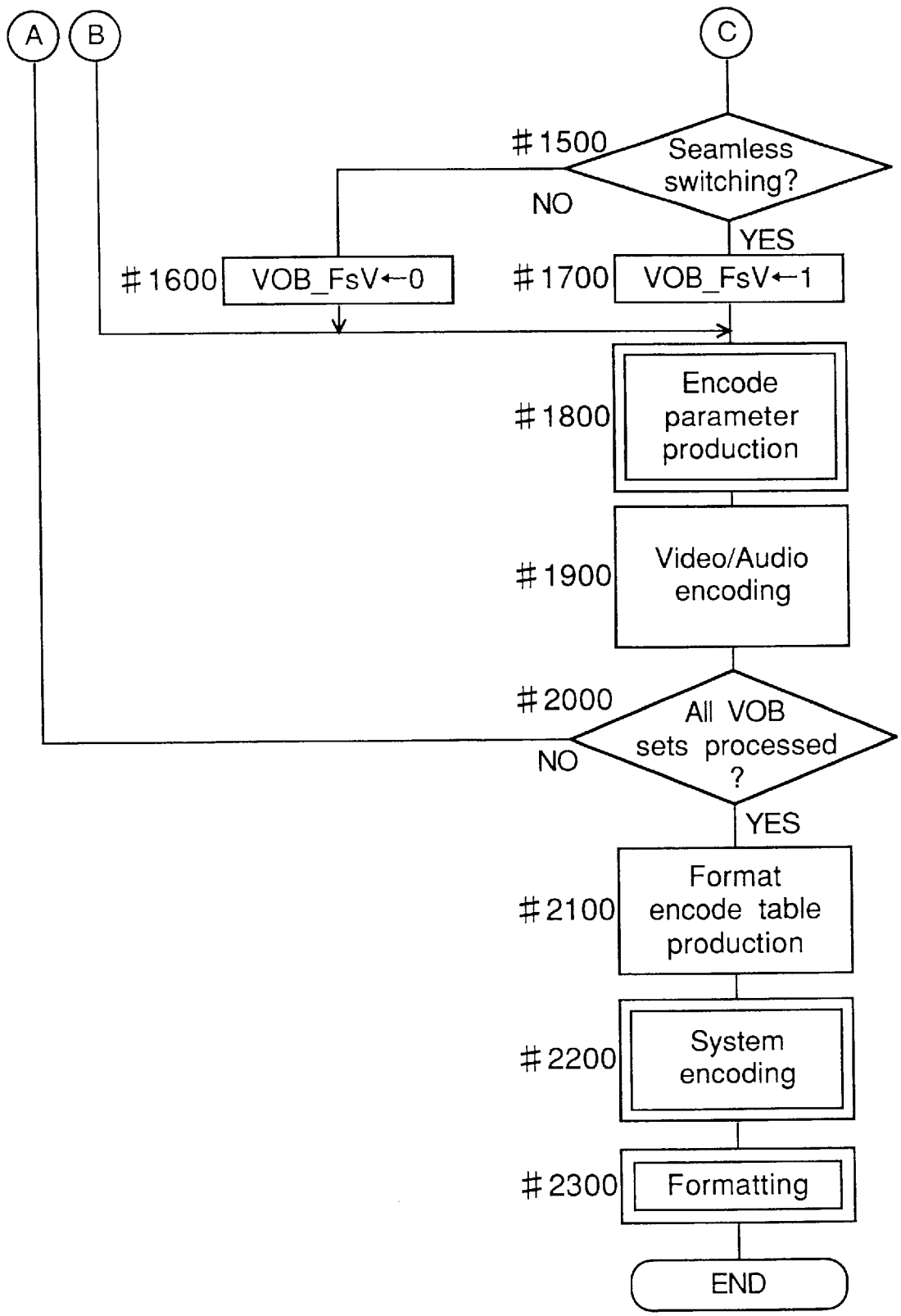
FIG. 34 is a flow chart, formed by FIGS. 34A and 34B, showing an operation of the DVD encoder of FIG. 25.
Figure 36:
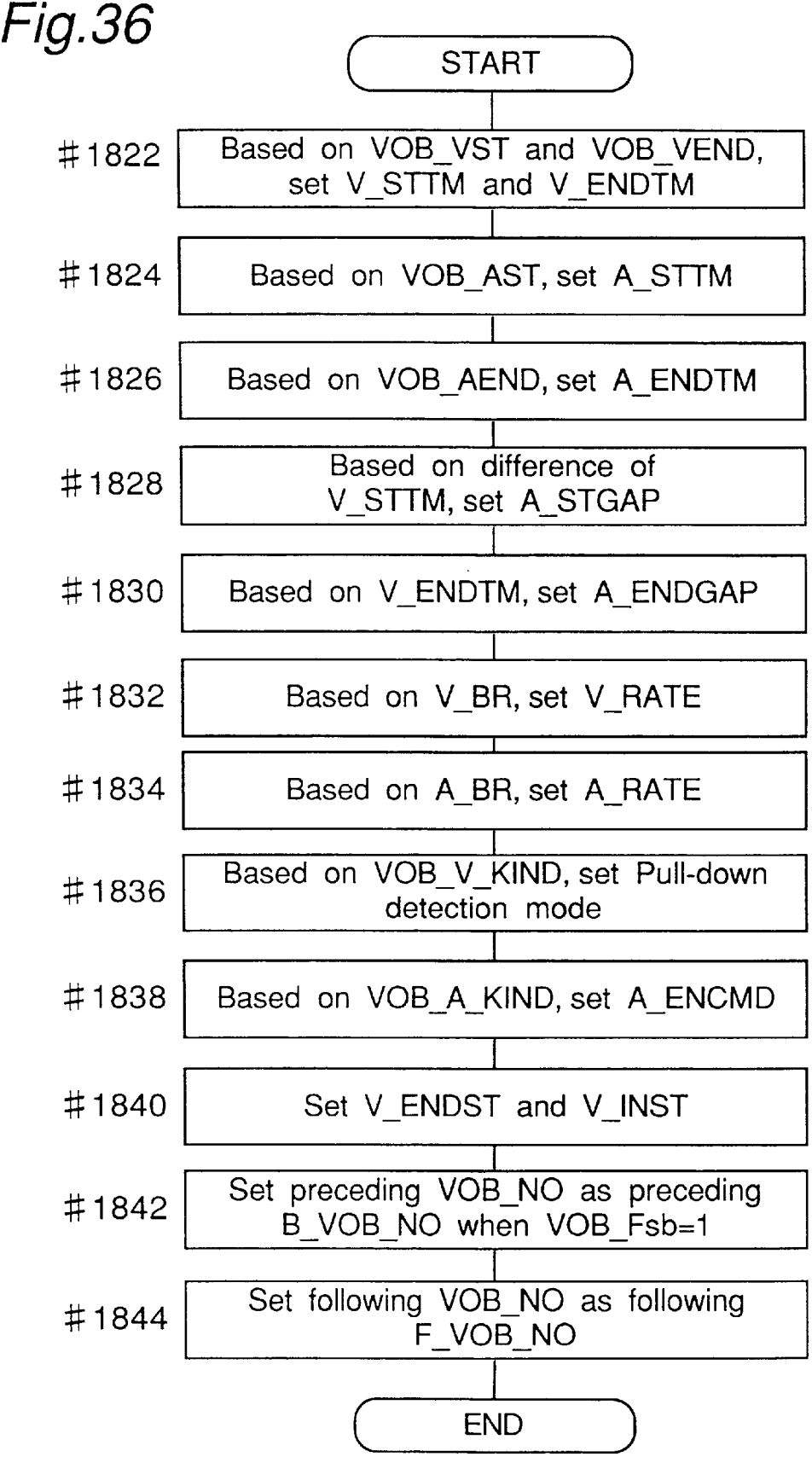
FIG. 36 is a flow chart showing the details of the VOB data setting routine of FIG. 35.
Figure 37:
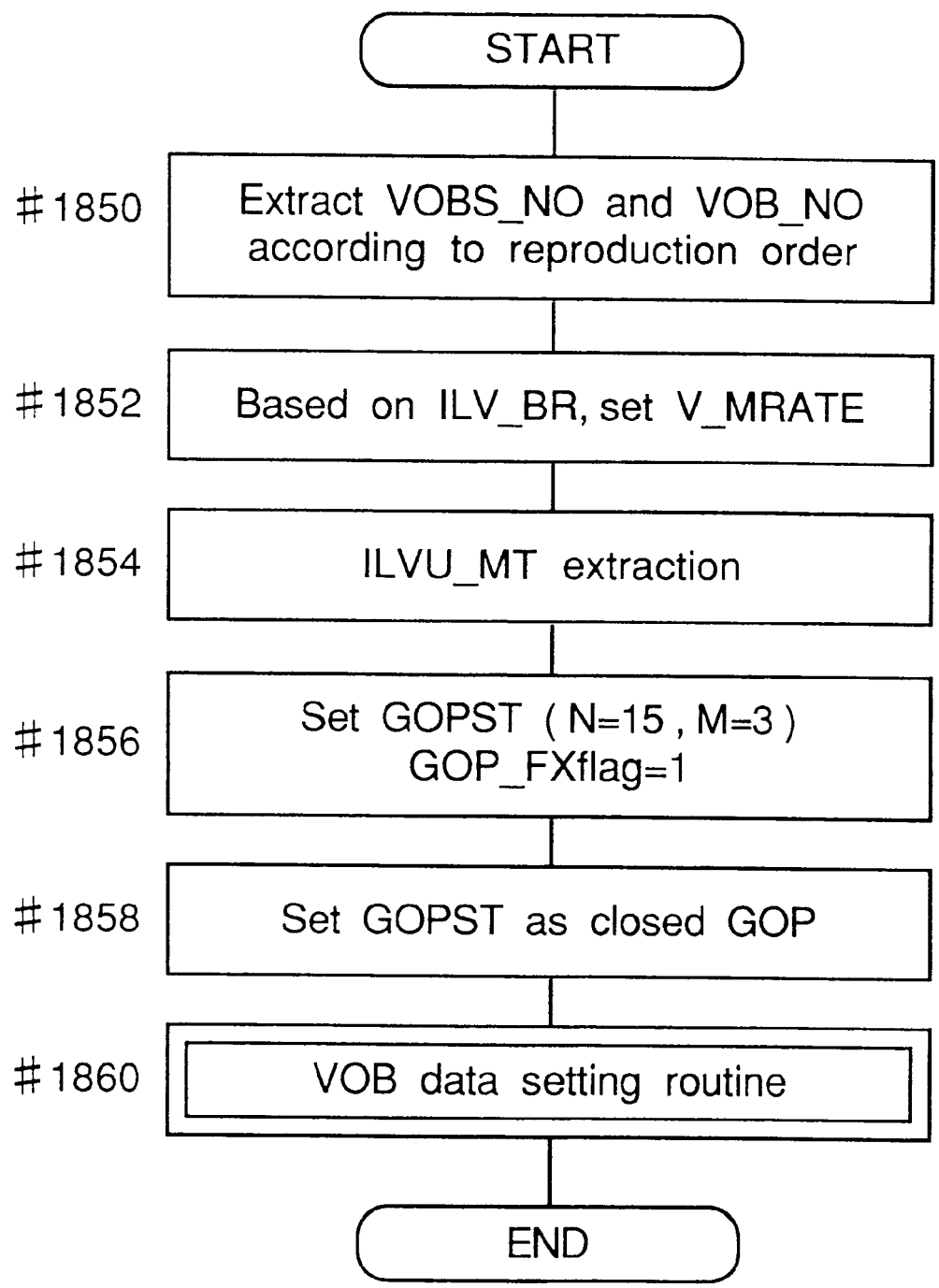
FIG. 37 is a flow chart showing the encode parameters generating operation for a seamless switching.

The encode parameter production subroutine shown as step #1800 in FIG. 34B is described next using FIGS. 35, 36, and 37 using by way of example the operation generating the encode parameters for multi-angle control.

Figure 35:
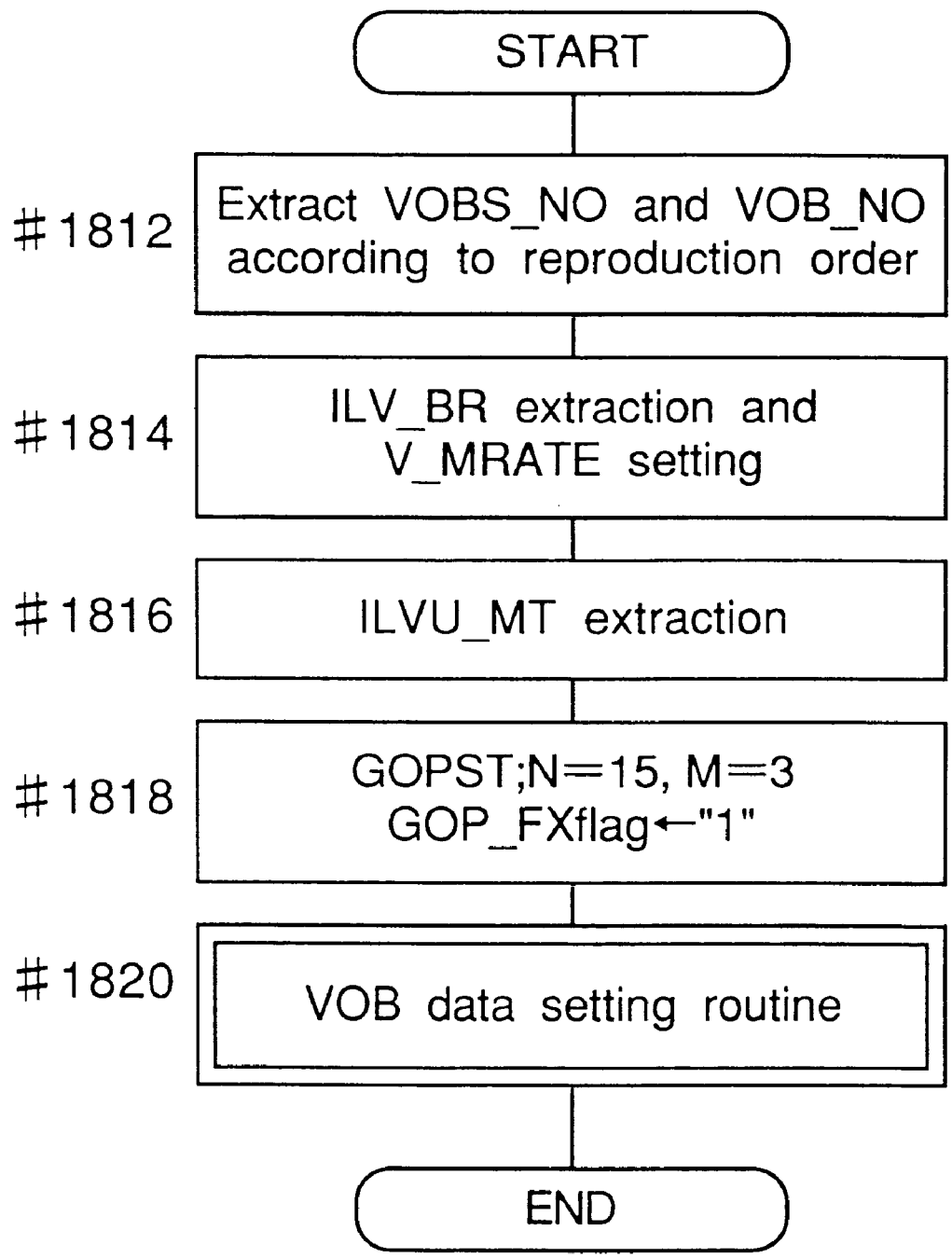
FIG. 35 is a flow chart showing details of the encode parameter production sub-routine of FIG. 34.

Starting from FIG. 35, the process for generating the encode parameters of a non-seamless switching stream with multi-angle control is described first. This stream is generated when step #1500 in FIG. 34 returns NO and the following flags are set as shown: VOB_Fsb=1 or VOB_Fsf=1, VOB_Fp=1, VOB_Fi=1, VOB_Fm=1, and VOB_FsV=0. The following operation produces the encoding information tables shown in FIG. 27 and FIG. 28, and the encode parameters shown in FIG. 29.

At step #1812, the scenario reproduction sequence (path) contained in the scenario data St7 is extracted, the VOB Set number VOBS_NO is set, and the VOB number VOB_NO is set for one or more VOB in the VOB Set.

At step #1814 the maximum bit rate ILV_BR of the interleaved VOB is extracted from the scenario data St7, and the maximum video encode bit rate V_MRATE from the encode parameters is set based on the interleave flag VOB_Fi setting (=1).

At step #1816, the minimum interleaved unit presentation time ILVU_MT is extracted from the scenario data St7.

At step #1818, the video encode GOP structure GOPST values N=15 and M=3 are set, and the GOP structure fixing flag GOP_Fxflag is set (=1), based on the multi-scene flag VOB_Fp setting (=1).

Step #1820 is the common VOB data setting routine, which is described below referring to the flow chart in FIG. 36. This common VOB data setting routine produces the encoding information tables shown in FIGS. 27 and 28, and the encode parameters shown in FIG. 29.

At step #1822 the video material start time VOB_VST and video material end time VOB_VEND are extracted for each VOB, and the video encode start time V_STTM and video encode end time V_ENDTM are used as video encoding parameters.

At step #1824 the audio material start time VOB_AST of each VOB is extracted from the scenario data St7, and the audio encode start time A_STTM is set as an audio encoding parameter.

At step #1826 the audio material end time VOB_AEND is extracted for each VOB from the scenario data St7, and at a time not exceeding the VOB_AEND time. This time extracted at an audio access unit (AAU) is set as the audio encode end time A_ENDTM which is an audio encoding parameter. Note that the audio access unit AAU is determined by the audio encoding method.

At step #1828 the audio start gap A_STGAP obtained from the difference between the video encode start time V_STTM and the audio encode start time A_STTM is defined as a system encode parameter.

At step #1830 the audio end gap A_ENDGAP obtained from the difference between the video encode end time V_ENDTM and the audio encode end time A_ENDTM is defined as a system encode parameter.

At step #1832 the video encoding bit rate V_BR is extracted from the scenario data St7, and the video encode bit rate V_RATE, which is the average bit rate of video encoding, is set as a video encoding parameter.

At step #1834 the audio encoding bit rate A_BR is extracted from the scenario data St7, and the audio encode bit rate A_RATE is set as an audio encoding parameter.

At step #1836 the video material type VOB_V_KIND is extracted from the scenario data St7. If the material is a film type, i.e., a movie converted to television broadcast format (so-called telecine conversion), reverse telecine conversion is set for the video encode mode V_ENCMD, and defined as a video encoding parameter.

At step #1838 the audio coding method VOB_A_KIND is extracted from the scenario data St7, and the encoding method is set as the audio encode method A_ENCMD and set as an audio encoding parameter.

At step #1840 the initial video encode data V_INTST sets the initial value of the VBV buffer to a value less than the VBV buffer end value set by the last video encode data V_ENDST, and defined as a video encoding parameter.

At step #1842 the VOB number VOB_NO of the preceding connection is set to the preceding VOB number B_VOB_NO based on the setting (=1) of the preceding VOB seamless connection flag VOB_Fsb, and set as a system encode parameter.

At step #1844 the VOB number VOB_NO of the following connection is set to the following VOB number F_VOB_NO based on the setting (=1) of the following VOB seamless connection flag VOB_Fsf, and set as a system encode parameter.

The encoding information table and encode parameters are thus generated for a multi-angle VOB Set with non-seamless multi-angle switching control enabled.

The process for generating the encode parameters of a seamless switching stream with multi-angle control is described below with reference to FIG. 34. This stream is generated when step #1500 in FIG. 34 returns YES and the following flags are set as shown: VOB_Fsb=1 or VOB_Fsf=1, VOB_Fp=1, VOB_Fi=1, VOB_Fm=1, and VOB_FsV=1.

The following operation produces the encoding information tables shown in FIG. 27 and FIG. 28, and the encode parameters shown in FIG. 29.

At step #1850, the scenario reproduction sequence (path) contained in the scenario data St7 is extracted, the VOB Set number VOBS_NO is set, and the VOB number VOB_NO is set for one or more VOB in the VOB Set.

At step #1852 the maximum bit rate ILV_BR of the interleaved VOB is extracted from the scenario data St7, and the maximum video encode bit rate V_MRATE from the encode parameters is set based on the interleave flag VOB_Fi setting (=1).

At step #1854, the minimum interleaved unit presentation time ILVU_MT is extracted from the scenario data St7.

At step #1856, the video encode GOP structure GOPST values N=15 and M=3 are set, and the GOP structure fixing flag GOP_Fxflag is set (=1), based on the multi-scene flag VOB_Fp setting (=1).

At step #1858, the video encode GOP GOPST is set to "closed GOP" based on the multi-angle seamless switching flag VOB_FSV setting (=1), and the video encoding parameters are thus defined.

Step #1860 is the common VOB data setting routine, which is as described referring to the flow chart in FIG. 35. Further description thereof is thus omitted here.

The encode parameters of a seamless switching stream with multi-angle control are thus defined for a VOB Set with multi-angle control as described above.

Figure 38:
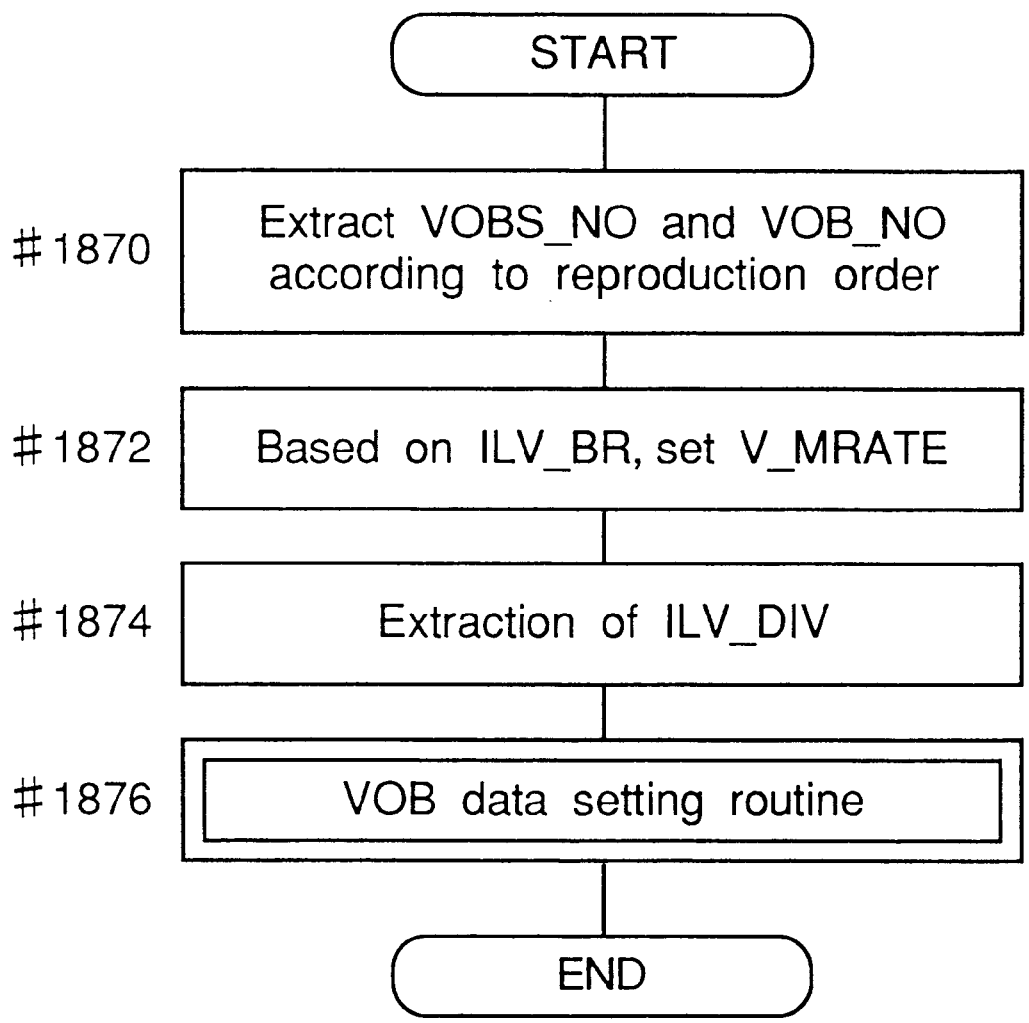
FIG. 38 is a flow chart showing the encode parameters generating operation for a system stream.

The process for generating the encode parameters for a system stream in which parental lock control is implemented is described below with reference to FIG. 38. This stream is generated when step #1200 in FIG. 34 returns NO and step #1304 returns YES, i.e., the following flags are set as shown: VOB_Fsb=1 or VOB_Fsf=1, VOB_Fp=1, VOB_Fi=1, VOB_Fm=0. The following operation produces the encoding information tables shown in FIG. 27 and FIG. 28, and the encode parameters shown in FIG. 29.

At step #1870, the scenario reproduction sequence (path) contained in the scenario data St7 is extracted, the VOB Set number VOBS_NO is set, and the VOB number VOB_NO is set for one or more VOB in the VOB Set.

At step #1872 the maximum bit rate ILV_BR of the interleaved VOB is extracted from the scenario data St7, and the maximum video encode bit rate V_MRATE from the encode parameters is set based on the interleave flag VOB_Fi setting (=1).

At step #1874 the number of interleaved VOB divisions ILV_DIV is extracted from the scenario data St7.

Step #1876 is the common VOB data setting routine, which is as described referring to the flow chart in FIG. 35. Further description thereof is thus omitted here.

The encode parameters of a system stream in which parental lock control is implemented are thus defined for a VOB Set with multi-scene selection control enabled as described above.

Figure 64:
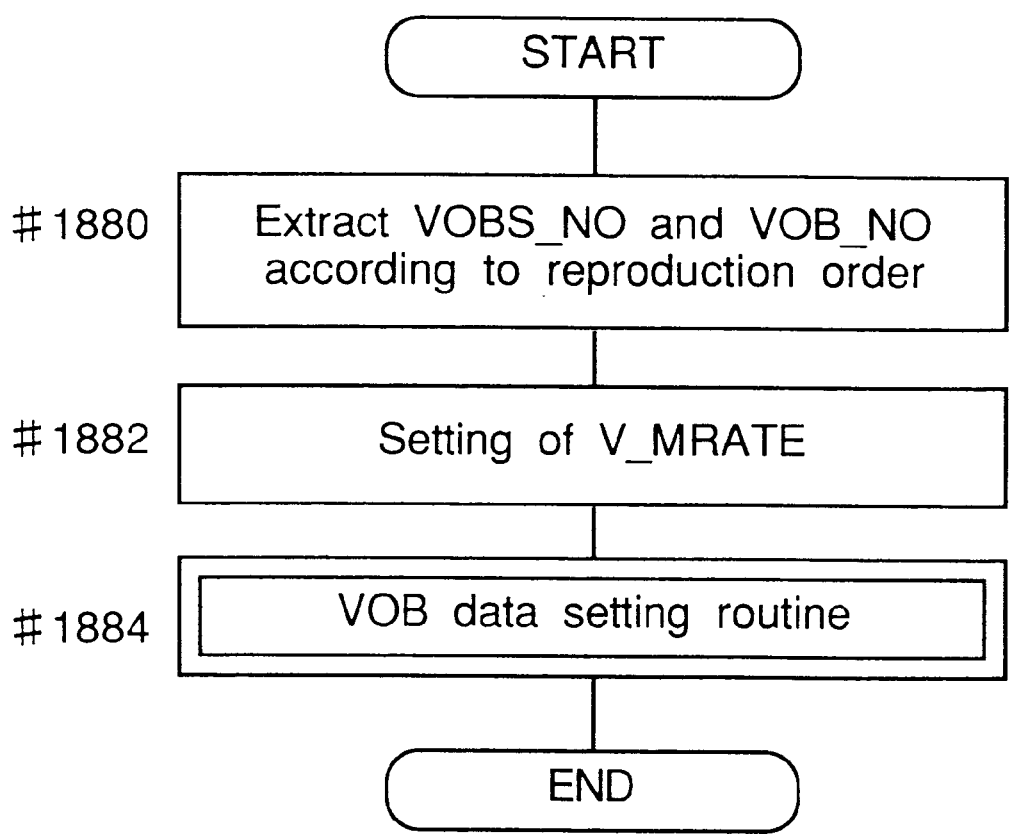
FIG. 64 is a flow chart showing the encode parameters generating operation for a system stream containing a single scene.

The process for generating the encode parameters for a system stream containing a single scene is described below with reference to FIG. 64. This stream is generated when step #900 in FIG. 34 returns No, i.e., when VOB_Fp=0. The following operation produces the encoding information tables shown in FIG. 27 and FIG. 28, and the encode parameters shown in FIG. 29.

At step #1880, the scenario reproduction sequence (path) contained in the scenario data St7 is extracted, the VOB Set number VOBS_NO is set, and the VOB number VOB_NO is set for one or more VOB in the VOB Set.

At step #1882 the maximum bit rate ILV_BR of the interleaved VOB is extracted from the scenario data St7, and the maximum video encode bit rate V_MRATE from the encode parameters is set based on the interleave flag VOB_Fi setting (=1).

Step #1884 is the common VOB data setting routine, which is as described referring to the flow chart in FIG. 35. Further description thereof is thus omitted here.

These flow charts for defining the encoding information table and encode parameters thus generate the parameters for DVD video, audio, and system stream encoding by the DVD formatter.

Decoder Flow Charts

A. Disk-to-stream buffer transfer flow

The decoding information table produced by the decoding system controller 2300 based on the scenario selection data St51 is described below referring to FIGS. 47 and 48. The decoding information table comprises the decoding system table shown in FIG. 47, and the decoding table shown in FIG. 48.

As shown in FIG. 47, the decoding system table comprises a scenario information register and a cell information register. The scenario information register records the title number and other scenario reproduction information selected by the user and extracted from the scenario selection data St51. The cell information register extracts and records the information required to reproduce the cells constituting the program chain PGC based on the user-defined scenario information extracted into the scenario information register.

More specifically, the scenario information register contains plural sub-registers, i.e., the angle number ANGLE_NO_reg, VTS number VTS_NO_reg, PGC number VTS_PGCI_NO_reg, audio ID_AUDIO_ID_reg, sub-picture ID SP_ID_reg, and the system clock reference SCR buffer SCR_buffer.

The angle number ANGLE_NO_reg stores which angle is reproduced when there are multiple angles in the reproduction program chain PGC.

The VTS number VTS_NO_reg records the number of the next VTS reproduced from among the plural VTS on the disk.

The PGC number VTS_PGCI_NO_reg records which of the plural program chains PGC present in the video title set VTS is to be reproduced for parental lock control or other applications.

The audio ID AUDIO_ID_reg records which of the plural audio streams in the VTS are to be reproduced.

The sub-picture ID SP_ID_reg records which of the plural sub-picture streams is to be reproduced when there are plural sub-picture streams in the VTS.

The system clock reference SCR buffer SCR_buffer is the buffer for temporarily storing the system clock reference SCR recorded to the pack header as shown in FIG. 19. As described using FIG. 26, this temporarily stored system clock reference SCR is output to the decoding system controller 2300 as the bitstream control data St63.

The cell information register contains the following sub-registers: the cell block mode CBM_reg, cell block type CBT_reg, seamless reproduction flag SPF_reg, interleaved allocation flag IAF_reg, STC resetting flag STCDF, seamless angle change flag SACF_reg, first cell VOBU start address C_FVOBU_SA_reg, and last cell VOBU start address C_LVOBU_SA_reg.

The cell block mode CBM_reg stores a value indicating whether plural cells constitute one functional block. If there are not plural cells in one functional block, CBM_reg stores N_BLOCK. If plural cells constitute one functional block, the value F_CELL is stored as the CBM_reg value of the first cell in the block, L_CELL is stored as the CBM_reg value of the last cell in the block, and BLOCK is stored as the CBM_reg of value all cells between the first and last cells in the block.

The cell block type CBT_reg stores a value defining the type of the block indicated by the cell block mode CBM_reg. If the cell block is a multi-angle block, A_BLOCK is stored; if not, N_BLOCK is stored.

The seamless reproduction flag SPF_reg stores a value defining whether that cell is seamless connected with the cell or cell block reproduced therebefore. If a seamless connection is specified, SML is stored; if a seamless connection is not specified, NSML is stored.

The interleaved allocation flag IAF_reg stores a value identifying whether the cell exists in a contiguous or interleaved block. If the cell is part of an interleaved block, ILVB is stored; otherwise N_ILVB is stored.

The STC resetting flag STCDF defines whether the system time clock STC used for synchronization must be reset when the cell is reproduced; when resetting the system time clock STC is necessary, STC_RESET is stored; if resetting is not necessary, STC_NRESET is stored.

The seamless angle change flag SACF_reg stores a value indicating whether a cell in a multi-angle period should be connected seamlessly at an angle change. If the angle change is seamless, the seamless angle change flag SACF is set to SML; otherwise it is set to NSML.

The first cell VOBU start address C_FVOBU_SA_reg stores the VOBU start address of the first cell in a block. The value of this address is expressed as the distance from the logic sector of the first cell in the VTS title VOBS (VTSTT_VOBS) as measured by and expressed (stored) as the number of sectors.

The last cell VOBU start address C_LVOBU_SA_reg stores the VOBU start address of the last cell in the block. The value of this address is also expressed as the distance from the logic sector of the first cell in the VTS title VOBS (VTSTT_VOBS) measured by and expressed (stored) as the number of sectors.

The decoding table shown in FIG. 48 is described below. As shown in FIG. 48, the decoding table comprises the following registers: information registers for non-seamless multi-angle control, information registers for seamless multi-angle control, a VOBU information register, and information registers for seamless reproduction.

The information registers for non-seamless multi-angle control comprise sub-registers NSML_AGL_C1_DSTA_reg -NSML_AGL_C9_DSTA_reg.

NSML_AGL_C1_DSTA_reg -NSML_AGL_C9_DSTA_reg record the NMSL_AGL_C1_DSTA -NMSL_AGL_C9_DSTA values in the PCI packet shown in FIG. 20.

The information registers for seamless multi-angle control comprise sub-registers SML_AGL_C1_DSTA_reg -SML_AGL_C9_DSTA_reg.

SML_AGL_C1_DSTA_reg -SML_AGL _C9_DSTA_reg record the SML_AGL_C1_DSTA -SML_AGL_C9 _DSTA values in the DSI packet shown in FIG. 20.

The VOBU information register stores the end pack address VOBU_EA in the DSI packet shown in FIG. 20.

The information registers for seamless reproduction comprise the following sub-registers: an interleaved unit flag ILVU_flag_reg, Unit END flag UNIT_END_flag_reg, Interleaved Unit End Address ILVU_EA_reg, Next Interleaved Unit Start Address NT_ILVU_SA_reg, the presentation start time of the first video frame in the VOB (Initial Video Frame Presentation Start Time) VOB_V_SPTM_reg, the presentation end time of the last video frame in the VOB (Final Video Frame Presentation Termination Time) VOB_V_EPTM_reg, audio reproduction stopping time 1 VOB_A_STP_PTM1_reg, audio reproduction stopping time 2 VOB_A_STP_PTM2_reg, audio reproduction stopping period 1 VOB_A_GAP_LEN1_reg, and audio reproduction stopping period 2 VOB_A_GAP_LEN2_reg.

The interleaved unit flag ILVU_flag_reg stores the value indicating whether the video object unit VOBU is in an interleaved block, and stores ILVU if it is, and N_ILVU if not.

The Unit END flag UNIT_END_flag_reg stores the value indicating whether the video object unit VOBU is the last VOBU in the interleaved unit ILVU. Because the interleaved unit ILVU is the data unit for continuous reading, the UNIT_END_flag_reg stores END if the VOBU currently being read is the last VOBU in the interleaved unit ILVU, and otherwise stores N_END.

The Interleaved Unit End Address ILVU_EA_reg stores the address of the last pack in the ILVU to which the VOBU belongs if the VOBU is in an interleaved block. This address is expressed as the number of sectors from the navigation pack NV of that VOBU.

The Next Interleaved Unit Start Address NT_ILVU_SA_reg stores the start address of the next interleaved unit ILVU if the VOBU is in an interleaved block. This address is also expressed as the number of sectors from the navigation pack NV of that VOBU.

The Initial Video Frame Presentation Start Time register VOB_V_SPTM_reg stores the time at which presentation of the first video frame in the VOB starts.

The Final Video Frame Presentation Termination Time register VOB_V_EPTM_reg stores the time at which presentation of the last video frame in the VOB ends.

The audio reproduction stopping time 1 VOB_A_STP_PTM1_reg stores the time at which the audio is to be paused to enable resynchronization, and the audio reproduction stopping period 1 VOB_A_GAP_LEN1_reg stores the length of this pause period.

The audio reproduction stopping time 2 VOB_A_STP_PTM2_reg and audio reproduction stopping period 2 VOB_A_GAP_LEN2_reg store the same values.

Figure 49:
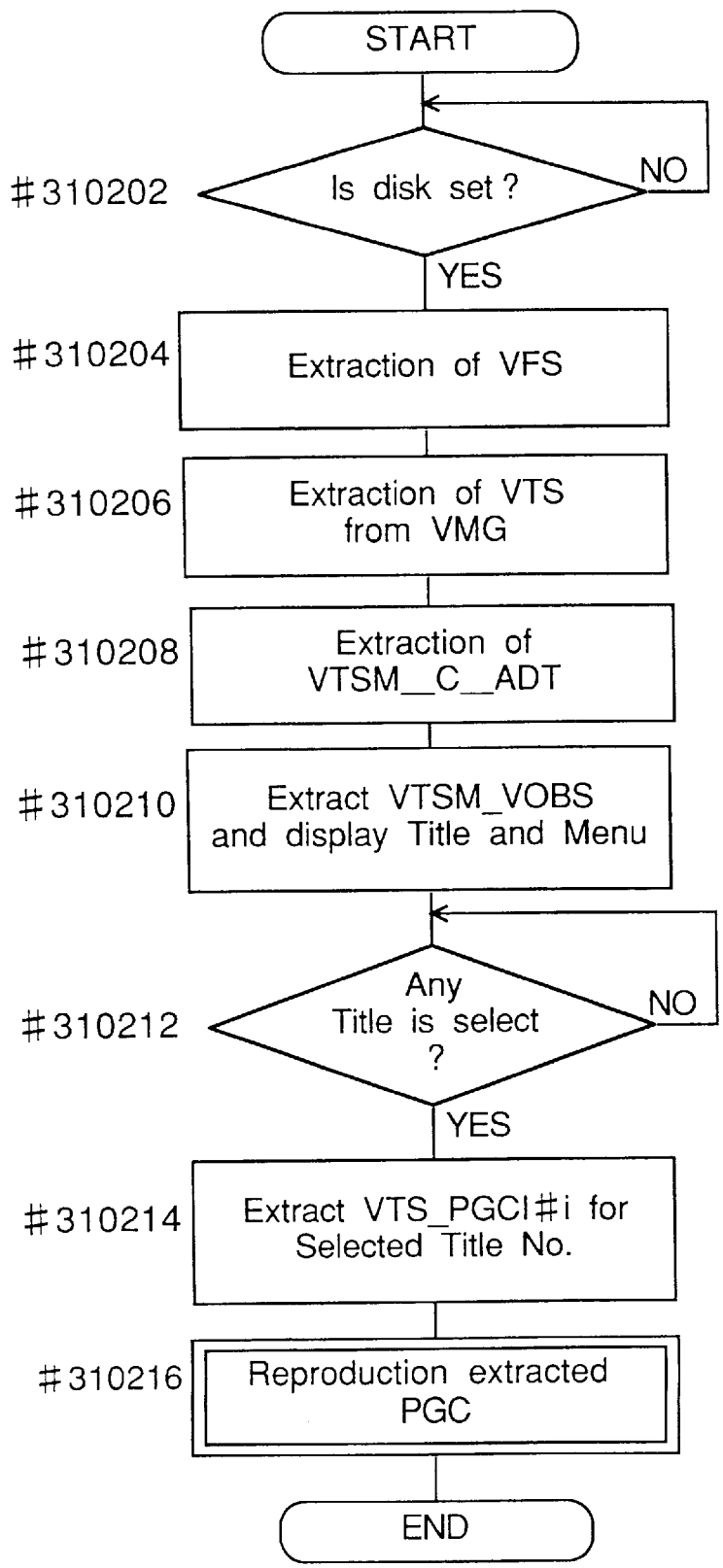
FIG. 49 is a flow chart showing the operation of the DVD decoder DCD of FIG. 26.

The operation of the DVD decoder DCD according to the present invention as shown in FIG. 26 is described next below with reference to the flow chart in FIG. 49.

At step #310202 it is first determined whether a disk has been inserted. If it has, the procedure moves to step #310204.

At step #310204, the volume file structure VFS (FIG. 21) is read, and the procedure moves to step #310206.

At step #310206, the video manager VMG (FIG. 21) is read and the video title set VTS to be reproduced is extracted. The procedure then moves to step #310208.

At step #310208, the video title set menu address information VTSM_C_ADT is extracted from the VTS information VTSI, and the procedure moves to step #310210.

At step #310210 the video title set menu VTSM_VOBS is read from the disk based on the video title set menu address information VTSM_C_ADT, and the title selection menu is presented.

The user is thus able to select the desired title from this menu in step #310212. If the titles include both contiguous titles with no user-selectable content, and titles containing audio numbers, sub-picture numbers, or multi-angle scene content, the user must also enter the desired angle number. Once the user selection is completed, the procedure moves to step #310214.

At step #310214, the VTS_PGCI #i program chain (PGC) data block corresponding to the title number selected by the user is extracted from the VTSPGC information table VTS_PGCIT, and the procedure moves to step #310216.

Reproduction of the program chain PGC then begins at step #310216. When program chain PGC reproduction is finished, the decoding process ends. If a separate title is thereafter to be reproduced as determined by monitoring key entry to the scenario selector, the title menu is presented again (step #310210).

Program chain reproduction in step #310216 above is described in further detail below referring to FIG. 50. The program chain PGC reproduction routine consists of steps #31030, #31032, #31034, and #31035 as shown.

At step #31030 the decoding system table shown in FIG. 47 is defined. The angle number ANGLE_NO_reg, VTS number VTS_NO_reg, PGC number VTS_PGCI_NO_reg, audio ID AUDIO_ID_reg, and sub-picture ID SP_ID_reg are set according to the selections made by the user using the scenario selector 2100.

Once the PGC to be reproduced is determined, the corresponding cell information (PGC information entries C_PBI #j) is extracted and the cell information register is defined. The sub-registers therein that are defined are the cell block mode CBM_reg, cell block type CBT_reg, seamless reproduction flag SPF_reg, interleaved allocation flag IAF_reg, STC resetting flag STCDF, seamless angle change flag SACF_reg, first cell VOBU start address C_FVOBU_SA_reg, and last cell VOBU start address C_LVOBU_SA_reg.

Once the decoding system table is defined, the process transferring data to the stream buffer (step #31032) and the process decoding the data in the stream buffer (step #31034) are activated in parallel.

The process transferring data to the stream buffer (step #31032) is the process of transferring data from the recording medium M to the stream buffer 2400. This is, therefore, the processing of reading the required data from the recording medium M and inputting the data to the stream buffer 2400 according to the user-selected title information and the playback control information (navigation packs NV) written in the stream.

The routine shown as step #31034 is the process for decoding the data stored to the stream buffer 2400 (FIG. 26), and outputting the decoded data to the video data output terminal 3600 and audio data output terminal 3700. Thus, it is the process for decoding and reproducing the data stored to the stream buffer 2400.

Note that step #31032 and step #31034 are executed in parallel.

The processing unit of step #31032 is the cell, and as processing one cell is completed, it is determined in step #31035 whether the complete program chain PGC has been processed. If processing the complete program chain PGC is not completed, the decoding system table is defined for the next cell in step #31030. This loop from step #31030 through step #31035 is repeated until the entire program chain PGC is processed.

B. Decoding process in the stream buffer

Figure 50:
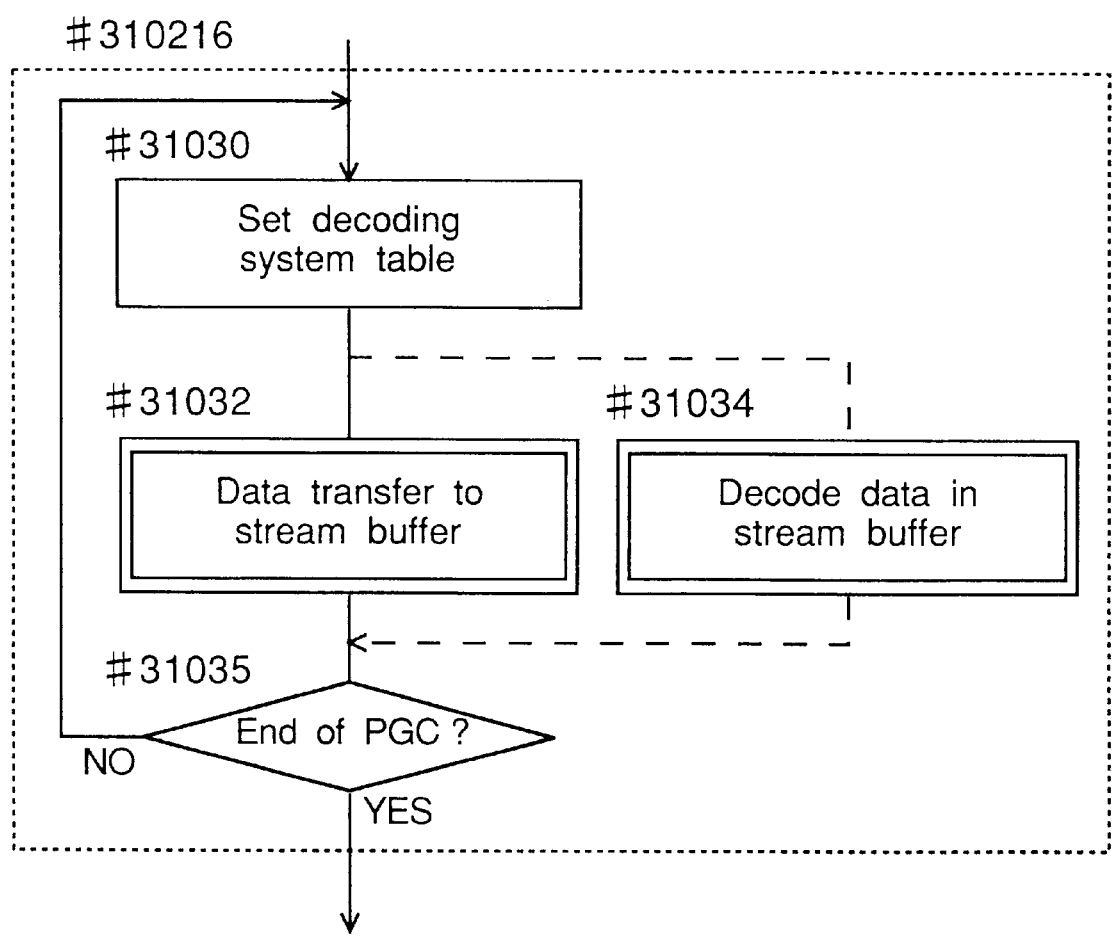
FIG. 50 is a flow chart showing details of the reproduction extracted PGC routing of FIG. 49.

The process for decoding data in the stream buffer 2400 shown as step #31034 in FIG. 50 is described below referring to FIG. 51. This process (step #31034) comprises steps #31110, #31112, #31114, and #31116.

At step #31110 data is transferred in pack units from the stream buffer 2400 to the system decoder 2500 (FIG. 26). The procedure then moves to step #31112.

At step #31112 the pack data is transferred from the stream decoder 2500 to each of the buffers, i.e., the video buffer 2600, sub-picture buffer 2700, and audio buffer 2800.

At step #31112 the Ids of the user-selected audio and sub-picture data, i.e., the audio ID AUDIO_ID_reg and the sub-picture ID SP_ID_reg stored to the scenario information register shown in FIG. 47, are compared with the stream ID and sub-stream ID read from the packet header (FIG. 19), and the matching packets are output to the respective buffers. The procedure then moves to step #31114.

The decode timing of the respective decoders (video, sub-picture, and audio decoders) is controlled in step #31114, i.e., the decoding operations of the decoders are synchronized, and the procedure moves to step #31116.

Figure 52:
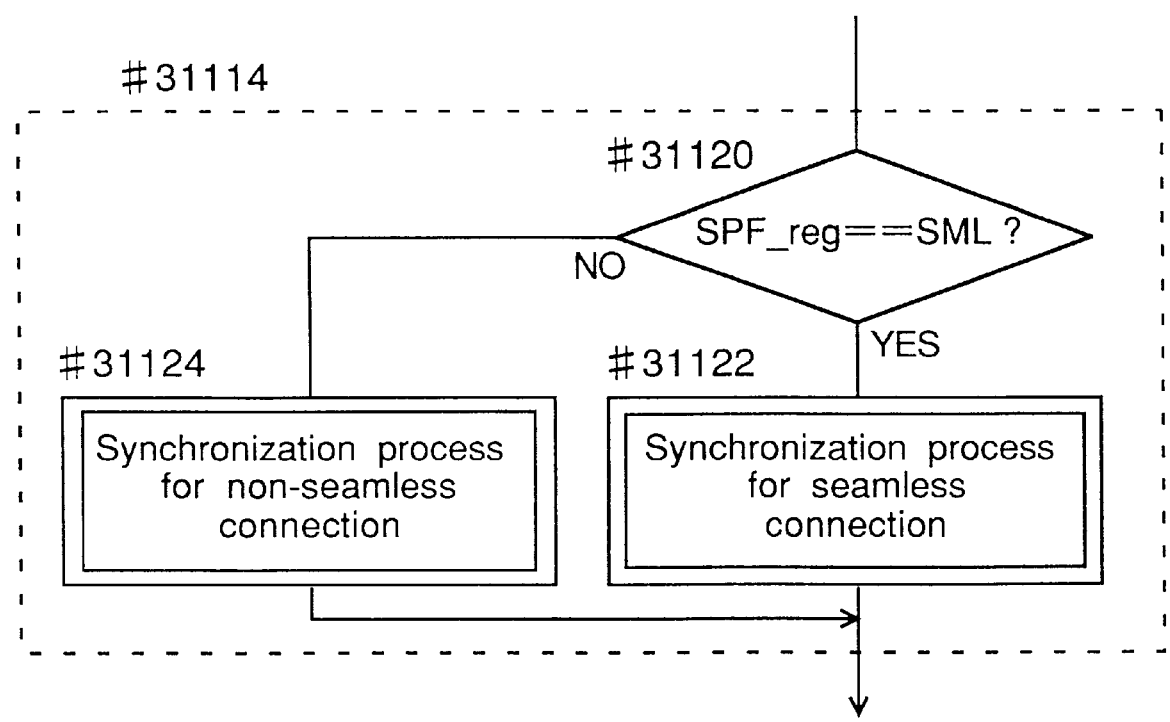
FIG. 52 is a flow chart showing details of the decoder synchronization process of FIG. 51.

Note that the decoder synchronization process of step #31114 is described below with reference to FIG. 52.

The respective elementary strings are then decoded at step #31116. The video decoder 3801 thus reads and decodes the data from the video buffer, the sub-picture decoder 3100 reads and decodes the data from the sub-picture buffer, and the audio decoder 3200 reads and decodes the data from the audio buffer.

This stream buffer data decoding process then terminates when these decoding processes are completed.

The decoder synchronization process of step #31114, FIG. 51, is described below with reference to FIG. 52. This processes comprises steps #31120, #31122, and #31124.

At step #31120 it is determined whether a seamless connection is specified between the current cell and the preceding cell. If a seamless connection, the procedure moves to step #31122, if not, the procedure moves to step #31124.

A process synchronizing operation for producing seamless connections is executed in step #31122, and a process synchronizing operation for non-seamless connections is executed in step #31124.

Video Encoder

A video encoder generating an MPEG video stream encodes the video stream to prevent failure of the video buffer 2600 provided in the MPEG decoder. A decoder for decoding a video stream conforming to the MPEG2 Main Profile, Main Level (MPEG2 MP@ML) standard for coding normal video signals requires a video buffer 2600 with a capacity of at least 224 KB (see ISO 13818, MPEG standard). As a result, the MPEG2 MP@ML video encoder simulates the accumulated video data volume Vdv of the decoder video buffer 2600, which has a minimum 224-KB storage capacity, during encoding, and controls the code size to prevent a data underflow or overflow state in the video buffer 2600.

If the video buffer 2600 underflows, video decoding cannot proceed until the data needed for decoding is supplied. This results in intermittent video output or other presentation problems. If the video buffer 2600 overflows, the required encoded data may be lost, and the data cannot be correctly decoded.

However, when data is read from the optical disk M by means of the DVD decoder DCD shown in FIG. 26, intermittent data transfer reading only as much data as required for decoding from the optical disk M can be achieved. When the DVD decoder DCD video buffer 2600 seems about to overflow in this case, it is possible to prevent an overflow by stopping data reading before the buffer overflows. Decoding can thus be completed without losing any encoded data. The reproduction apparatus, i.e., the DVD decoder DCD, can therefore handle overflow processing.

A video buffer 2600 underflow may occur, however, if decoding executes at a rate exceeding the maximum data transfer rate because the maximum data transfer rate is limited by the DVD system drive factors such as the reproduction apparatus, disk drive device, drive circuit drive software, and so on. Therefore, when intermittent data transfer can be accomplished by the DVD decoder DCD, it is important to control the encoding process to prevent a buffer underflow during decoding.

During the video stream coding process, the accumulated video data volume Vdv of the video buffer 2600 is hypothetically calculated to control the code size according to the accumulated video data volume Vdv. The method of calculating the accumulated video data volume Vdv of the video buffer 2600 is described below.

Figure 41:
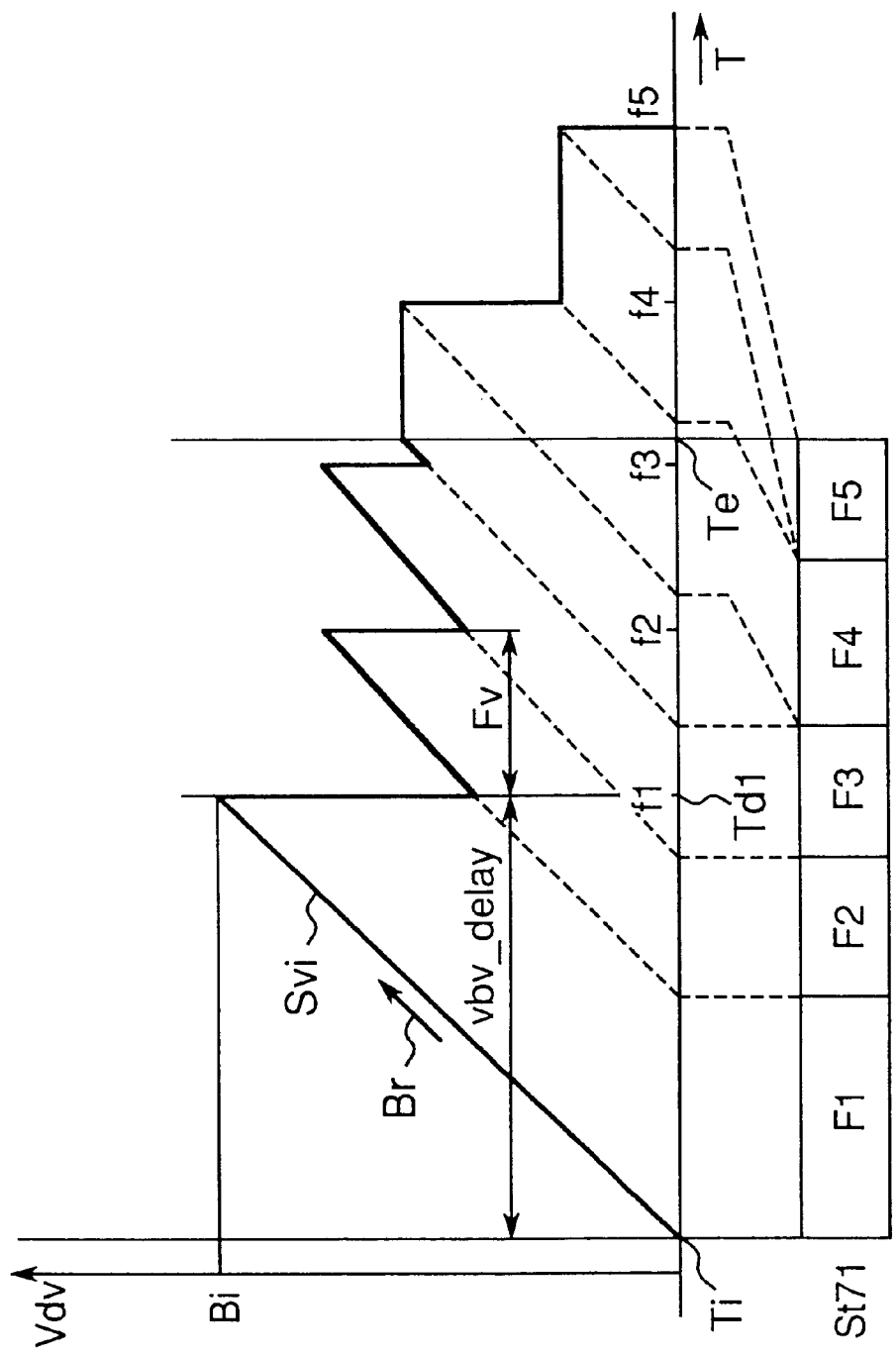
FIG. 41 is a graph in assistance of explaining the change in the accumulated video data volume of the video buffer when the encoded video stream is transferred to the video buffer and decoded in the DVD decoder.

The change in the accumulated video data volume Vdv of the video buffer 2600 when the encoded video stream St71 is transferred to the video buffer 2600 and decoded in the DVD decoder DCD of the present invention shown in FIG. 26 is shown in FIG. 41. Line SVi thus indicates the change in the video data volume Vdv accumulated in the video buffer 2600 at the front of the encoded video stream St71, and line BR indicates the input rate to the video buffer 2600.

This data input rate is the data transfer rate of the encoded video stream, and is equal to the data transfer rate of a constant rate system stream substantially equal to the DVD read rate, minus the transfer rate of the non-video streams.

The encoded video stream is transferred at a specific transfer rate BR, and the data required for decoding one frame Fv is transferred simultaneously with the start of decoding from the video buffer 2600 to the video decoder 3800. Because the decoding start time of each frame is controlled by the reproduction frame period, the decoding start time occurs at the same period as the frame period when data is continuously reproduced at a constant frame period. This is a general condition for the encoding process, and is used to calculate the accumulated video data volume Vdv of the video buffer 2600 during the coding process as the target code size.

During video encoding, the target code size for each frame is calculated in frame units, and each frame is then coded to produce this target code size. There are two methods of obtaining this target code size, 2-pass encoding and single-pass encoding. In 2-pass encoding the video to be encoded is first pseudo-coded to obtain the pseudo-code size required to code each frame, and the target code size is then obtained based on this pseudo-code size and the compression bit rate. In single-pass encoding, the code size of each frame is obtained based on a ratio that is preset or appropriately set during the coding process according to the difference between the compression bit rate and the compression frame type (I-frame, P-frame, or B-frame).

The accumulated video data volume Vdv is calculated based on the per-frame code size obtained using one of the above methods to prevent video buffer 2600 failure and obtain the final target code size for the coding process.

Figure 40:
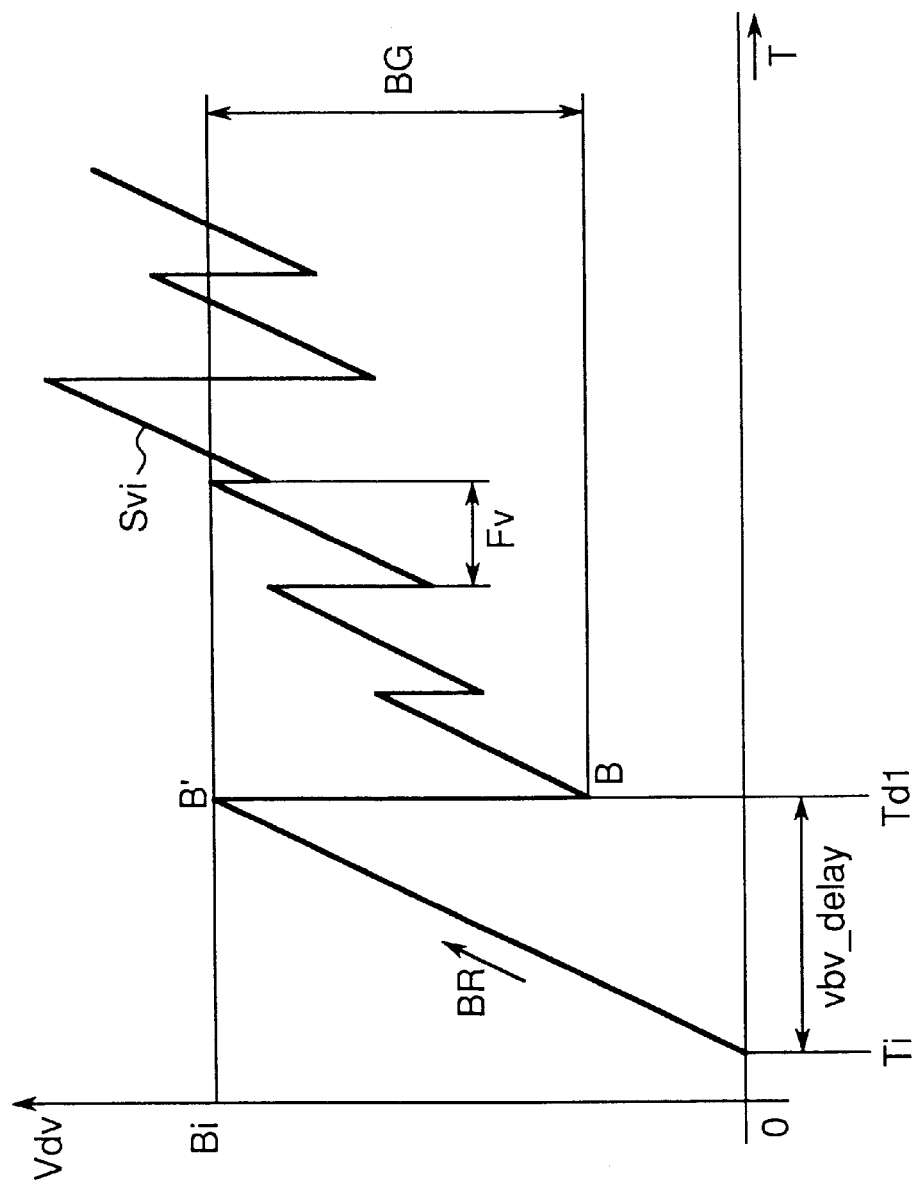
FIG. 40 is a graph in assistance of explaining the data transfer of the encoded video stream to the video buffer starting at time Ti.

Referring to FIG. 40, data transfer of the encoded video stream St71 to the video buffer 2600 starts at time Ti, at which point the accumulated video data volume Vdv is 0. Thereafter the accumulated video data volume Vdv increases gradually at transfer rate BR. When the accumulated video data volume Vdv reaches a predefined initial buffer occupancy Bi, i.e., at time Td1, decoding of the first frame starts. Note that the time from data input time Ti to decoding start time Td is the decoding delay time, i.e., video buffer verifier delay vbv_delay. Simultaneously with the start of decoding, the accumulated video data volume Vdv in video buffer 2600 decreases instantly by the data size BG of one frame Fv. The accumulated video data volume Vdv then continues to increase at the constant transfer rate BR.

The initial buffer occupancy Bi is the accumulated video data volume Vdv of the video buffer 2600 at the decoding process start time.

The data size of each frame is not constant because variable length coding is used, and the accumulated video data volume Vdv at the decoding start time of each frame changes as shown in the figure.

Once the initial buffer occupancy Bi is determined, the accumulated video data volume Vdv in the video buffer 2600 at each frame can be calculated from the rate of increase in the accumulated video data volume Vdv, which is determined by the transfer rate BR, and the amount of data consumed at each frame.

The coding process is thus controlled to prevent the video buffer 2600 from overflowing or underflowing based on the set initial buffer occupancy Bi and data transfer rate. Therefore, if the decoding process is not executed at the same initial buffer occupancy Bi and transfer rate BR set during the coding process, an underflow or overflow may occur, and appropriate video reproduction may not be possible. Note that while the video buffer is referenced above as the decoding buffer, the same conditions apply to the sub-picture buffer 2700 and audio buffer 2800.

If the encoded video stream St71 used for the title is obtained by coding a single video signal from beginning to end at one time and then appropriately decoded as described above, no problems occur. However, if separately encoded streams are connected and reproduced as a single stream, the video buffer 2600 data underflow or overflow problems described above can occur.

For example, a movie may be encoded in chapter units representing an approximately ten minute reproduction time, and the streams generated in chapter units. During reproduction, these chapter unit streams are then connected and reproduced to generate a single encoded video stream.

During multi-angle scene reproduction as described above, the stream currently being reproduced must be dynamically connected to and reproduced with the angle stream dynamically selected by the user from the multi-angle scene period containing the plural angle streams for the multiple scenes.

The same is true with parental lock control titles. The stream for the scene selected by the user from the parental lock control period containing the plural streams for the multiple scenes must be statically connected to and reproduced with the single common system stream.

In either case, the common streams and plural streams for the multiple scenes are separately coded. This means that during reproduction the common system stream must be connected to and contiguously reproduced with the user-selected stream.

When streams from a multi-scene period containing independently coded plural system streams on the same timebase are connected to and contiguously reproduced with another system stream, the following difficulties arise.

Referring to FIG. 41, the change in the accumulated video data volume Vdv of the video buffer 2600 when decoding a particular number of frames from encoded video stream St71 is described below. In this example five frames F1, F2, F3, F4, and F5 from encoded video stream St71 are decoded. Particular attention is given below to the change in the accumulated video data volume Vdv of the video buffer 2600 at the end of the encoded video stream St71.

As described with reference to FIG. 40 above, data transfer of the encoded video stream St71 to the video buffer 2600 starts at time Ti, at which point the accumulated video data volume Vdv is 0. Decoding the first frame F1 starts at decoding start time Td1 (f1) after video buffer verifier delay vbv_delay. The accumulated video data volume Vdv at this time is the defined initial buffer occupancy Bi. The accumulated video data volume Vdv then accumulates at data transfer rate BR, and decoding of each frame starts at the corresponding decoding start time (f2, f3, f4, f5). Data transfer of video stream Svi ends at time Te. In other words, the accumulated video data volume Vdv does not increase after time Te. After the last frame F5 is decoded at time f5, the accumulated video data volume Vdv in video buffer 2600 is zero.

Figure 42:
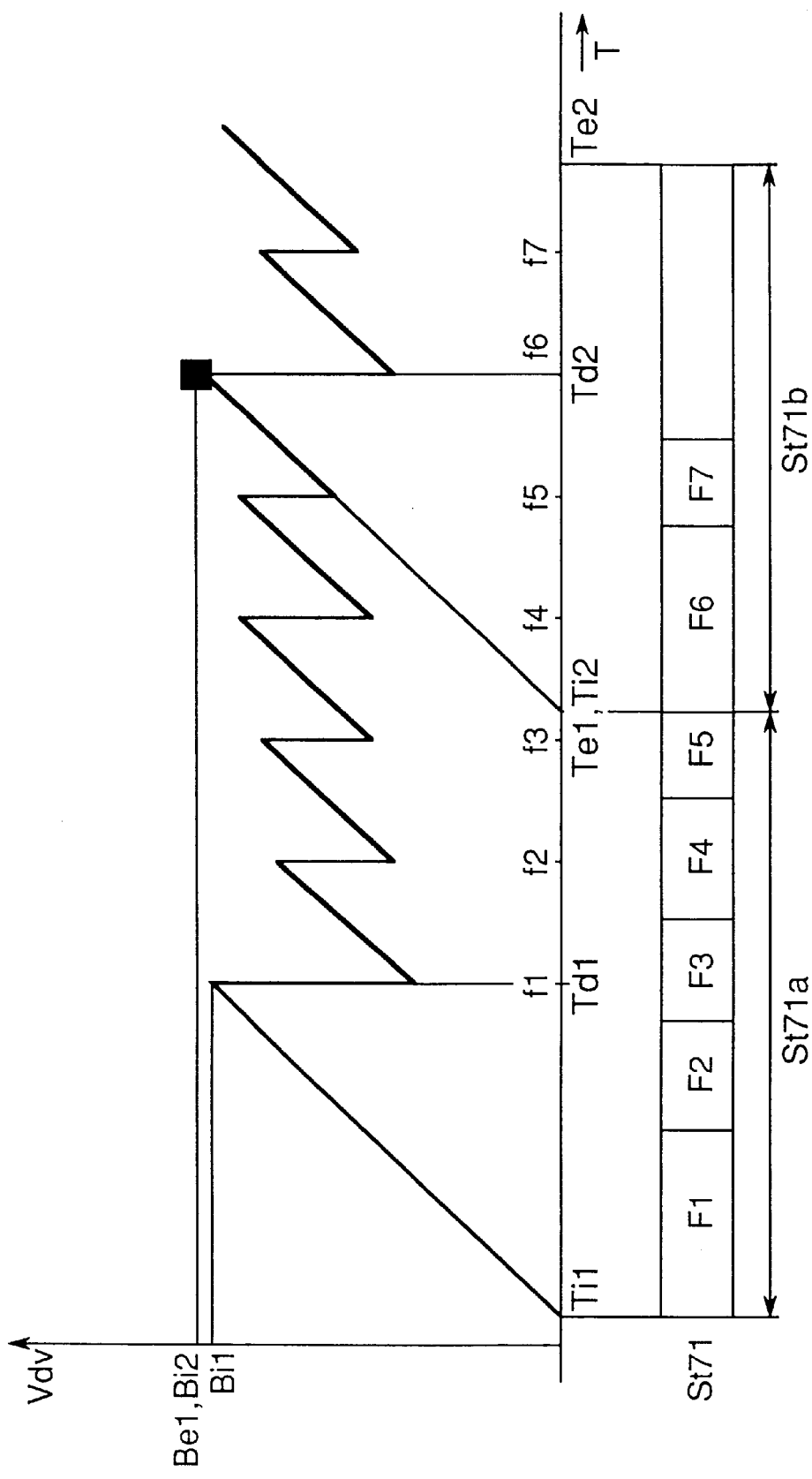
FIG. 42 is a graph in assistance of explaining the change in the accumulated video data volume of the video buffer when two encoded video streams are connected.

Referring to FIG. 42, the change in the accumulated video data volume Vdv of the video buffer 2600 when connecting two encoded video streams St71a and St71b is described. In this example frames F1, F2, F3, F4, and F5 in the preceding encoded video stream St71a are connected with the frames F1, F2, . . . in the following second encoded video stream St71b.

Data transfer of the first encoded video stream St71a to the video buffer 2600 starts at time Ti1. Transfer of encoded video stream St71a is completed at time Te1, which coincides with time Ti2 at which transfer of the second encoded video stream St71b to the video buffer 2600 starts. Unlike the example shown in FIG. 41, in this case data transfer of encoded video stream St71b continues from time Te2 after time Te1 at which transfer of the first encoded video stream St71a ends. The rise and fall in the accumulated video data volume Vdv thus continues at the transfer rate BR and decoding interval as each frame is decoded.

The accumulated video data volume of encoded video stream St71b in video buffer 2600 at the decoding end time of the first encoded video stream St71a, i.e., at the decoding start time Td2 of the second encoded video stream St71b, is defined as final buffer occupancy Be1.

In other words, when two encoded data streams are connected and contiguously reproduced, the data from the second system stream is transferred at the specified data transfer rate and accumulates in the video buffer 2600 after the first system stream is completely transferred to the video buffer 2600. The final buffer occupancy Be1 at this time is the accumulated video data volume Vdv of the second system stream buffered to the video buffer 2600 when the last data in the first system stream is decoded. In other words, the final buffer occupancy Be1 of the first encoded system stream in the present embodiment is controlled to be equal to the initial buffer occupancy Bi of the second encoded system stream.

When another video stream is connected to and contiguously reproduced with one video stream, it is necessary to calculate this final buffer occupancy Be1 during the coding process. This is because the final buffer occupancy Be1 is the initial buffer occupancy Bi2 of the encoded video stream St71b connected to the first video stream. In other words, the final buffer occupancy Be1 of the preceding encoded video stream St71a in FIG. 42 is the initial buffer occupancy Bi2 of encoded video stream St71b. Therefore, in the coding process producing the following encoded video stream St71b, the initial buffer occupancy Bi2 of the video buffer 2600 is defined as Be2=Bi2. This initial buffer occupancy Bi2 value is then used to control the code size to prevent video buffer 2600 failure.

Figure 43:
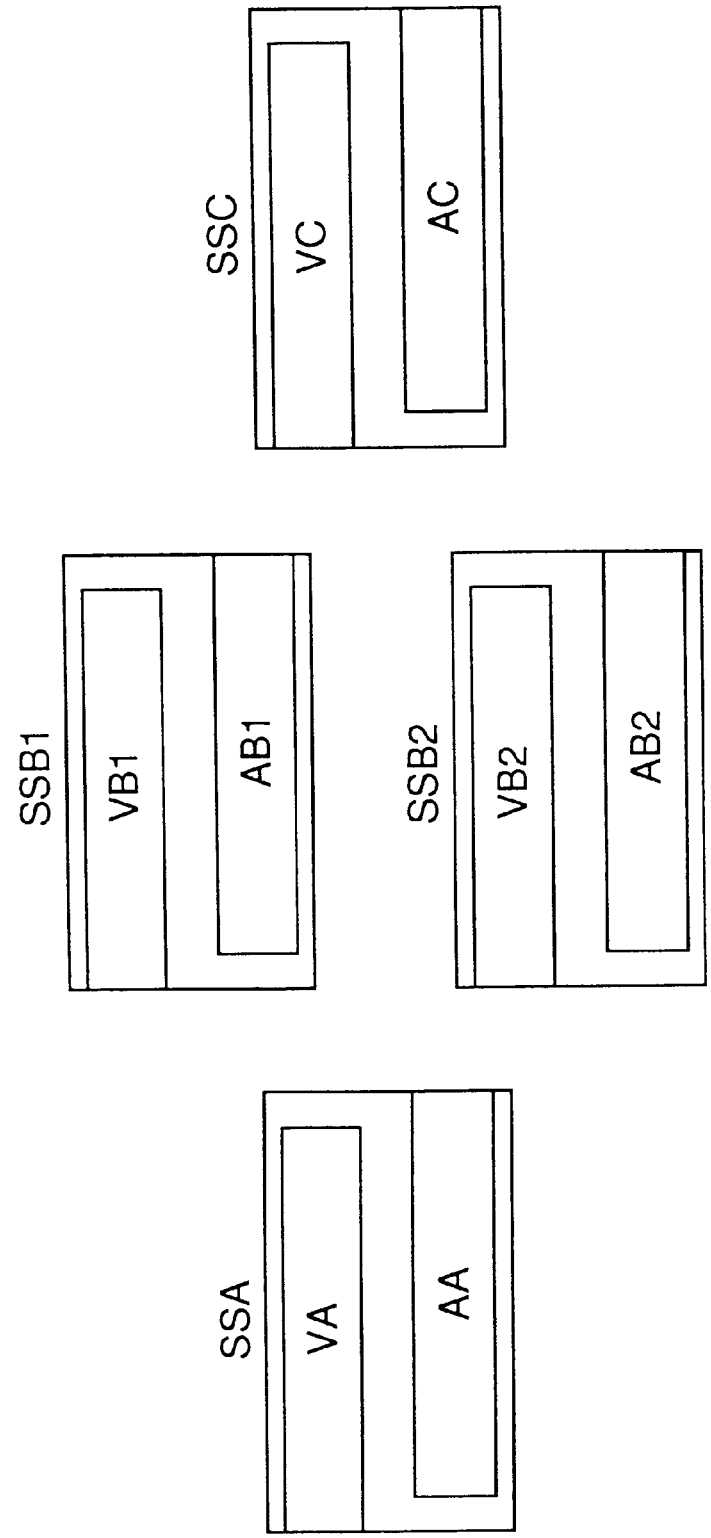
FIG. 43 is a graph in assistance of explaining the method of selecting and reproducing one scene from plural scenes in a multi-scene period.

Referring to FIG. 43 the method of selecting and reproducing one scene from plural scenes in a multi-scene period, then connecting the scenes to output a single system stream, is described below. Note that this method is used to enable the parental lock control feature and multi-angle scene selection feature characteristic of the DVD system as shown in FIG. 21.

FIG. 43 shows the concept of branching from one system stream to plural system streams, and then reconnecting from one of the plural system streams to a common system stream to produce one of various scenarios from a substantially identical system stream. Referring to FIG. 43, SSA and SSC are the common system streams, and SSB1 and SSB2 are the discrete system streams from the multi-scene period.

Figure 44:
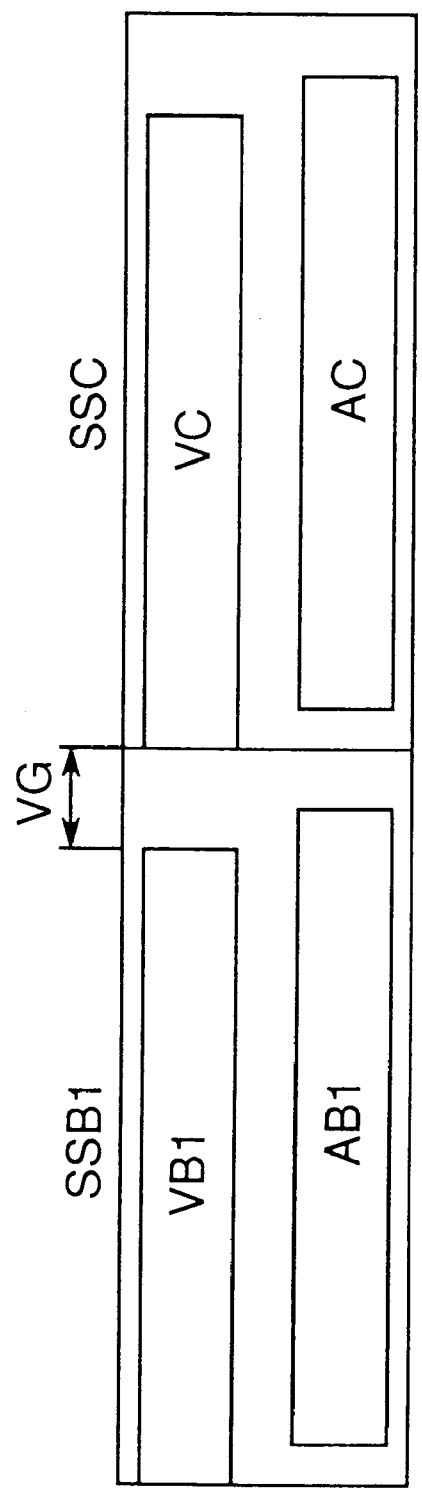
FIG. 44 is a graph in assistance of explaining a time-base relationship between the component audio and video streams.

Using system stream SSA as an example, each of these system streams comprises interleaved video VA and audio streams AA. The video stream VA starts from the beginning of the system stream SSA, and ends before the end of the system stream. The audio stream AA starts at a point later than the video stream VA, but ends at the end of the system stream SSA. This time-base relationship between the component audio and video streams shown in FIG. 44 is the same for each of the system streams representing a different scene, whether common or belonging to the multi-scene period.

The reason for this time-base offset between the audio and video streams is described below.

In the multi-scene period in which the scenario branches into plural scenes, the system stream must be produced for each discrete scene. However, the size of the video data is generally greater than that of the audio data, and the capacity of the video buffer 2600 is generally greater than that of the audio buffer 2800. Furthermore, the video data decode delay, i.e., the period from the start of input to the video buffer 2600 to the start of decoding, is greater than the audio data decode delay.

Therefore, when the video stream and audio stream are interleaved to generate a single system stream, interleaving is controlled for audio and video data presented at the same time so that during decoding the video data is input to the video buffer 2600 in advance of the audio data input to the audio buffer 2800. This is the state shown in FIG. 43. As a result, the data is interleaved so that at the beginning of the system stream only video data is input to the buffer (video buffer 2600), and at the end of the system stream only audio data is input to the buffer (audio buffer 2800).

It is also necessary to interleave the data so that the audio data is input to the audio buffer 2800 at an appropriate interval, i.e., an interval that will not cause the audio buffer 2800 to overflow. Because there is no video stream to be input to the video buffer 2600 at the end of the system stream, the audio data transfer to the audio buffer 2800 is interrupted according to the accumulated audio data volume Vda in audio buffer 2800 so that the audio stream is input to the audio buffer 2800 at an appropriate interval preventing a buffer overflow.

The concept of a simple one-to-one connection between preceding multi-scene system stream SSB1 and common system stream SSC is described below with reference to FIG. 44. As shown in FIG. 44 and described above, the multi-scene system stream SSB1 is interleaved so that only the audio stream AB1 is input to the audio buffer 2800 at the end of the system stream. When system stream SSB1 and system stream SSC are connected, the video data VC from the following system stream SSC cannot be input to the video buffer 2600 while the end of the audio data AB1 in the preceding system stream SSB1 is being input to the audio buffer 2800. This may result in a video buffer 2600 underflow state.

Figure 45:
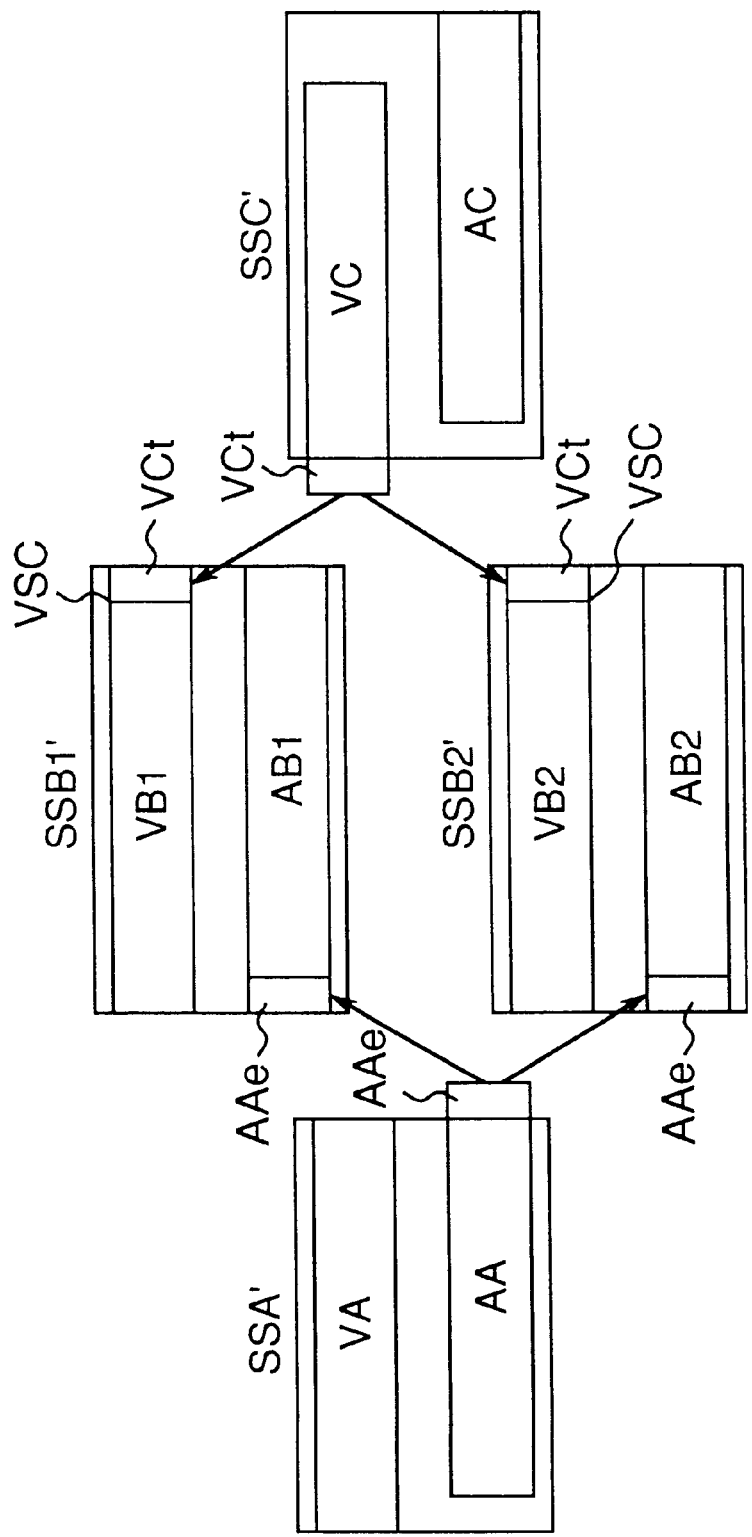
FIG. 45 is a graph in assistance of explaining a method of moving part of the video stream or audio stream using the system stream encoding method.

To resolve this, a method of moving part of the video stream or audio stream using the system stream encoding method shown in FIG. 45 has been proposed as described in Japanese patent application H7-252735 (1995-252735) to prevent a data underflow in the buffer.

This method of moving part of the stream is described below with reference to FIG. 45. As shown in FIG. 45, end unit AAe from the audio stream AA in common system stream SSA' is moved to the beginning of audio streams AB1 and AB2 where the common system stream SSA' connects to the multiscene system streams SSB1' and SSB2'. While this operation duplicates a certain amount of information, specifically end unit AAe from the audio stream AA in common system stream SSA', the result is eliminating the data discontinuity at the system stream branch, and preventing a data underflow in the video buffer 2600.

A similar movement is effected at the ends of the multi-scene system streams SSB1' and SSB2' at the connection back to the common system stream SSC'. In this case the first video stream unit VCt from the video stream VC in the common system stream SSC' is copied to the end of the video streams VB1' and VB2' of multi-scene system streams SSB1' and SSB2'. Data from the video stream is moved at the connection back to the common system stream because the audio content AB1' and AB2' generally differs. As a result, the common video data is copied. If the audio content AB1' and AB2' is the same, it will be obvious that the last unit of audio content AB1' or AB2' can be moved to the beginning of the common audio stream AC.

In the MPEG standard the bitstream is generally handled in GOP units, the size of which is determined by the frame used for intra-frame coding. Data is therefore also moved from the video stream in GOP units.

The change in the accumulated video data volume Vdv in the video buffer 2600 during reproduction of the above encoded system stream is described below.

The system stream connection point differs from the original video stream connection point or audio stream connection point. In particular, part of the video VC is contained in system stream SSB1', but because this is the connection point at which video VC was excerpted from the originally contiguous system stream SSC1', the continuity of the accumulated video data volume Vdv in the video buffer 2600 is retained at the connection point between system stream SSB1' and system stream SSC'. Furthermore, it is possible to maintain continuity in the change in the accumulated video data volume Vdv in the video buffer 2600 by setting the initial buffer occupancy Bi of video data VC so that the final buffer occupancy of video VB1 in video buffer 2600 and the final buffer occupancy of video VB2 in video buffer 2600 are the same, and calculating the normal accumulated video data volume Vdv during the coding process.

Figure 46:
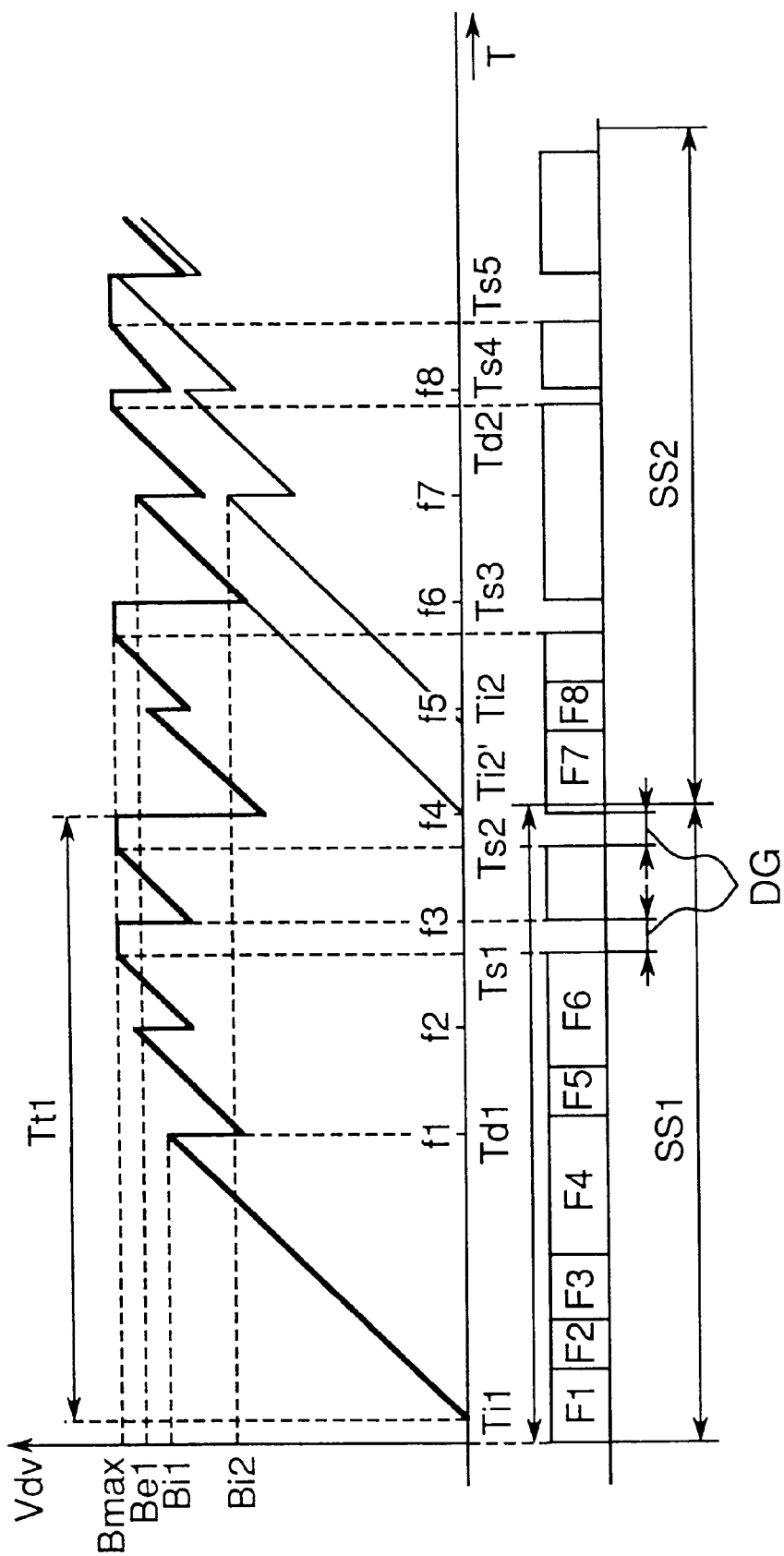
FIG. 46 is a graph in assistance of explaining the change in the accumulated video data volume in the video buffer during intermittent data transfer.

Referring to FIG. 46, the change in the accumulated video data volume Vdv in the video buffer 2600 during intermittent data transfer is described next. The vertical axis shows the accumulated video data volume Vdv in the video buffer 2600 when encoded video stream SS1 and encoded video stream SS2 are connected with intermittent data transfer, and the horizontal axis shows the progression of time. Times f1, f2, f3, f4, f5, f6, f7, f8 in FIG. 46 indicate the decoding times of frames F1–F8, respectively.

At time Ti1 data transfer of system stream SS1 to video buffer 2600 starts. At time Td1 decoding of the first frame F1 starts.

Thereafter the accumulated video data volume Vdv varies as described with reference to FIG. 42. However, the accumulated video data volume Vdv reaches the maximum occupancy Bmax at time Ts1. If data transfer is continued beyond maximum occupancy Bmax, the video buffer 2600 will overflow, and data may be lost. Data transfer is therefore interrupted. Specifically, accumulated video data volume vdv is held constant.

When frame F3 is then decoded at time f3, the accumulated video data volume Vdv in the video buffer 2600 drops below the maximum occupancy Bmax, and data transfer continues. Thereafter whenever the accumulated video data volume Vdv reaches the maximum occupancy Bmax, data transfer is interrupted and then continues again when data is consumed for decoding.

In the example shown in FIG. 46, data transfer is interrupted at times Ts1, Ts2, Ts3, Ts4, and Ts5. Time Ti2' is the data transfer start time of the second encoded video stream SS2, and the data transfer end time of the first encoded video stream SS1.

Note that while interruption of data transfer is not limited to the times shown in the figure, the period DG during which data transfer must be interrupted within the encoded video stream SS1 data transfer period Tt1 (from time Ti1 to time Ti2') can be calculated from the following equation.

$$DG = Tt1 - D1/BR \quad [1]$$

where D1 is the data size of encoded video stream SS1, and BR is the data transfer rate of encoded video stream SS1.

The data transfer time to the video buffer 2600 is thus controlled to appropriately interrupt data transfer to prevent the video buffer 2600 from overflowing, and the data transfer time is recorded with the encoded data to the system stream according to the MPEG standard. To prevent video buffer overflows during reproduction, the data transfer time information is transferred with the encoded data to control decoding and reproduction.

However, when the multi-scene data is multi-angle scene data, i.e., scene data showing substantially the same subject from different angles, and the video signals from these plural angles are then combined in predefined data units (ILVU) to obtain a single title, how these plural video streams will be connected and reproduced cannot be determined during the encoding process. As a result, the behavior of the decoder video buffer, specifically the data accumulation state of the video buffer during the decoding process, cannot be determined during the encoding process, and a video buffer overflow or underflow state may occur during decoding.

When MPEG coding or a similar variable length coding process is used during the coding process generating the video stream, the final buffer occupancy of the video buffer 2600 when decoding the first video stream is only known once the first video stream coding process is completed. When a second system stream is seamlessly connected to the end of this first system stream, the initial buffer occupancy Bi of the second system stream in the video buffer 2600 must be equal to the final buffer occupancy of the first system stream, and the coding size must be controlled to prevent video buffer 2600 failure. Because the initial buffer occupancy Bi of the second system stream is known after the process coding the first video stream is completed, the video streams must be coded in the reproduction sequence in order to seamlessly reproduce the two encoded video streams.

When the final buffer occupancy of the first video stream does not match the initial buffer occupancy Bi of the second video stream, the coding process is controlled using initial buffer occupancy Bi2 as the accumulated video data volume Vdv in the video buffer 2600 at time Td2 (f7), the decoding time of the first data in stream 2 (FIG. 46). At time Td2 during decoding, however, the accumulated video data volume Vdv is the initial buffer occupancy Bi1 of the first system stream SS1. Data transfer is also interrupted at times Ts4 and Ts5 during decoding, but there is no such data transfer interruption during encoding. In other words, a decoding buffer overflow may occur at some time unknown by the encoding process.

If system streams SS1 and SS2 will necessarily be connected, then the change in the accumulated video data volume Vdv in the video buffer 2600 as shown in FIG. 46 can be calculated during encoding. However, when one of plural selectable streams is reconnected to one common stream and contiguously reproduced during, for example, multi-angle scene reproduction, system stream SS2 may be connected to a third stream other than system stream SS1. To assure that the change in the accumulated video data volume Vdv of system stream SS2 in the video buffer 2600 is equal to that calculated during encoding, the final buffer occupancy of all system streams connectable to system stream SS2 must be the same.

When MPEG coding or a similar variable length coding process is used during the coding process generating the video stream, the coded data quantity is only known once the coding process is completed. This is because the coding length used is determined according to the amount of information in the video data, i.e., the spatial complexity or time-base complexity of the video data, and the preceding code state, and the code length is then determined. Because it is therefore difficult to accurately limit the encoded data size to a specific, predetermined size, it is difficult to accurately specify the final buffer occupancy.

Particularly when the encoded data volume is allocated and the coding process is accomplished according to the amount of information in the video stream, the allocated data volume will obviously vary if the amount of information in the video stream changes, and the change in the accumulated video data volume Vdv in the video buffer 2600 will vary. It is therefore difficult to assure that the final decode video buffer occupancy is the same with each of plural video streams.

Therefore, the object of the present invention is to provide a coding method and coding apparatus, a recording method and recording apparatus, and a reproduction method and reproduction apparatus whereby plural independently coded video streams can be freely connected and reproduced without causing a video buffer 2600 failure.

A further object of the present invention is to provide a coding method and coding apparatus, a recording method and recording apparatus, and a reproduction method and reproduction apparatus whereby the need for the coding process to proceed in a linear time-base fashion to obtain each video stream is eliminated, the processing time can be shortened by means of parallel coding processes, and process control can be simplified when plural video streams are connected to obtain a single video stream.

A further object of the present invention is to provide a coding method and coding apparatus, a recording method and recording apparatus, and a reproduction method and reproduction apparatus whereby video streams from plural reproduction paths are coded to a multi-scene period from which the user can select a particular reproduction path during reproduction, and the desired video streams from the multi-scene period containing plural selectable video streams (reproduction paths) can then be individually reproduced and contiguously presented as a single video stream without causing a video buffer 2600 failure during the decoding (reproduction) process.

A preferred embodiment of the present invention is described next with reference to the accompanying figures.

The structure of the coding apparatus according to the present embodiment and the operation whereby the video groups are coded are first described. The method of recording the stream containing the encoded data obtained by means of the video coding apparatus of the present invention is then described. The recording medium is then described, and is followed by the reproduction method.

The terms used in the following disclosure are defined below.

Each scene shown in FIG. 21 is one video group.

Each video group is not, however, limited to one scene, and each scene may be divided into smaller units collectively forming one video group, or plural scenes may be combined to form on video group.

Each video group in the present embodiment basically corresponds to each scene shown in FIG. 21, for example.

The interleaved units ILVU constituting each seamless switching angle also correspond to one video group.

The final buffer occupancy in the video buffer 2600 of the encoded video stream during decoding is defined as follows.

As described with reference to FIG. 41 above, after the last data in the encoded video stream is decoded after data transfer to the video buffer 2600 is completed during decoding of the encoded video stream for a video group, the accumulated video data volume Vdv in the video buffer 2600 is zero. In practice, however, one encoded video stream is usually connected to another encoded video stream to form a single stream. To obtain the accumulated video data volume Vdv in the video buffer 2600 when streams are thus connected, it is assumed that after the last data in the first encoded video stream is transferred, the virtual encoded video stream assumed to be connected thereto is transferred to the decoding buffer.

Based on this assumption, the accumulated video data volume Vdv in the video buffer 2600 when the last data in the encoded video stream is decoded is calculated as final buffer occupancy Be. The final buffer occupancy Be in the present invention is therefore defined as the value calculated assuming that this virtual encoded stream is then transferred to the video buffer 2600.

Figure 53:
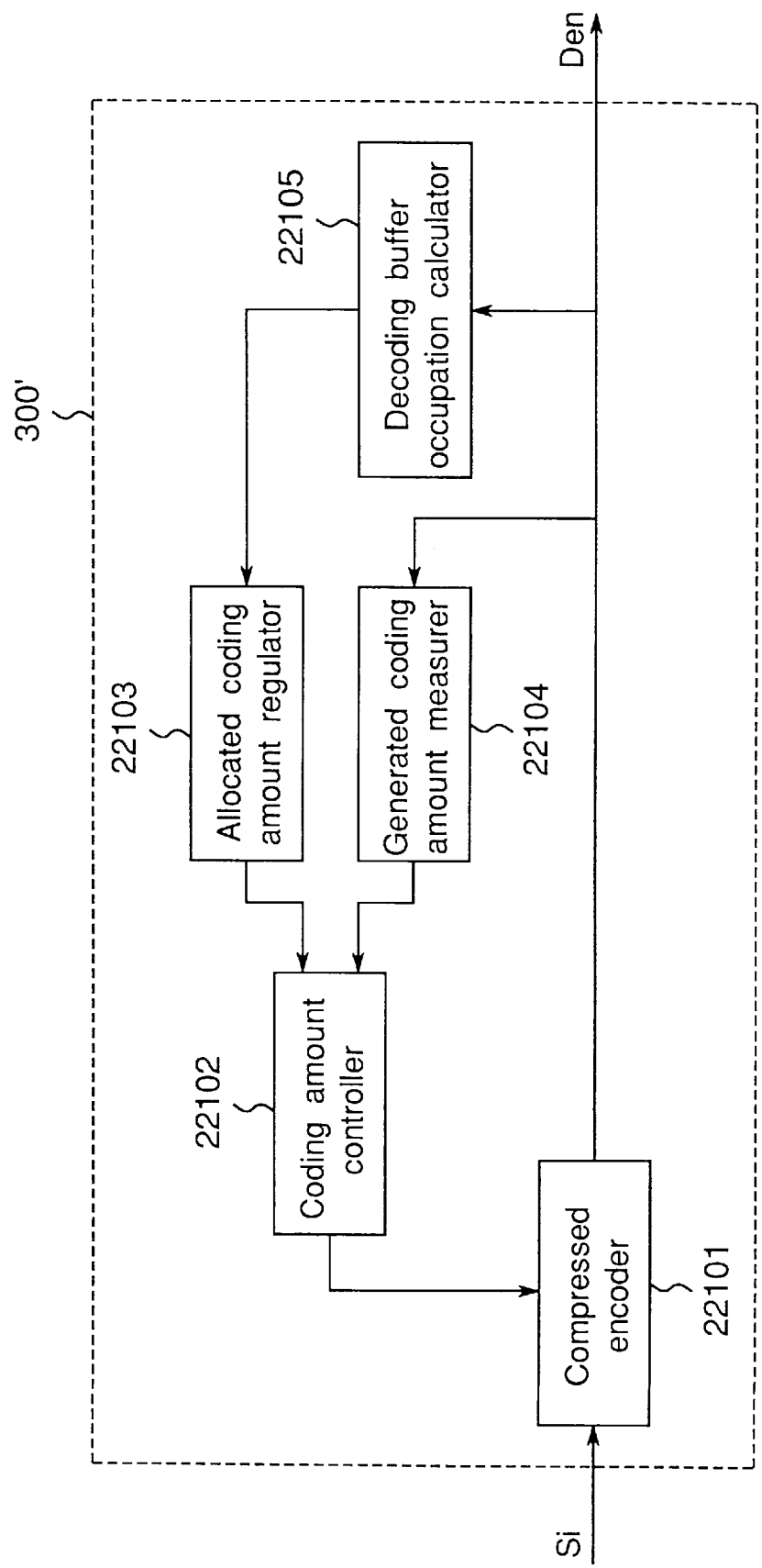
FIG. 53 is a block diagram showing a video encoder of the DVD encoder ECD of FIG. 25.

A preferred embodiment of the video encoder 300' of the DVD encoder ECD shown in FIG. 25 is shown in FIG. 53. The video encoder 300', i.e., the video coding apparatus, comprises a compression encoder 22101, coding size controller 22102, allocated coding size regulator 22103, generated coding size measurer 22104, and decoding buffer occupation calculator 22105.

The compression encoder 22101 is connected to the scenario editor 100, and receives the video stream St1 therefrom. The compression encoder 22101 compression codes the video stream St1, and produces the encoded video stream St15.

The decoding buffer occupation calculator 22105 is connected to the compression encoder 22101, and receives therefrom the encoded video stream St15. Based on the supplied encoded video stream St15, the decoding buffer occupation calculator 22105 calculates the data occupancy B of the video buffer 2600.

The allocated coding size regulator 22103 is connected to the decoding buffer occupation calculator 22105 from which it receives the calculated accumulated video data volume Vdv in the video buffer 2600. Based on this value, the allocated coding size regulator 22103 sets the target code size, which is the target size of the data after encoding, to the coding size controller 22102. More specifically, the allocated coding size regulator 22103 simulates the data occupancy B of video buffer 2600 based on the code size allocated for each frame.

If an underflow will not occur based on the simulated result, the allocated code size is used as the target code size. If an underflow will occur, the allocated code size is modified to a value whereby an underflow will not occur, and this value is used as the target code size.

The generated coding size measurer 22104 is connected to the compression encoder 22101 from which it receives the encoded video stream St15. The generated coding size measurer 22104 measures the code size of the input encoded video stream for a specific period of time, and generates a signal indicating this measured value.

The coding size controller 22102 is connected to the allocated coding size regulator 22103 and the generated coding size measurer 22104, and controls the compression encoder 22101 based on the target code size set by the allocated coding size regulator 22103. The coding size controller 22102 also receives the signal indicating the measured code size from the generated coding size measurer 22104, obtains the difference to the target code size, and generates a compression coding control signal controlling the coding size controller 22102 to reduce this difference if the difference exceeds a certain threshold value.

The compression encoder 22101 is also connected to the coding size controller 22102 from which it receives the compression coding control signal. Based on the supplied compression coding control signal, the compression encoder 22101 encodes the video stream St1, and generates encoded video stream Den. As a result, the code size of the encoded video stream Den is controlled to the target code size set by the allocated coding size regulator 22103.

Figure 54:
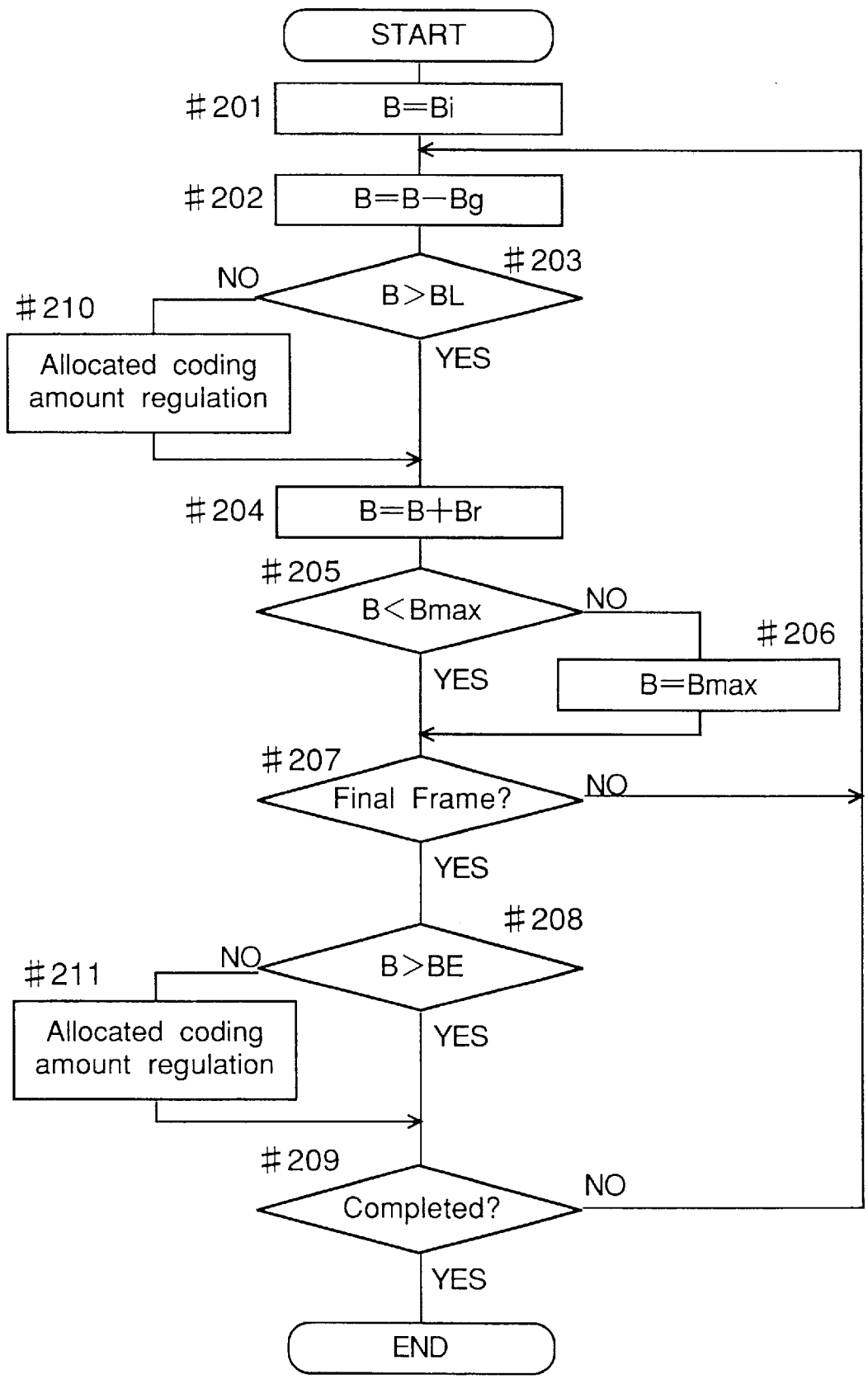
FIG. 54 is a flow chart showing an operation of the decoding buffer occupation calculator of FIG. 53.
Figure 55:
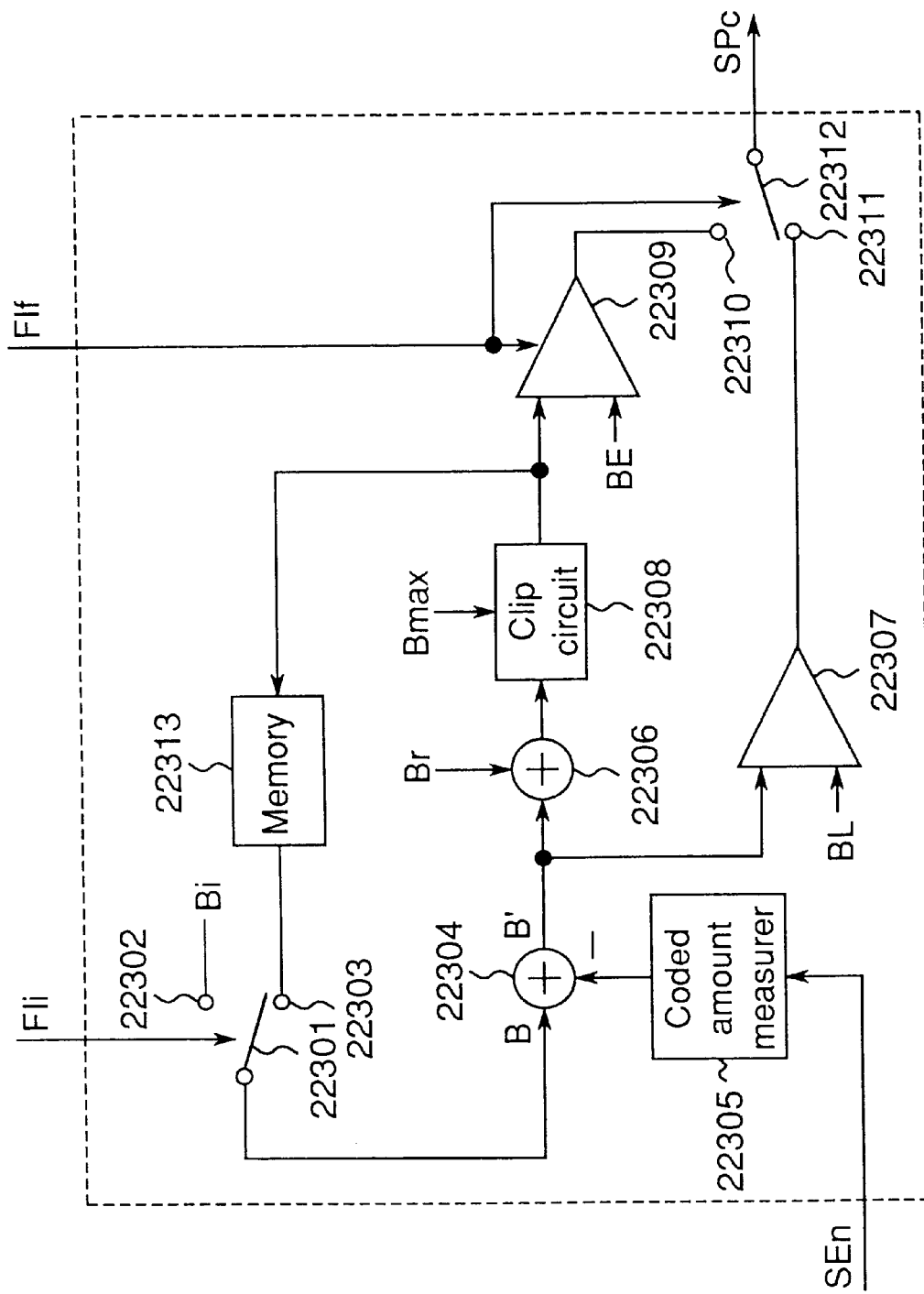
FIG. 55 is a block diagram showing a construction of the decoding buffer occupation calculator of FIG. 53.

Referring to FIG. 54 and FIG. 55, the operation of the decoding buffer occupation calculator 22105 and the allocated coding size regulator 22103 are described below.

FIG. 54 is a flow chart of decoding buffer occupation calculator 22105 operation. The steps of this flow chart divide the frame encoding process into the various operations performed over time T. It is also assumed in this flow chart that the data transfers to the video buffer 2600 are intermittent.

The data occupancy that changes during the encoding process in video buffer 2600 is defined as data occupancy B.

The expected data occupancy at time T calculated during encoding based on the target code size is defined as expected data occupancy BL.

The initial buffer occupancy of the video buffer 2600 at the start of encoding is initial buffer occupancy Bi, the target buffer occupancy at the end of encoding is the final target buffer occupancy BE, and the maximum video buffer capacity is maximum occupancy Bmax.

A video encoding method and apparatus whereby the encoded video streams after encoding will not create a data underflow state in the video buffer 2600 during decoding even when the video streams are separately encoded.

In the first embodiment below the initial buffer occupancy Bi is set as the initial video encode data V_INTST, and the final target buffer occupancy BE is set as the last video encode data V_ENDST, where V_INTST and V_ENDST are video encoding parameters of the encoding system controller 200 of the authoring encoder EC shown in FIG. 29. Note that BE and Bi are predefined values where BE>Bi.

The video group encoding process is described below with reference to the flow chart in FIG. 54.

At step #201, the initial buffer occupancy Bi to be produced is initialized to data occupancy B (B=Bi) based on the initial video encode data V_INTST encode parameter set to a predefined value by the encoding system controller 200.

At step #202 the generated code size Bg of the encoded data at time T is measured, and the data occupancy B is reduced by generated code size Bg (B=B−Bg).

At step #203 it is determined whether the data occupancy B is greater than the expected data occupancy BL. If the data occupancy B is greater than the expected data occupancy BL, i.e., YES is returned, the procedure moves to step #204. If the data occupancy B is less than the expected data occupancy BL, i.e., NO is returned, the procedure moves to step #210.

At step #210 the allocated coding size regulator 22103 is controlled to suppress the allocated code size of the frame to be encoded.

At step #204 the increase Br in the accumulated video data volume Vdv at time T is added to the data occupancy B (B=B3+Br) based on the video transfer rate BR to the video buffer 2600. The value of data occupancy B after time T is thus obtained.

At step #205 it is determined whether the data occupancy B is less than the predefined maximum occupancy Bmax. If NO is returned, i.e., data occupancy B is greater than or equal to maximum occupancy Bmax, the procedure moves to step #206. If YES is returned, the procedure moves to step #207.

At step #206 the data occupancy B is set to the maximum occupancy Bmax (B=Bmax). The maximum data occupancy B is thus limited to the maximum occupancy Bmax.

At step #207 it is determined whether the last frame in the video group is being processed. If YES is returned, i.e., the final frame is being processed, the procedure moves to step #208. If NO is returned, the procedure loops back to step #202.

At step #208 it is determined whether the data occupancy B is greater than the final target buffer occupancy BE. If it is, i.e., YES is returned, the procedure moves to step #209. If NO is returned, the procedure moves to step #211.

At step #211 the allocated coding size regulator 22103 is controlled to suppress the code size of the following video stream. Then the procedure moves to step #209.

At step #209 it is determined whether the encoding process is completed. If the video group is still be processed, the procedure loops back to step #202.

If the target of the video encoding process is a seamless switching multi-angled scene period, the above procedure is repeated for plural interleaved units ILVU.

Specific features of the above process are described in further detail below.

Steps #203 and #210 are processes used to prevent the video buffer 2600 underflowing. More specifically, if the data occupancy B of video buffer 2600 becomes less than the expected data occupancy BL, the video buffer 2600 may underflow at the completion of encoding one frame. As a result, the allocated coding size regulator 22103 is controlled to suppress the allocated code size of the following video stream data. This process is thus used to prevent the video buffer 2600 underflowing.

Steps #205 and #206 are processes used to prevent the video buffer 2600 overflowing. More specifically, the decoding process is stopped at the time the data occupancy B exceeds the maximum occupancy Bmax. As a result, video buffer 2600 overflowing is prevented.

Steps #207, #208, and #211 are steps fundamental to the present invention, and are used to limit the data occupancy at the end of encoding the last frame in the video group. When the data occupancy B is expected to become less than the final target buffer occupancy BE expected data occupancy BL, the allocated coding size regulator 22103 is controlled to suppress the allocated code size of the following video stream data.

By thus controlling the allocated code size, changes in the per-frame code size and changes in the total code size can be predicted, but the total code size can be adjusted to a predefined target value by adding or subtracting the per-frame change in the code size to the allocated code size of plural preceding or following frames.

By means of the embodiment described above, the data occupancy B after decoding the encoded video stream of the video group is the final buffer occupancy Be, and is a value greater than the final target buffer occupancy BE, i.e., a value greater than the initial buffer occupancy Bi.

In other words, the initial buffer occupancy Bi and the final buffer occupancy Be of the encoded video stream obtained by the first embodiment above are values greater than or equal to Bi, and the video buffer 2600 will not underflow even when encoded video streams are connected and reproduced.

A video buffer underflow will also not occur with a one-to-one connection between the encoded video streams obtained from the first embodiment above.

In addition, the video buffer will not underflow in the scene-to-scene connections at branches and connections as shown in FIG. 45 because the initial buffer occupancy Bi and final buffer occupancy Be values are the same, and final target buffer occupancy BE is greater than or equal to initial buffer occupancy Bi.

Furthermore, the video buffer will also not underflow in seamless switching multi-angled scenes and will not underflow in the interleaved units ILVU of any angle.

The decoding buffer occupation calculator 22105 executing the flow chart shown in FIG. 54 is described below with reference to the block diagram in FIG. 55.

As shown in the figure, the decoding buffer occupation calculator 22105 comprises a switch 22301, terminal 22302, terminal 22303, subtracter 22304, code size measurer 22305, adder 22306, first comparator 22307, clipping circuit 22308, second comparator 22309, terminal 22310, terminal 22311, switch 22312, and memory 22313.

The operation of the decoding buffer occupation calculator 22105 thus comprised is described below.

Immediately before encoding the first frame in the video group, switch 22301 connects with terminal 22302, and data occupancy B is set to initial buffer occupancy Bi.

After setting the initial buffer occupancy Bi, the switch 22301 connects to terminal 22303, and the data occupancy of memory 22313 after predefined time T is set to data occupancy B. The output of switch 22301 is input to subtracter 22304, and the subtracter 22304 subtracts the generated code size Bg from the data occupancy B determined at predefined time T by the code size measurer 22305.

The difference data occupancy B' is then compared with the expected data occupancy BL by the first comparator 22307. If the data occupancy B' is less than the expected data occupancy BL, the allocated coding size regulator 22103 is controlled to suppress the allocated code size of the following video stream, and thus prevent an underflow state.

The output B' from the subtracter 22304 is input to the adder 22306. The adder 22306 adds the data size Br input at time T to the video buffer 2600 to B'. The output from the adder 22306 is limited to maximum occupancy Bmax by the clipping circuit 22308, thereby preventing an overflow state.

The output from the clipping circuit 22308 is input to the memory 22313, and stored thereby as the data occupancy B of the next time T.

When the final frame in the video group is encoded, the output of the clipping circuit 22308 is compared with the final target buffer occupancy BE by the second comparator 22309. If the clipping circuit 22308 output is less than BE, the allocated coding size regulator 22103 is controlled to suppress the allocated code size of the following video stream so that the accumulated video data volume Vdv in the decode buffer after the video group coding process is completed is equal to or greater than the final target buffer occupancy BE.

When the final frame in the video group is being processed, the switch 22312 is connected to terminal 22310.

After the final frame has been processed, the switch 22312 switches to terminal 22311, the comparison result returned by the second comparator 22309 controls the decoding buffer occupation calculator 22105, and the comparison result returned by the first comparator 22307 controls the decoding buffer occupation calculator 22105.

The decoding buffer occupation calculator 22105 thus comprised executes the flow chart shown in FIG. 54 as described above.

As described above, Be>Bi even when the encoded video streams obtained by the reproduction method and apparatus of the present embodiment are connected, and the encoded video streams can be contiguously reproduced without the video buffer 2600 underflowing.

An encoding method and apparatus according to a second embodiment of the present invention are described below. Note that in this embodiment the configuration of the encoding apparatus is the same as that shown in FIG. 53, but the operation of the decoding buffer occupation calculator 22105 differs.

Figure 56:
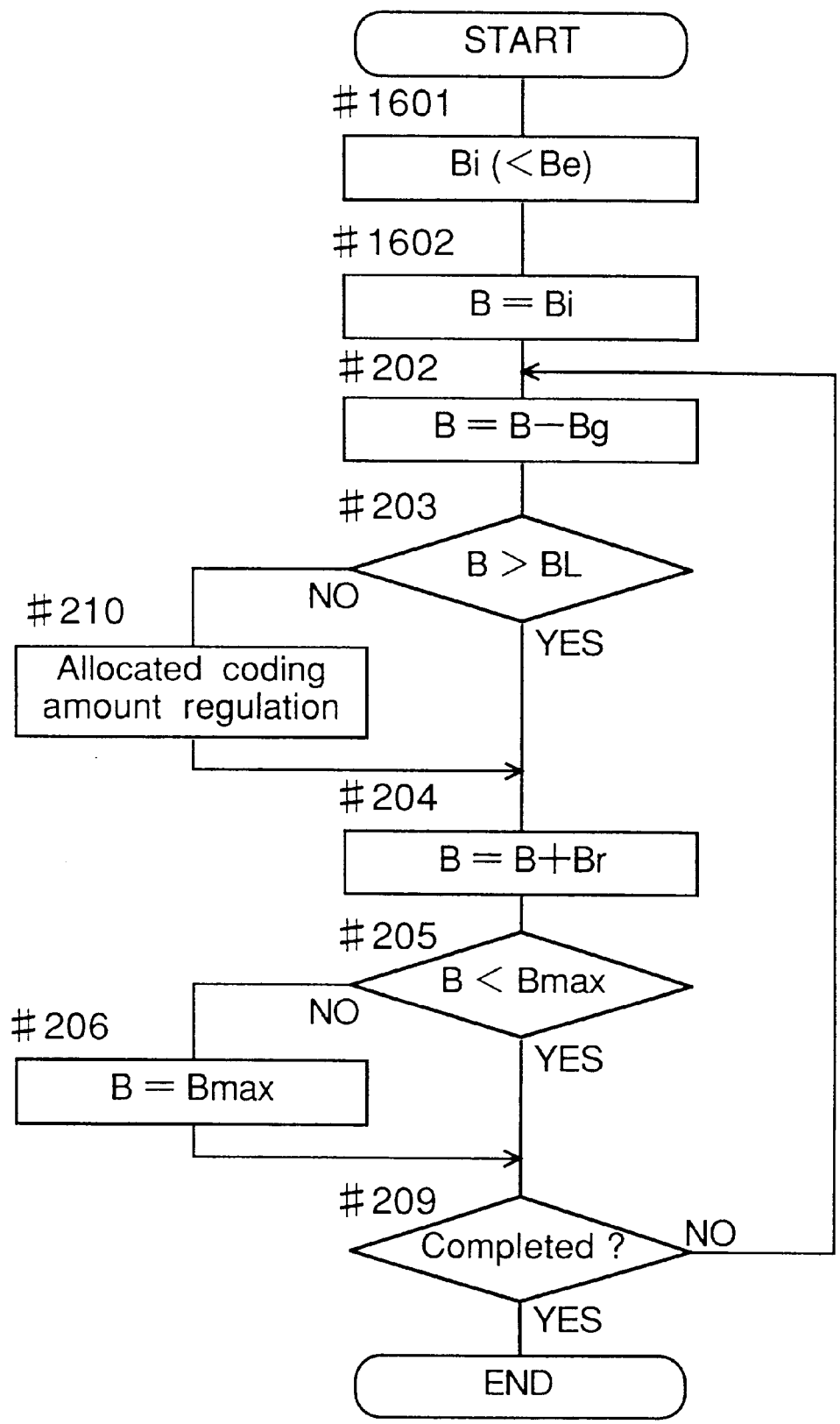
FIG. 56 is a flow chart showing an operation of the decoding buffer occupation calculator of FIG. 3.

FIG. 56 is a flow chart for the operation of the decoding buffer occupation calculator 22105. In the first embodiment above the initial buffer occupancy Bi of the video buffer 2600 during the encoding process is the same for each video group, and the code size is controlled so that the final buffer occupancy Be is greater than the final target buffer occupancy BE (BE>Bi).

In the present embodiment, however, the initial buffer occupancy Bi of the second video group following the first video group is set lower than the final buffer occupancy Be of the first video group (Bi<Be), and the second video group is encoded starting with this initial buffer occupancy Bi value. Thus, the difference between the first embodiment above and this second embodiment is that the first of two encoded video streams that are connected during reproduction is encoded first, i.e., the video streams are sequentially encoded, and the final buffer occupancy Be value is not controlled.

This process is described below with reference to FIG. 56.

At step #1601 an initial buffer occupancy value smaller than the final buffer occupancy Be of the encoded video stream for the preceding first video group is set as the initial buffer occupancy Bi of the current stream.

At step #1602 the data occupancy B value is initialized to the initial buffer occupancy Bi value set in step #1601 above.

The remaining process is the same as that shown in FIG. 54 except that steps #207, #208, and #211 are not needed.

Figure 57:
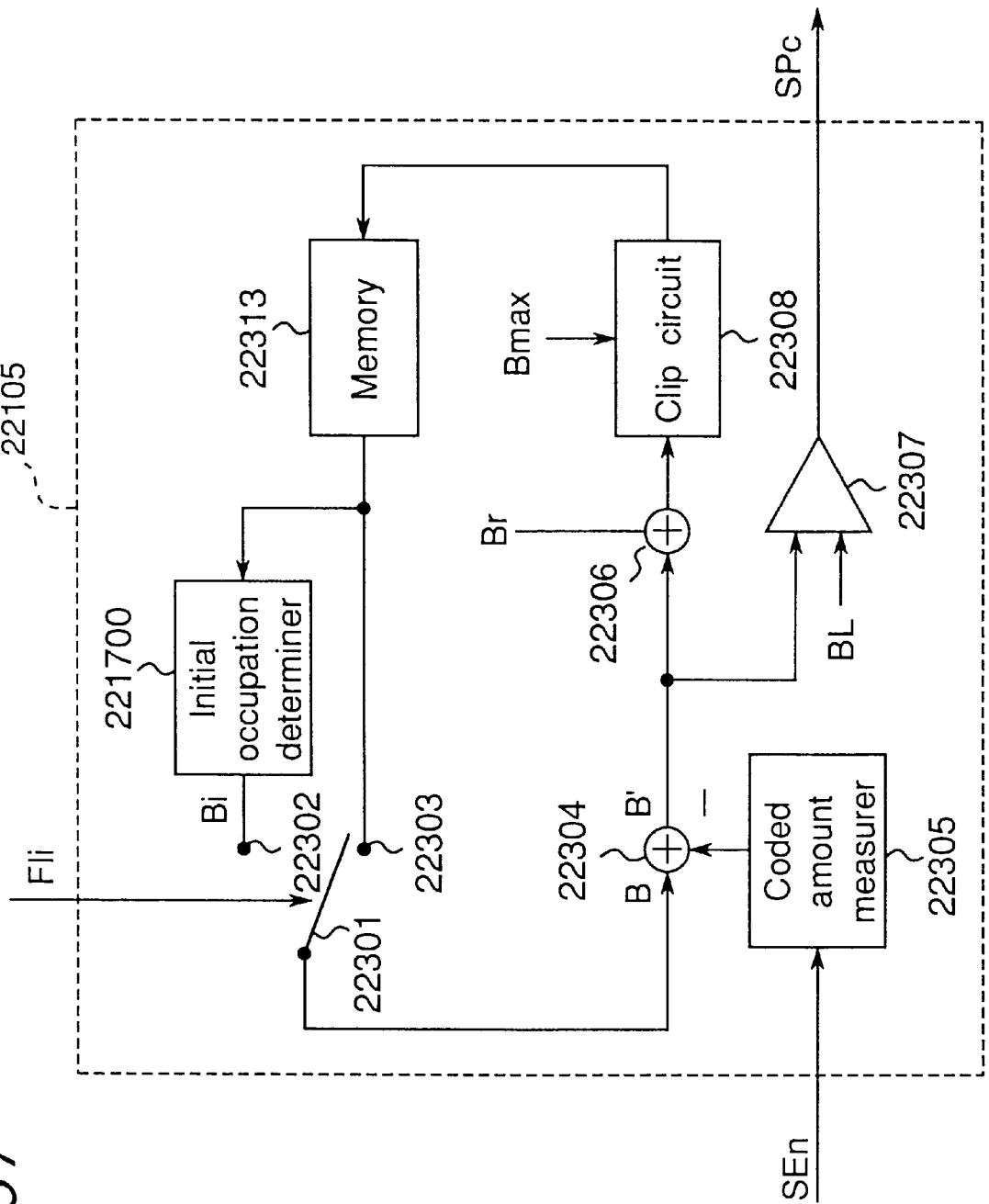
FIG. 57 is a block diagram showing a modification of the decoding buffer occupation calculator of FIG. 55.

An example of the encoding apparatus of the second embodiment is shown in FIG. 57, a block diagram of the decoding buffer occupation calculator 22105 executing the flow chart shown in FIG. 56.

Figure 59:
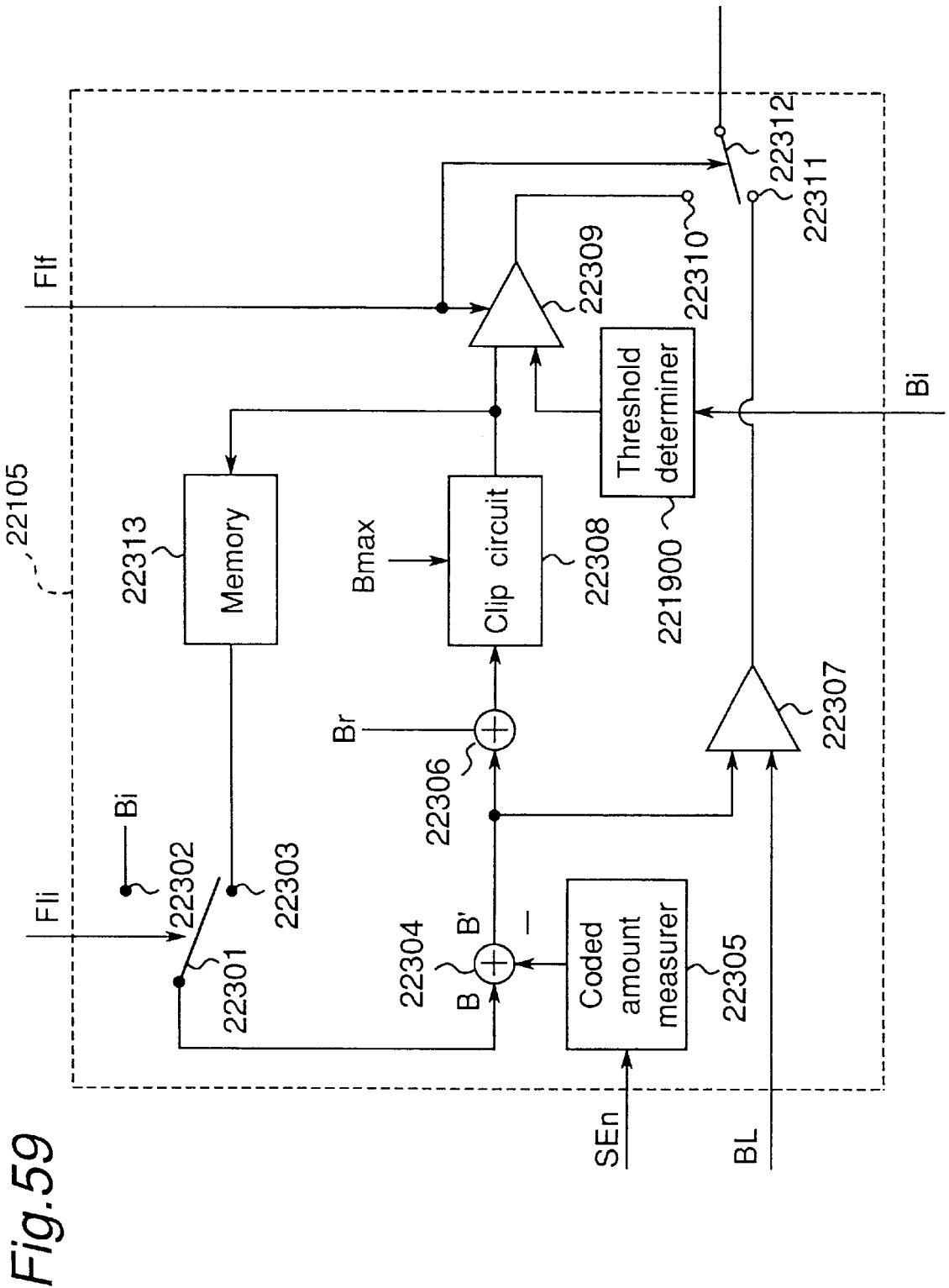
FIG. 59 is a block diagram of the decoding buffer occupation calculator executing the flow chart shown in FIG. 58.

The decoding buffer occupation calculator 22105 shown in FIG. 57 operates substantially identically to the decoding buffer occupation calculator 22105 shown in FIG. 59 except for the addition of the initial buffer occupancy Bi calculator 221700.

Referring to FIG. 57, an initial buffer occupancy value smaller than the final buffer occupancy Be of the encoded video stream for the preceding first video group is set as the initial buffer occupancy Bi value of the initial buffer occupancy Bi calculator 221700 before the coding begins.

After setting the initial buffer occupancy Bi, the switch 22301 switches to terminal 22302, and the data occupancy B is set to the initial buffer occupancy Bi.

After setting the initial buffer occupancy Bi, the switch 22301 connects to terminal 22303, and the data stored to memory 22313 is set to data occupancy B.

The output of switch 22301 is input to subtracter 22304, and the subtracter 22304 subtracts the generated code size Bg from the data occupancy B determined at predefined time T by the code size measurer 22305.

The difference data occupancy B' is then compared with the expected data occupancy BL, a predefined threshold value, by the first comparator 22307. If the data occupancy B' is less than the expected data occupancy BL, the allocated coding size regulator 22103 is controlled to suppress the allocated code size of the following video stream, and thus prevent an underflow state.

The output B' from the subtracter 22304 is input to the adder 22306. The adder 22306 adds the data size Br input at time T to the video buffer 2600 to B'. The output from the adder 22306 is limited to maximum occupancy Bmax by the clipping circuit 22308, thereby preventing an overflow state.

The output from the clipping circuit 22308 is input to the memory 22313, and stored thereby as the accumulated video data volume Vdv of the next time T. The data occupancy when coding the last video group is completed is used as the final buffer occupancy Be to obtain the initial buffer occupancy Bi for the next video group.

The decoding buffer occupation calculator 22105 thus comprised executes the flow chart shown in FIG. 56 as described above. As a result, the initial buffer occupancy Bi of the second video group connected to a preceding first video group stream is set to a value smaller than the final buffer occupancy Be of the first video group for encoding.

The decoding buffer occupation calculator 22105 in FIG. 57 differs from that in FIG. 55 in that the second comparator 22309 for controlling the final buffer occupancy Be and the switch 22312 are not needed, and the restrictions related to the code size allocation are fewer.

An encoding method and apparatus according to a third embodiment of the present invention are described below. Note that in this embodiment the configuration of the encoding apparatus is the same as that of the first embodiment shown in FIG. 53, but the operation of the decoding buffer occupation calculator 22105 differs.

Figure 58:
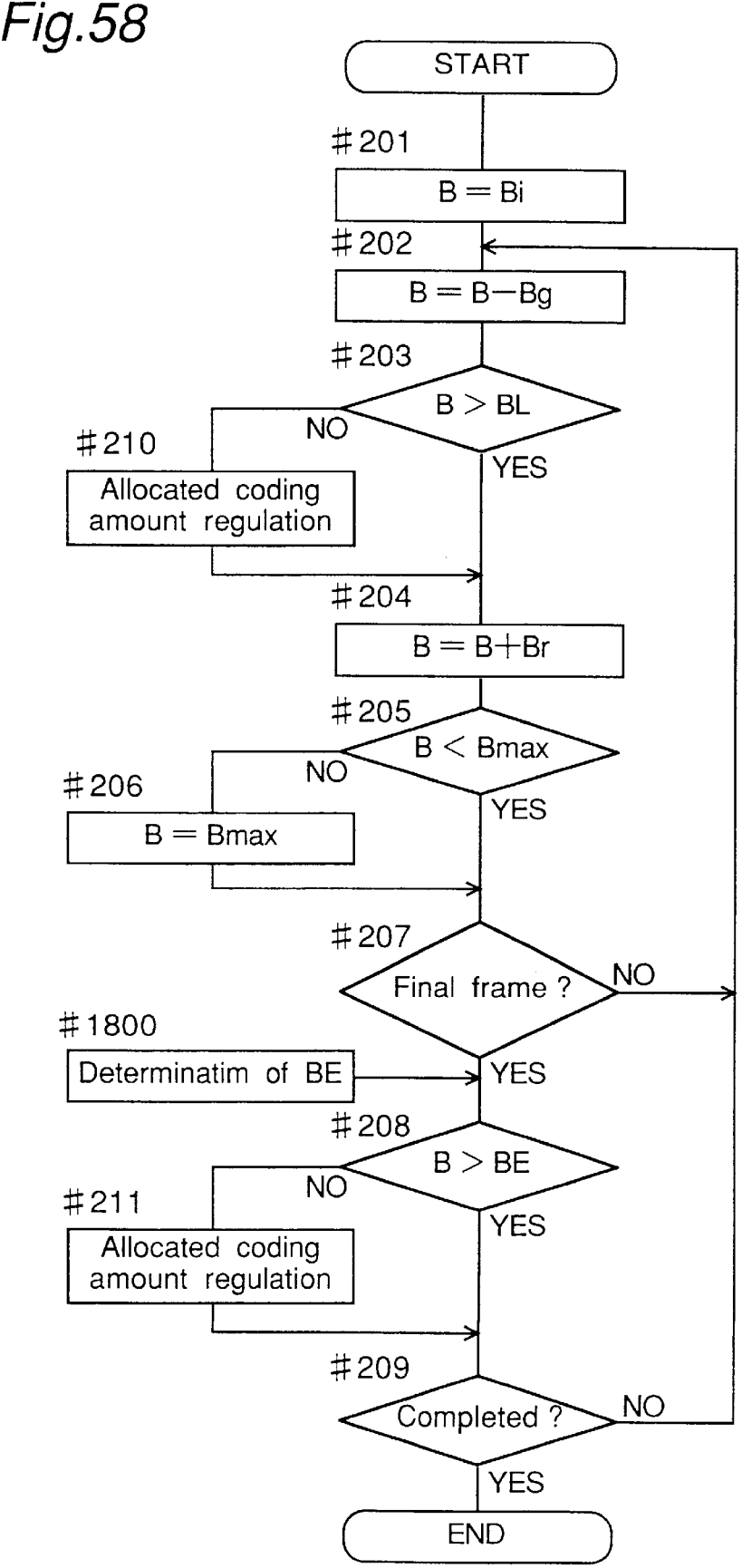
FIG. 58 is a flow chart showing a modified operation of the decoding buffer occupation calculator of FIG. 56.

FIG. 58 is a flow chart for the operation of the decoding buffer occupation calculator 22105. In the first embodiment above the final target buffer occupancy BE controlling the final buffer occupancy Be of the video buffer 2600 is set for each video group. The present embodiment differs in the addition of a step #1800 whereby the final target buffer occupancy BE is set so that the final buffer occupancy Be is greater than the initial buffer occupancy Bi of the next video group. The rest of the operation is the same as shown in FIG. 53, and further description is therefore omitted below.

FIG. 59 is a block diagram of the decoding buffer occupation calculator 22105 executing the flow chart shown in FIG. 58.

The decoding buffer occupation calculator 22105 shown in FIG. 59 operates substantially identically to the decoding buffer occupation calculator 22105 shown in FIG. 55 except for the addition of threshold value calculator 221900.

The threshold value calculator 221900 obtains a final target buffer occupancy BE value for the video group currently being processed that is greater than the specified initial buffer occupancy Bi value of the following video group.

The input to the threshold value calculator 221900 is the initial buffer occupancy Bi of the video group that will follow the current video group when two streams are connected. The video buffer data occupancy is controlled as in the first embodiment above so that the final buffer occupancy Be is greater than the final target buffer occupancy BE (BE>Bi).

By thus pre-determining the initial buffer occupancy Bi of the video group, the final buffer occupancy Be of the preceding video group will be a value greater than the initial buffer occupancy Bi of the following video group.

Note that in the first embodiment above the initial buffer occupancy Bi value is the same for all video groups, but in the second and third embodiments the initial buffer occupancy Bi is separately defined for each video group. Furthermore, in the second embodiment the coding process must proceed in the connection sequence of the encoded video stream because the initial buffer occupancy Bi of the following video group is defined based on the final buffer occupancy Be of the preceding video group.

In the first and third embodiments, however, the coding process can proceed in any sequence. As a result, the processing time can be shortened and the need to manage the coding process sequence can be reduced by using parallel processing.

A video buffer underflow will also not occur with a one-to-one connection between the encoded video streams obtained by the encoding method and encoding apparatus described above.

In addition, the video buffer will not underflow in the scene-to-scene connections at branches and connections as shown in FIG. 45 because the initial buffer occupancy Bi is less than the final buffer occupancy Be value.

Furthermore, the video buffer will also not underflow in seamless switching multi-angled scenes because the initial buffer occupancy Bi and final buffer occupancy Be values are the same for every interleaved unit ILVU of every angle, and the initial buffer occupancy Bi is equal to or less than the final buffer occupancy Be.

A bitstream reproduction method for connecting and reproducing the encoded video streams obtained by means of the encoding method and encoding apparatus described above is described below with reference to FIG. 60.

It is assumed that the encoded video stream SS1 containing frames F1, F2, F3, F4, and F5 is connected to and reproduced with the encoded video stream SS2 containing frames F6, F7. Note, further, that encoded video stream SS1 and encoded video stream SS2 are produced by means of the encoding method and encoding apparatus according to the present invention.

The final buffer occupancy Be1 of encoded video stream SS1 is greater than the final buffer occupancy Be2 of encoded video stream SS2. When data transfer of encoded video stream SS1 encoded video stream SS2 to the video buffer 2600 continues after encoded video stream SS1 is transferred, the final buffer occupancy Be1 of encoded video stream SS1 is the data occupancy of the video buffer 2600 when the last data in encoded video stream SS1 is decoded.

Figure 60:
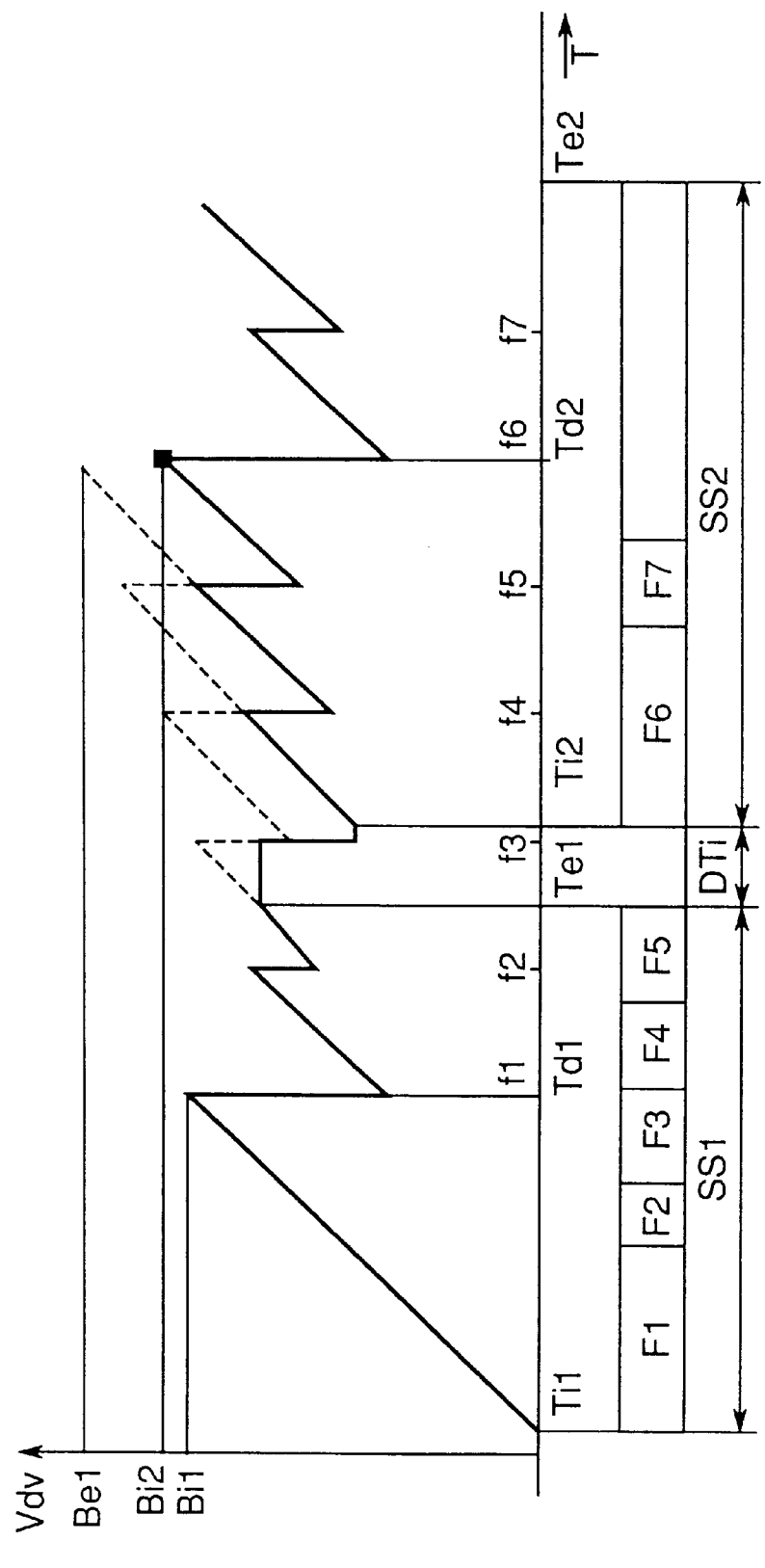
FIG. 60 is a graph in assistance of explaining a bitstream reproduction method for connecting and reproducing the encoded video streams.

The change in data occupancy at this time is shown by the dotted line in FIG. 60.

If data transfer of encoded video stream SS1 terminates at time Te1, data transfer is interrupted for period DTi, after which data transfer of encoded video stream SS2 starts at time Ti2. By thus transferring data, the video buffer will not fail. More specifically, decoding can proceed smoothly without data overflow or underflow.

The data transfer timing information contained in the MPEG-standard video stream is used to generate these video streams. More specifically, these video streams can be generated by using Ti2 rather than Te1 as the data transfer start time of encoded video stream SS2 to the video buffer. As a result, transfer of the encoded video stream to the video buffer 2600 can be interrupted for period DTi.

By thus interrupting data transfer for period DTi, the accumulated video data volume Vdv at the decode time of the first data in encoded video stream SS2 is the final buffer occupancy Be2 defined during encoding.

It is therefore possible for decoding to proceed using the video buffer data occupancy calculated when the streams were encoded. In other words, if at least failure of the video buffer 2600 is assured during encoding, failure of the video buffer 2600 during decoding can also be prevented.

The period DTi for which data transfer is interrupted is defined by the difference between the final buffer occupancy Be (expressed in bits) of the preceding video group and the initial buffer occupancy Bi (expressed in bits) of the video group following thereafter. Furthermore, if the video data transfer rate is BR expressed in bits per second (bits/second), then period DTi expressed in seconds can be obtained from equation 22141 below.

$$DTi = (Be-Bi)/BR \quad [2]$$

Note that the transfer rate BR in equation 22141 is the data transfer rate applied only to the video stream and is different from the transfer rate of the entire system stream.

While the time at which data transfer is interrupted is defined as after the encoded video stream SS1 is transferred in the above embodiment, the invention shall not be so limited, In particular, the interrupt period DTi can be divided into plural shorter interrupt periods to interrupt data transfer plural times.

In addition, it does not matter at what specific time point data transfer is interrupted insofar as data transfer is interrupted at least once and the buffer data occupancy is final buffer occupancy Be2 at the time Td2 at which decoding the first data in the following encoded video stream SS2 begins.

Furthermore, initial buffer occupancy Bi2 and final buffer occupancy Be2 are described as different values in FIG. 60, but these may also be the same values (Bi2=Be2).

It should also be noted that video stream data transfer may be interrupted for a period greater than the interrupt period DTi obtained by equation 22141 above as a result of transferring data from the audio or other system stream. Even in such cases, however, data transfer must be controlled so that the data occupancy of the video buffer 2600 at the decode start time equals the initial buffer occupancy Bi. As a result, because the data transfer rate BR applied to the encoded video stream in this case may be affected by non-video-stream data, the data transfer interrupt time and the accumulated video data volume Vdv in the video buffer 2600 must be calculated when encoding the non-video streams.

When plural video stream are interleaved to form a single data stream, the data transfer rate may change even during the decoding process of the same video stream depending upon the number of streams and the data size of each stream in the interleaved stream. The data transfer interrupt time and the accumulated video data volume Vdv in the video buffer 2600 must therefore also be calculated in such cases.

Figure 61:
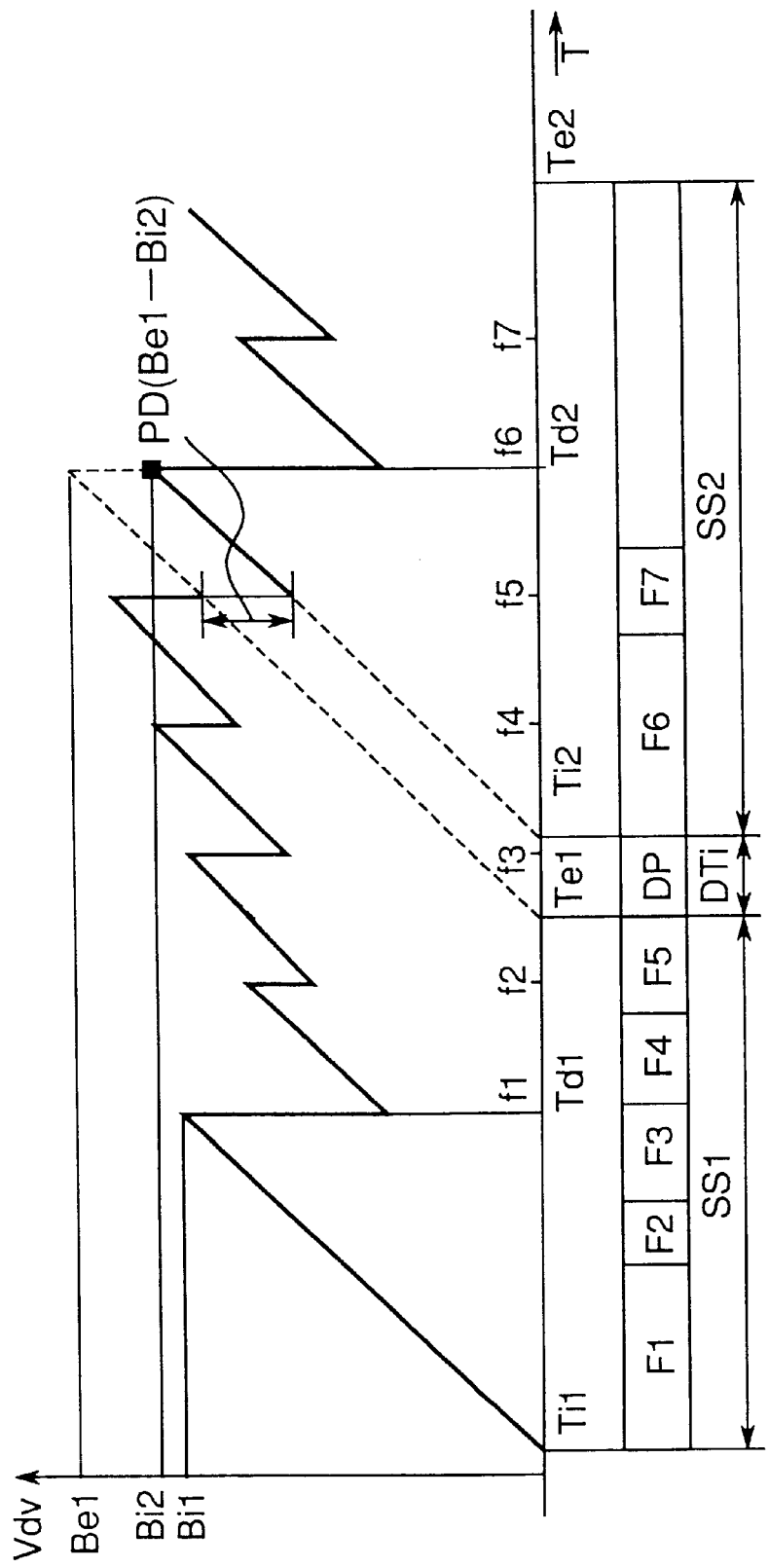
FIG. 61 is a graph in assistance of a bitstream production method.

A second embodiment of a bitstream production method according to the present invention is described below with reference to FIG. 61. This second method differs from the first described above in that padding data is inserted to the encoded video stream SS1 in this second embodiment. The amount of inserted padding data in this case is equivalent to the data transfer interrupt time of the encoded video stream SS1 described in the first embodiment above.

In other words, so that the final buffer occupancy Be2 of encoded video stream SS2 is equal to the value set during encoding, padding data conforming to the MPEG standard is generated with a data size equivalent to (Be1−Be2) encoded video stream SS1 and inserted to the encoded video stream SS1.

Note that while the padding data is transferred to the video buffer 2600, any predefined data that is different from the encoded data may be used.

In addition, if the padding data is inserted to the encoded video stream SS1, such padding data can be divided in some portions at any position. It should also be noted that the video stream production method may also use a combination of interrupting data transfer per the first embodiment above and inserting padding data per the second embodiment above. More specifically, a combination of data transfer interrupts and padding data insertion can be used insofar as the data occupancy when decoding the first data in the second video stream is the defined initial buffer occupancy Bi2 set during encoding.

The further effects of the bitstream production methods according to the present invention are described below with the description of the reproduction method of the invention.

Figure 62:
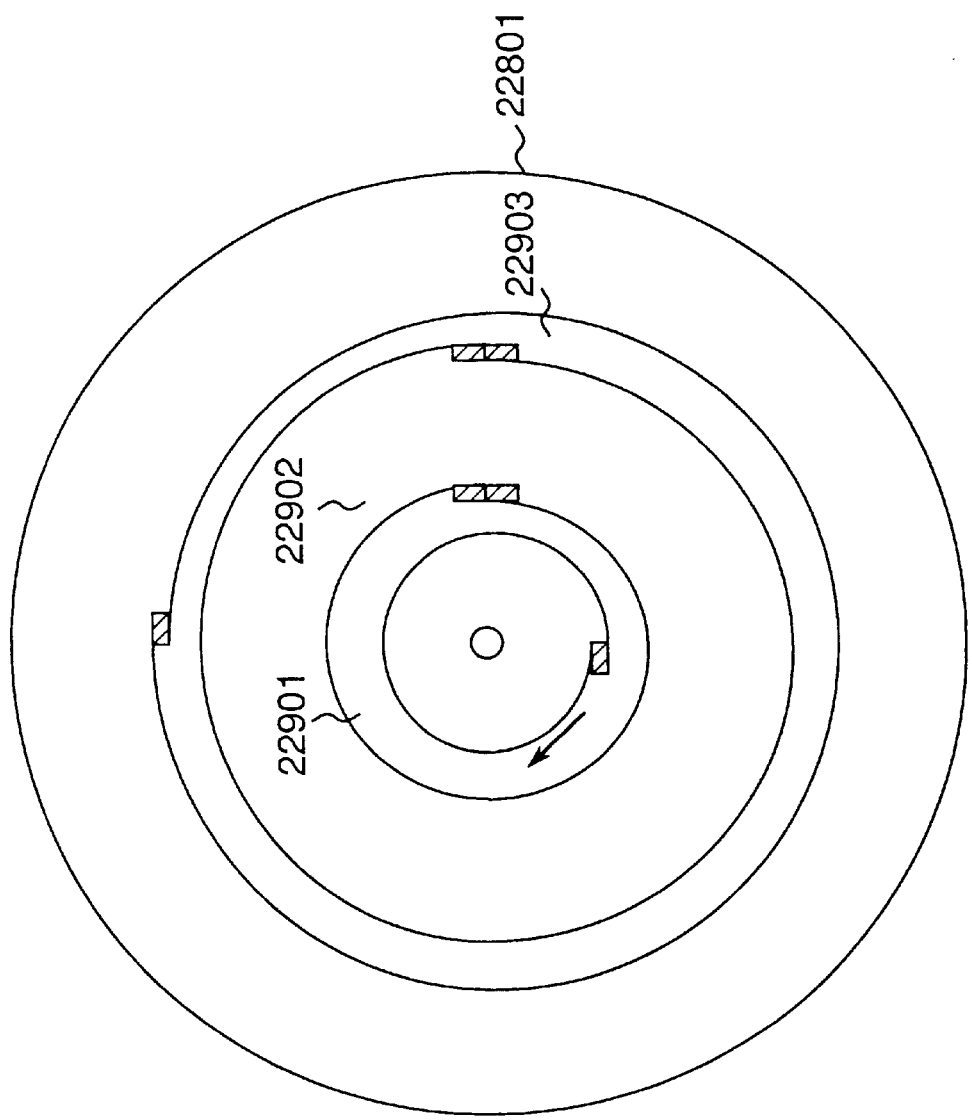
FIG. 62 is on a plan view of a digital video disk showing a structure of the data recorded thereon.

The bitstream generated with the data structure of the present invention is recorded as shown in FIG. 62 by means of the digital video disk shown in FIG. 4 to FIG. 15.

The digital video disk 22801 shown in FIG. 62 records the encoded data streams of two or more video groups produced by means of the encoding method and encoding apparatus according to the present invention described above. By way of example only, it is assumed below that the DVD 22801 records a first encoded data stream 22901, a second encoded data stream 22902, and a third encoded data stream 22903.

This digital video disk 22801 is characterized by recording data such that after data transfer to the video buffer 2600 of the encoded data for at least one video group is completed, data transfer is interrupted for interrupt time DTi (where DTi>0), and then the encoded data for the next video group is transferred to the video buffer 2600.

This recording format can be achieved simply by recording the encoded video stream obtained by means of the bitstream production method described above.

It should be noted that the connection point between encoded data containing a data transfer interrupt to the video buffer 2600 can be between two encoded data streams positioned contiguously on the digital video disk 22801. The data streams can also be recorded so that the data transfer interrupt occurs between non-contiguously recorded streams, such as between the first encoded data stream 22901 and third encoded data stream 22903 in FIG. 62.

This is also the case when padding data of a size equivalent to the video buffer 2600 data transfer interrupt time is recorded as in the second embodiment of a recording method according to the present invention.

This is also the case when a combination of data transfer interrupts and padding data is used. A combination of data transfer interrupts and padding data may be used insofar as the accumulated video data volume Vdv in the video buffer 2600 when decoding the first data in the video stream is the defined initial buffer occupancy Bi set during encoding.

A reproduction method for contiguously reproducing two encoded video streams is described below with reference to FIG. 63A, 63B, 32A, 32B, 32C, and 32D.

Figure 63A:
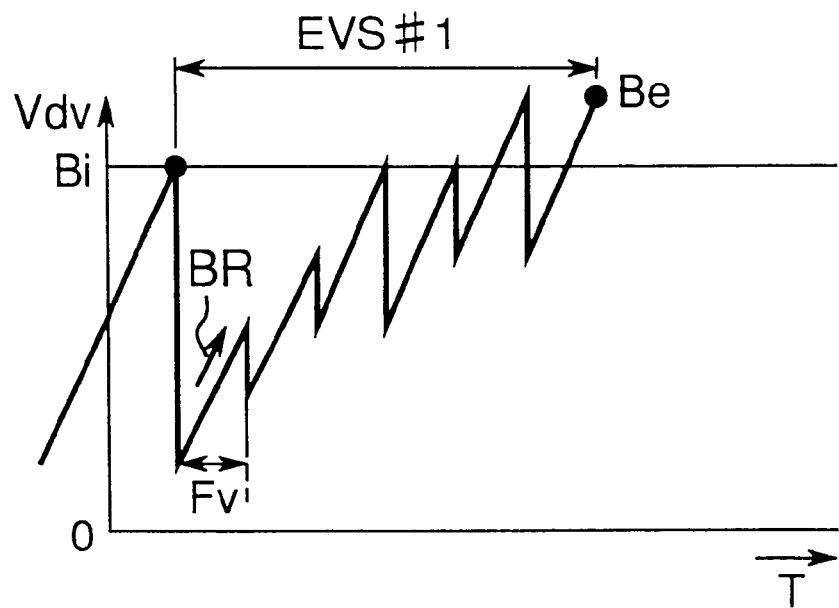
FIGS. 63A and 63B are graphs showing the change over time in the accumulated video data volume in the video buffer during encoded video stream decoding.
Figure 63B:
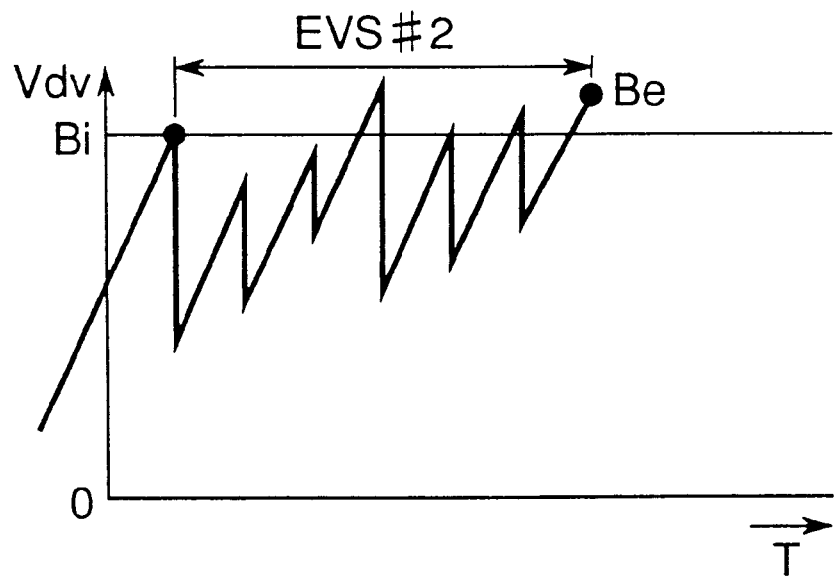

FIG. 63A and FIG. 63B show the change over time in the accumulated video data volume Vdv in the video buffer 2600 during encoded video stream decoding. Bi is the data occupancy of the video buffer 2600 at the start of decoding, and Be is the data occupancy of the video buffer 2600 at the end of decoding.

It should be noted that the data occupancy of the video buffer 2600 is graphed in the figures assuming that after input of the one encoded video stream is completed, the next encoded video stream to be decoded is input contiguously from the end of the preceding encoded video stream.

With both the first encoded video stream in FIG. 63A and the second encoded video stream in FIG. 63B, the final buffer occupancy Be of the video buffer 2600 at the end of decoding is greater than the initial buffer occupancy Bi of the video buffer 2600 at the start of decoding.

The reproduction control method of the present invention for contiguously reproducing the encoded video stream produced by the present invention is described below.

Figure 32A:
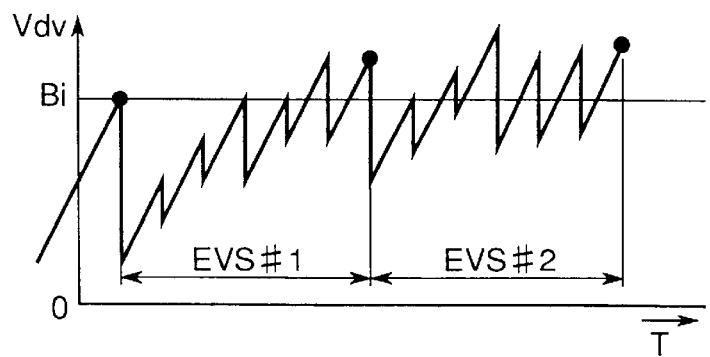
FIG. 32A, 32B, 32C, and 32D are graphs in assistance of explaining the changes in the accumulated video data volume Vdv in the video buffer in the various occasions.

FIG. 32A shows the change in the accumulated video data volume Vdv in the video buffer 2600 when the first encoded video stream in FIG. 63A and the second encoded video stream in FIG. 63B are simply connected and reproduced.

In this case, the final buffer occupancy Be of the video buffer 2600 when decoding the encoded video stream EVS #1 shown in FIG. 63A is completed is greater than the initial buffer occupancy Bi of the video buffer 2600 at the start of decoding the encoded video stream EVS #2 shown in FIG. 63B. Therefore, encoded video stream EVS #2 can guarantee that the video buffer 2600 will not underflow during decoding.

The accumulated video data volume Vdv in the video buffer 2600 when decoding encoded video stream EVS #2 starts is greater than the initial buffer occupancy Bi expected during encoding. This difference is the difference between the final buffer occupancy Be of encoded video stream EVS #1 and the initial buffer occupancy Bi of encoded video stream EVS #2 (DB). As a result, the accumulated video data volume Vdv in the video buffer 2600 varies at a level increased by this difference DB.

This means that there is the possibility of the video buffer 2600 overflowing.

A method of avoiding an overflow is described below with reference to FIG. 32B, FIG. 32C, and FIG. 32D.

Method 1

A first method of avoiding an overflow is described with reference to FIG. 32B.

Figure 32B:
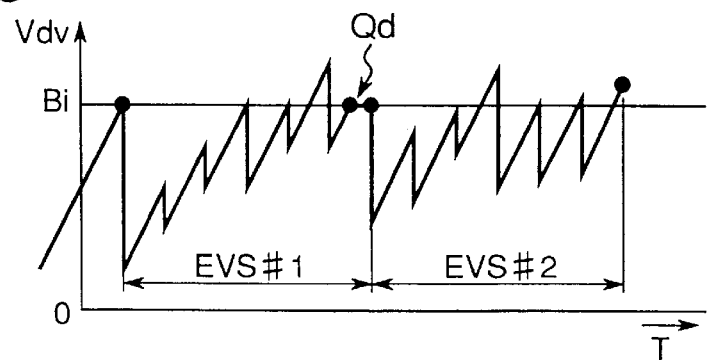

As shown in FIG. 32B, input to the video buffer 2600 stops at time Qd. By thus interrupting data input to the video buffer 2600, the buffer occupancy at the start of encoded video stream EVS #2 decoding is initial buffer occupancy Bi.

By thus controlling the buffer occupancy at the start of encoded video stream EVS #2 decoding to initial buffer occupancy Bi, the change in the accumulated video data volume Vdv in the video buffer 2600 thereafter is as shown in FIG. 63B. An overflow in the accumulated video data volume Vdv of video buffer 2600 can thus be prevented.

Note that stopping input to the video buffer 2600 can be easily controlled using the system clock reference SCR value (FIG. 19) declaring the pack transfer time. The system clock reference SCR is written to the pack header.

The encoded video stream is transferred using video packets. The video packets are read from the stream buffer 2400 (FIG. 26) and input to the video buffer 2600 according to the system clock reference SCR of the pack containing that packet.

It is therefore possible to stop input to the video buffer 2600 by means of the system clock reference SCR of the pack containing that packet.

Method 2

A second method of avoiding an overflow is described with reference to FIG. 32C.

Figure 32C:
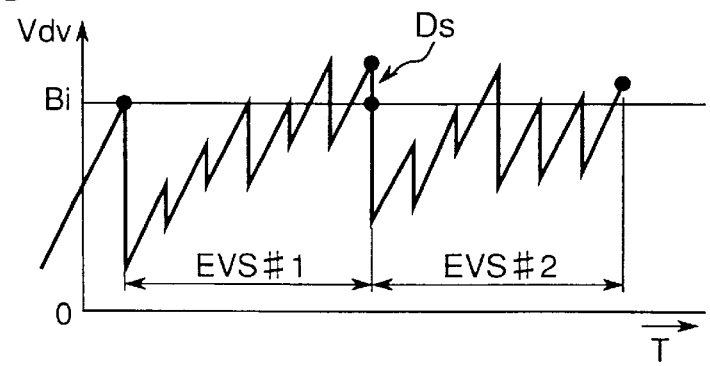

As shown in FIG. 32C, the buffer occupancy at the start of encoded video stream EVS #2 decoding is controlled to initial buffer occupancy Bi by inserting a padding packet Ds at the connection point.

By thus controlling the buffer occupancy at the start of encoded video stream EVS #2 decoding to initial buffer occupancy Bi, the change in the accumulated video data volume Vdv in the video buffer 2600 thereafter is as shown in FIG. 63B. An overflow in the accumulated video data volume Vdv of video buffer 2600 can thus be prevented.

Note the size of the padding packet need only be equal to the difference between the final buffer occupancy Be of encoded video stream EVS #1 and the initial buffer occupancy Bi of encoded video stream EVS #2 (DB).

Method 3

A third method of avoiding an overflow is described with reference to FIG. 32D.

Figure 32D:
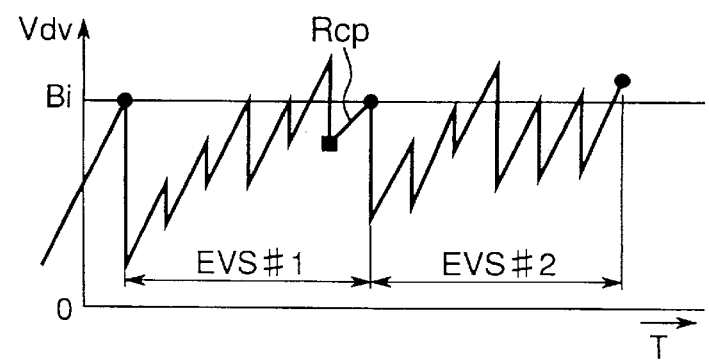

As shown in FIG. 32D, the buffer occupancy at the start of encoded video stream EVS #2 decoding is controlled to initial buffer occupancy Bi by changing the data input rate (Rcp) to the video buffer 2600 at the connection point.

By thus controlling the buffer occupancy at the start of encoded video stream EVS #2 decoding to initial buffer occupancy Bi, the change in the accumulated video data volume Vdv in the video buffer 2600 thereafter is as shown in FIG. 63B. An overflow in the accumulated video data volume Vdv of video buffer 2600 can thus be prevented.

Note that the change in the input rate Rcp to the video buffer 2600 can be easily changed using the system clock reference SCR (FIG. 19) declaring the pack transfer time. The system clock reference SCR is written to the pack header.

As shown in method #1 above, this can be achieved by changing the interval of the SCR value in the pack containing that packet.

Figure 39:
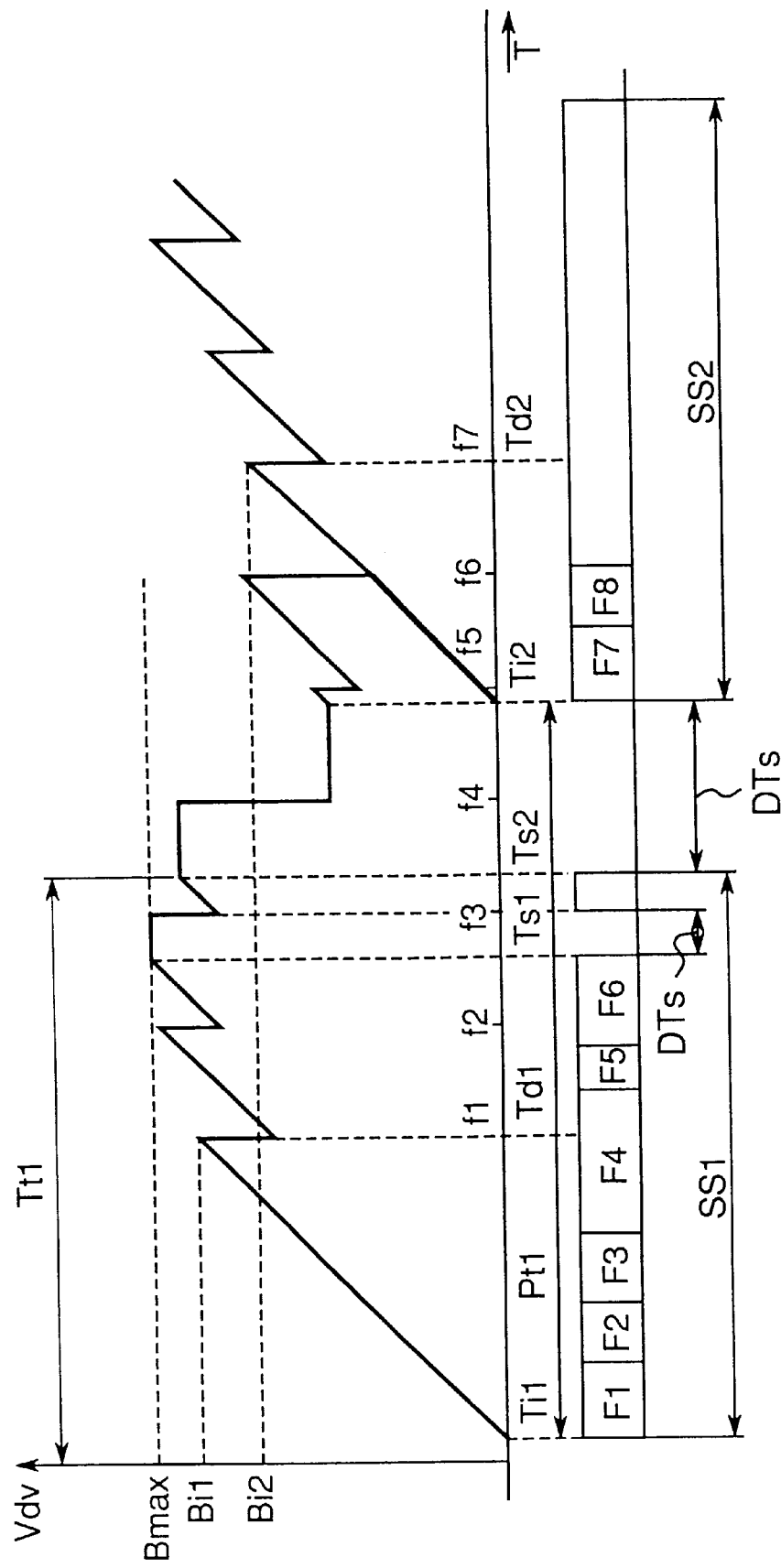
FIG. 39 is a graph in assistance of explaining a change in the accumulated video data volume Vdv in the video buffer 2600 during intermittent data transfer when encoded video stream SS1 and encoded video stream SS2 are connected.

Referring to FIG. 39, the change in the accumulated video data volume Vdv in the video buffer 2600 during intermittent data transfer when encoded video stream SS1 and encoded video stream SS2 are connected is described next. It is assumed that the encoded video stream SS1 and encoded video stream SS2 are recorded and reproduced by means of the recording and reproduction methods of the present invention.

This process is also described in comparison with the change in the accumulated video data volume Vdv shown in FIG. 46.

As in FIG. 46, data transfer of system stream SS1 to video buffer 2600 starts at time Ti1. At time Td1 decoding of the first frame F1 starts. Thereafter the accumulated video data volume Vdv varies as described with reference to FIG. 46. However, the accumulated video data volume Vdv reaches the maximum occupancy Bmax at time Ts1. If data transfer is continued beyond maximum occupancy Bmax, the video buffer 2600 will overflow, and data may be lost. Data transfer is therefore interrupted. Specifically, accumulated video data volume Vdv is held constant.

When frame F3 is then decoded at time f3, the accumulated video data volume Vdv in the video buffer 2600 drops below the maximum occupancy Bmax, and data transfer continues. Data transfer is next interrupted from time Ts2 to time Ti2. At time Ti2 data transfer of encoded video stream SS2 to the video buffer 2600 begins. At time Td2 (f7), decoding the first frame F7 in the second encoded video stream SS2 begins.

As shown in FIG. 39, the present invention is characterized by interrupting data transfer from time Ts2 to time Ti2 so that the accumulated video data volume Vdv in the video buffer 2600 is initial buffer occupancy Bi2 at time Td2 (f7) when decoding the encoded video stream SS2 begins.

The data transfer interrupt time Dts in the embodiment shown in FIG. 39 can be calculated using equation 22201.

$$Dts = Tt1 - D1/BR + (Be1 - Bi2)/BR \quad [3]$$

where D1 is the data size of encoded video stream SS1 and BR is the data transfer rate of encoded video stream SS1 as in equation 22061, and Tt1 is the data transfer time of the encoded video stream SS1 shown as period SS1 in FIG. 39.

The value (Tt1−D1/BR) in equation 22201 is the data transfer interrupt time obtained from equation 22061 and required to prevent a data overflow. Likewise, the period ((Be1−Bi2)/BR) is the period obtained from equation 22141 to interrupt data transfer so that the accumulated video data volume Vdv at time Td2 (f7) when decoding the second encoded video stream SS2 begins is initial buffer occupancy Bi2. The use of these two values to determine the data transfer interrupt time is a characteristic of the recording method and reproduction of the present invention.

By controlling decoding and reproducing based on the transfer time information written to the encoded video stream generated by the bitstream production method of the present invention, the change in the accumulated video data volume Vdv in the video buffer 2600 during decoding can be controlled to the calculated change used during the encoding process.

When the encoded data streams obtained by encoding the video groups by means of the encoding method and encoding apparatus of the invention are connected, the streams can be contiguously decoded, seamlessly reproduced, and smooth video presentation can be obtained without video buffer 2600 failure.

When encoded data streams obtained by encoding plural video groups are reproduced by means of the reproduction apparatus of the invention, different streams can be connected, contiguously decoded, and smooth video presentation can be obtained if the streams are encoded so that the accumulated video data volume Vdv in the video buffer 2600 at the end of decoding each stream is greater than a specified data occupancy Bt, which is greater than the accumulated video data volume Vdv at the decoding start.

Moreover, if the streams are produced by means of the encoding method and encoding apparatus of the invention, the accumulated video data volume Vdv during decoding can always be calculated during encoding even if streams are connected and contiguously decoded. As a result, it is simpler to interleave the streams with consideration given to synchronization with audio and other data types.

In particular, because the initial buffer occupancy Bi of the encoded data is less than the final buffer occupancy Be (Be>Bi) in streams encoded by means of the encoding method and encoding apparatus of the invention, the streams can be contiguously decoded, seamlessly reproduced, and smooth video presentation can be obtained without video buffer 2600 failure even when these encoded data streams are connected at user-defined points.

Note that data transfer to the video buffer 2600 can be intermitted or the transfer rate can be varied.

The compression coding method may also be variable length coding, variable bit rate coding, or another coding method.

The time-base length of the video groups is also not fixed, and may vary in each video group.

The allocated coding size regulator 22103 of the encoding apparatus of the present invention may also detect the difficulty of the video signal encoding process, and specify the allocated code size according to the detected difficulty. This process enables the use of variable bit rate coding whereby the signal is encoded at a bit rate that varies according to the video.

The code size control method controlling the produced code size to within a defined limit shall not be limited to the method described above, and may, for example, control signal quantization parameters to control the code size.

Furthermore, while the embodiments have been described using an optical disk recording medium, the invention shall not be so limited and magnetic disks, magnetic tape, and other recording media can be used.

The encoding method and encoding apparatus of the invention can thus contiguously decode and seamlessly reproduce a smoothly connected reproduction signal without video buffer 2600 failure even when the encoded data streams of plural video groups are connected at user-defined points.

Furthermore, the final buffer occupancy Be and initial buffer occupancy Bi values do not need to be equal at the stream connection points, and code size can be easily controlled insofar as the final buffer occupancy Be is greater than initial buffer occupancy Bi.

Furthermore, by interrupting data transfer to the video buffer 2600 for a predefined time at the connection point between the encoded data streams of the video groups, the reproduction method of the present invention can begin the decoding process when the data occupancy of the video buffer 2600 equals the initial buffer occupancy Bi value set during encoding, and decoding can proceed with the change in the accumulated video data volume Vdv in the video buffer 2600 varying as expected during encoding. Decoding can therefore proceed without video buffer 2600 failure.

When reproducing by means of the reproduction method of the present invention encoded video streams obtained by encoding plural video groups, different streams can be connected and contiguously decoded, and a smoothly connected reproduction signal can be obtained, if the streams are encoded so that the final video buffer 2600 occupancy of each stream is greater than the accumulated video data volume Vdv at the start of decoding.

The encoding method and encoding apparatus of the invention can contiguously decode and seamlessly reproduce a smoothly connected reproduction signal without video buffer failure even when the encoded data streams of plural video groups are connected at user-defined points.

The reproduction method of the present invention can also execute the decoding process with the change in the accumulated video data volume Vdv in the video buffer varying as expected during encoding. Decoding can therefore proceed without video buffer failure.

However, when data is read from the optical disk M by means of the DVD decoder DCD shown in FIG. 26, intermittent data transfer reading only as much data as required for decoding from the optical disk M can be achieved. When the DVD decoder DCD video buffer 2600 seems about to overflow in this case, it is possible to prevent an overflow by stopping data reading before the buffer overflows. Decoding can thus be completed without losing any encoded data. The reproduction apparatus, i.e., the DVD decoder DCD, can therefore handle overflow processing.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An encoding method for producing specific encoded data comprising the steps of:

calculating the data occupancy of a decoding buffer memory of a particular size that is used when decoding the encoded data during reproduction, defining the allocated code size of a particular period based on the calculation result, and compression coding the signal of a particular period to the allocated code size, wherein the data occupancy is calculated on the assumption that virtual encoded data is transferred to the decoding buffer memory following the transfer of first-encoded data to the decoding buffer memory, the data occupancy when last data in the first-encoded data is decoded is calculated as a final buffer occupancy Be, the data occupancy when the encoding process producing second encoded data is begun is an initial buffer occupancy Bi where the initial buffer occupancy Bi is less than the final buffer occupancy Be, and the allocated code size is defined based on the change in the data occupancy.

2. An encoding method for producing specific encoded data comprising:

calculating the data occupancy of a decoding buffer memory of a particular size that is used when decoding the encoded data during reproduction, defining the allocated code size of a particular period based on the calculation result, and compression coding the signal of a particular period to the allocated code size, wherein the data occupancy is calculated on the assumption that virtual encoded data is transferred to the decoding buffer memory following the transfer of first-encoded data to the decoding buffer memory, the data occupancy when last data in the first-encoded data is decoded is calculated as a final buffer occupancy Be, the data occupancy when the encoding process producing second-encoded data is begun is an initial buffer occupancy Bi, the allocated code size is defined based on the change in the data occupancy, and the allocated code size is defined such that the final buffer occupancy Be of the first-encoded data is greater than a particular size Bt where Bt>Bi.

3. An encoding method for producing specific encoded data comprising:

calculating the data occupancy of a decoding buffer memory of a particular size that is used when decoding the encoded data during reproduction, defining the allocated code size of particular period based on the calculation result, and compression coding the signal of a particular period to the allocated code size, wherein the data occupancy when the encoding process producing each of the encoded data is begun is an initial buffer occupancy Bi, the data occupancy is calculated on the assumption that virtual encoded data is transferred to the decoding buffer memory following the transfer of the encoded data to the decoding buffer memory, the data occupancy when last data in the encoded data is decoded is calculated as a final buffer occupancy Be, the allocated code size is defined based on the change in the data occupancy, and is defined such that the final buffer occupancy Be is greater than a particular Bt where Bt>Bi.

4. An encoding method according to any of claims 1 to 3 whereby the allocated code size is defined such that the data occupancy is greater than a particular minimum occupancy B1.

5. An encoding method according to any of claims 1 to 3 whereby the encoded data is input to the decoding buffer memory at a variable transfer rate.

6. An encoding method according to any of claims 1 to 3 whereby when the encoded data is input to the decoding buffer memory, the data is transferred intermittently.

7. An encoding method according to any of claims 1 to claim 3 whereby the data occupancy is controlled to always be less than a particular maximum occupancy Bmax.

8. An encoding apparatus for compression coding a signal to produce encoded data, said apparatus comprising:

a code size regulator for defining the allocated code size of a particular period, a compression coding controller for producing an encoded data signal and controlling the code size of the encoded signal to reduce the difference between the allocated code size and a generated code size of the encoded data, and a data occupancy calculator for calculating the data occupancy of a decoding buffer memory of a particular size that is used when decoding the encoded data during reproduction, wherein the data occupancy calculator calculates the data occupancy on the assumption that virtual encoded data is transferred to the decoding buffer memory following the transfer of first-encoded data to the decoding buffer memory, the data occupancy calculator calculates the data occupancy when the last data in the first-encoded data is decoded as a final buffer occupancy Be, the data occupancy calculator sets the data occupancy when the encoding process producing second encoded data is begun to an initial buffer occupancy Bi where the initial buffer occupancy Bi is less than the final buffer occupancy Be, and the code size regulator defines the allocated code size based on the change in the data occupancy.

9. An encoding apparatus for compression coding a signal to produce encoded data, said apparatus comprising:

a code size regulator for defining the allocated code size of a particular period, a compression coding controller for producing an encoded data signal and controlling the code size of the encoded signal to reduce the difference between the allocated code size and a generated code size of the encoded data, and a data occupancy calculator for calculating the data occupancy of a decoding buffer memory of a particular size that is used when decoding the encoded data during reproduction, wherein the data occupancy calculator calculates the data occupancy on the assumption that virtual encoded data is transferred to the decoding buffer memory following the transfer of first-encoded data to the decoding buffer memory, calculates the data occupancy when the last data in the first_encoded data is decoded as a final buffer occupancy Be, sets the data occupancy when the encoding process producing second encoded data is begun to an initial buffer occupancy Bi, defines the allocated code size based on the change in the data occupancy, and the code size regulator defines the allocated code size based on the data occupancy such that the final buffer occupancy Be of the first-encoded data is greater than a particular size Bt where Bt>Bi.

10. An encoding apparatus for compression coding a signal to produce encoded data, said apparatus comprising:

a code size regulator for defining the allocated code size of a particular period, a compression coding controller for producing an encoded data signal and controlling the code size of the encoded signal to reduce the difference between the allocated code size and a generated code size of the encoded data, and a data occupancy calculator for calculating the data occupancy of a decoding buffer memory of a particular size that is used when decoding the encoded data during reproduction, wherein the data occupancy calculator sets the data occupancy when the encoding process producing each of the encoded data is begun to an initial buffer occupancy Bi, and calculates the data occupancy on the assumption that virtual encoded data is transferred to the decoding buffer memory following the transfer of the encoded data to the decoding buffer memory, the code size regulator defines the allocated code size based on the data occupancy such that a final buffer occupancy Be of the encoded data is greater than a particular size Bt where Bt>Bi.

11. An encoding apparatus according to any of claims 8 to 10 wherein the allocated code size is defined such that the data occupancy is greater than a particular minimum occupancy B1.

12. An encoding apparatus according to any of claims 8 to 10 wherein the encoded data is input to the decoding buffer memory at a variable transfer rate.

13. An encoding apparatus according to any of claims 8 to 10 wherein when the encoded data is input to the decoding buffer memory, the data is transferred intermittently.

14. An encoding apparatus according to any of to claims 8 to 10 wherein the data occupancy is controlled to be less than a particular maximum occupancy Bmax.

15. A recording method for recording to a recording medium encoded data processed according to the data occupancy of a decoding buffer memory of a particular size that is used when decoding the encoded data during reproduction, said method comprising:

determining that a data occupancy when last data in first-encoded data is decoded is a final buffer occupancy Be where it is assumed that virtual encoded data is transferred to the decoding buffer memory following the transfer of the first-encoded data to the decoding buffer memory, determining that a data occupancy at the start of second-encoded data is an initial buffer occupancy Bi where the initial buffer occupancy Bi is less than the final buffer occupancy Be, and processing and recording the encoded data according to the determined data occupancy of the decoding buffer memory.

16. A recording method according to claim 15 whereby decoding buffer memory input time information of the encoded data is recorded to interrupt data transfer to the buffer memory for a particular period T (T>O) when the first-encoded data and second-encoded data are transferred to the decoding buffer memory, where period T is defined by the final buffer occupancy Be of the first-encoded data and the initial buffer occupancy Bi of the second-encoded data.

17. A recording method according to claim 16 where the period T is defined as ((Be−Bi)/BR) where the data transfer rate to the decoding buffer memory is BR.

18. A recording method according to claim 15 whereby data of a particular pattern of a particular data size defined as (Be−Bi) is inserted and recorded to the first-encoded data.

19. A recording medium including encoded data processed according to the data occupancy of a decoding buffer memory of a particular size that is used when decoding the encoded data during reproduction by a recording medium reproduction device, said recording medium comprising:

a plurality of data blocks, control data for controlling a reproduction order of the plurality of data blocks, said control data including a seamless reproduction flag which indicates encoded data to be seamlessly reproduced, and encoded data recorded such that the data occupancy when last data in first-encoded data is decoded is a final buffer occupancy Be where it is assumed that virtual encoded data is transferred to the decoding buffer memory following the transfer of the first-encoded data to the decoding buffer memory, and the data occupancy at the start of decoding of second-encoded data is an initial buffer occupancy Bi where the initial buffer occupancy Bi is less than the final buffer occupancy Be.

20. A recording medium according to claim 19 wherein the recording medium is an optical disk.

21. A recording medium according to claim 19 wherein decoding buffer memory input time information of the data is recorded to interrupt data transfer to the decoding buffer memory for a particular period T (T>O) when first-encoded data and second-encoded data are transferred to the decoding buffer memory, where period T is defined by the final occupancy Be of the first-encoded data and the initial buffer occupancy Bi of the second-encoded data.

22. A recording medium according to claim 21 wherein period T is defined as ((Be−Bi)/BR) where the data transfer rate to the decoding buffer memory is BR.

23. A recording medium according to claim 19 wherein data of a particular pattern of a particular data size defined as (Be−Bi) is inserted and recorded to the first-encoded data.

24. A reproduction method for reproducing data from a recording medium having recorded thereon encoded data processed according to the data occupancy of a decoding buffer memory of a particular size that is used when decoding the encoded data during reproduction, said method comprising:

transferring encoded data to the decoding buffer memory such that the data occupancy when last data in first-encoded data is decoded is a final buffer occupancy Be where it is assumed that virtual encoded data is transferred to the decoding buffer memory following the transfer of the first-encoded data to the decoding buffer memory, and the data occupancy at the start of decoding second-encoded data is an initial buffer occupancy Bi where the initial buffer occupancy Bi is less than the final buffer occupancy Be, and reproducing the encoded data.

25. A reproduction method according to claim 24 whereby data transfer to the decoding buffer memory is interrupted for a particular period T (T>O) when first-encoded data and second-encoded data are transferred to the decoding buffer memory, where period T is defined by the final buffer occupancy Be of the first-encoded data and the initial buffer occupancy Bi of the second-encoded data.

26. A reproduction method according to claim 25 wherein period T is defined as ((Be−Bi)/BR) where the data transfer rate to the decoding buffer memory is BR.

27. A reproduction method according to claim 24 whereby the encoded data is in put to the decoding buffer memory at a variable transfer rate.

28. A reproduction method according to claim 24 whereby the encoded data is input intermittently to the decoding buffer memory.

29. A reproduction method according to claim 24 whereby transfer of the encoded data to the decoding buffer memory is controlled so that the data occupancy is always less than a particular maximum occupancy Bmax.

* * * * *